(12) United States Patent
Cordsen et al.

(10) Patent No.: US 12,350,922 B2
(45) Date of Patent: Jul. 8, 2025

(54) CUTAWAY CARD ASSEMBLY

(71) Applicant: Cricut, Inc., South Jordan, UT (US)

(72) Inventors: Danielle Cordsen, South Jordan, UT (US); Janine Moore, Carmel, IN (US); Lucy Cheung, Salt Lake City, UT (US)

(73) Assignee: Cricut, Inc, South Jordan, UT (US)

( * ) Notice: Subject to any disclaimer, the term of this patent is extended or adjusted under 35 U.S.C. 154(b) by 0 days.

(21) Appl. No.: 17/938,205

(22) Filed: Oct. 5, 2022

(65) Prior Publication Data

US 2023/0110574 A1    Apr. 13, 2023

Related U.S. Application Data

(60) Provisional application No. 63/253,422, filed on Oct. 7, 2021.

(51) Int. Cl.
| | |
|---|---|
| *B32B 7/12* | (2006.01) |
| *B32B 3/26* | (2006.01) |
| *B32B 7/06* | (2019.01) |
| *B32B 27/10* | (2006.01) |
| *B32B 27/30* | (2006.01) |

(Continued)

(52) U.S. Cl.
CPC ............... *B32B 7/12* (2013.01); *B32B 3/266* (2013.01); *B32B 7/06* (2013.01); *B32B 27/10* (2013.01); *B32B 27/304* (2013.01); *B32B 27/32* (2013.01); *B32B 27/36* (2013.01); *B32B 37/12* (2013.01); *B32B 38/0004* (2013.01); *B32B 2255/10* (2013.01); *B32B 2307/4023* (2013.01);

(Continued)

(58) Field of Classification Search
CPC .. B32B 7/12; B32B 3/266; B32B 7/06; B32B 27/10; B32B 27/304; B32B 27/32; B32B 27/36; B32B 37/12; B32B 38/0004; B32B 2255/10; B32B 2307/4023; B32B 2307/412; B32B 2307/7246; B32B 2307/748; B32B 2307/7163; B32B 2439/70; B32B 29/005; C09J 7/20; C09J 2301/124
See application file for complete search history.

(56) References Cited

U.S. PATENT DOCUMENTS

| | | | | |
|---|---|---|---|---|
| 4,200,222 A | * | 4/1980 | Feuer ................... | B42D 15/045 40/594 |
| 4,439,941 A | * | 4/1984 | Halperin ................. | B44F 11/00 428/906.6 |

(Continued)

FOREIGN PATENT DOCUMENTS

| | | |
|---|---|---|
| JP | 2009-292978 A | 12/2009 |
| WO | 2021119445 A1 | 6/2021 |

OTHER PUBLICATIONS

Machine Translation of JP 5165471 B2. (Year: 2013).*
International Search Report and Written Opinion relating to applicaiton No. PCT/US2022/077609, dated Jan. 19, 2023.

*Primary Examiner* — Patricia L. Nordmeyer
(74) *Attorney, Agent, or Firm* — Honigman LLP; Grant Griffith

(57) ABSTRACT

A plurality of workpiece layers of material are disclosed. The plurality of workpiece layers of material include a dual-sided adhesive layer assembly having a first side surface and a second side surface opposite the first side surface. The plurality of workpiece layers of material also include a first substrate layer non-removably-connected to the dual-sided adhesive layer assembly.

3 Claims, 38 Drawing Sheets

(51) Int. Cl.
*B32B 27/32* (2006.01)
*B32B 27/36* (2006.01)
*B32B 37/12* (2006.01)
*B32B 38/00* (2006.01)

(52) U.S. Cl.
CPC . *B32B 2307/412* (2013.01); *B32B 2307/7246* (2013.01); *B32B 2307/748* (2013.01)

(56) References Cited

U.S. PATENT DOCUMENTS

| | | | | |
|---|---|---|---|---|
| 5,261,174 A | * | 11/1993 | Blegen | G09F 1/12 40/594 |
| 5,303,489 A | * | 4/1994 | Blegen | G09F 1/12 40/773 |
| 2012/0297650 A1 | * | 11/2012 | Burley | B42D 15/042 156/60 |

* cited by examiner

CUTAWAY CARD ASSEMBLY

CROSS-REFERENCE TO RELATED APPLICATIONS

This U.S. patent application claims priority under 35 U.S.C. § 119(e) to U.S. Provisional Application 63/253,422, filed on Oct. 7, 2021. The disclosure of this prior application is considered part of the disclosure of this application and is hereby incorporated by reference in its entirety.

TECHNICAL FIELD

The present disclosure relates generally to a cutaway card assembly including plurality of workpiece layers of material.

BACKGROUND

This section provides background information related to the present disclosure and is not necessarily prior art.

Designers (e.g., "crafters") may prepare, for example, greeting cards, stationary, and the like from workpiece material. In some circumstances, it may be difficult to produce a desired visual effect of a greeting card, stationary, and the like associated with the workpiece material. Accordingly, there are a number of disadvantages in the art that can be addressed.

SUMMARY

The subject matter of the present disclosure has been developed in response to the present state of the art, and in particular in response to the problems and needs in the art that have not yet been fully solved by currently available systems. Accordingly, the present disclosure has been developed to provide assemblies, systems, methods, and/or apparatus' that overcome many or all of the above-discussed shortcomings in the art, in accordance with various implementations.

Implementations of the present disclosure related generally to a plurality of workpiece layers of material. The plurality of workpiece layers of material include a dual-sided adhesive layer assembly and a first substrate layer. The dual-sided adhesive layer assembly includes a first side surface and a second side surface opposite the first side surface. The first substrate layer is non-removably-connected to the dual-sided adhesive layer assembly.

Implementations of the disclosure may include one or more of the following optional features. In some implementations, the dual-sided adhesive layer assembly includes a core portion. The core portion includes: a carrier layer having a first side surface and a second side surface; a first adhesive layer connected to the first side of the carrier layer; and a second adhesive layer connected to the second side of the carrier layer. The first substrate layer is non-removably-connected to the first adhesive layer of the dual-sided adhesive layer assembly for forming a single substrate workpiece assembly.

In some configurations, the plurality of workpiece layers of material include a second substrate layer. The second substrate layer is removably-connected to the second adhesive layer of the dual-sided adhesive layer assembly for forming a multi-substrate workpiece assembly. The second substrate layer is formed from a transparent material. The transparency of the second substrate layer configures the crafted multi-substrate workpiece assembly to viewable through the at least one passageway from a first side of the crafted multi-substrate workpiece assembly defined by the first substrate layer to a second side of the crafted multi-substrate workpiece assembly defined by the second substrate layer.

In other configurations, the dual-sided adhesive layer assembly further includes a first removable liner portion and a second removable liner portion. The first removable liner portion is configured for removal from the first adhesive layer prior to non-removable attachment of the first substrate layer to the first adhesive layer. The second removable liner portion is configured for removal from the second adhesive layer.

In yet other configurations, the dual-sided adhesive layer assembly further includes a first removable liner portion and a second removable liner portion. The first removable liner portion is configured for removal from the first adhesive layer prior to non-removable attachment of the first substrate layer to the first adhesive layer. The second removable liner portion is configured for removal from the second adhesive layer prior to removable attachment of the second substrate layer to the second adhesive layer.

In some examples, the plurality of workpiece layers of material include a second substrate layer design portion. The second substrate layer design portion is attached to the second substrate layer for forming a trim substrate workpiece assembly.

In other examples, the at least one passageway extends through a combined thickness of the first substrate layer and the core portion of the dual-sided adhesive layer assembly. However, the at least one passageway does not extends through a thickness of the second substrate layer for forming a crafted multi-substrate workpiece assembly.

Another aspect of the disclosure provides a method. The method includes preparing a multi-substrate workpiece assembly; interfacing the multi-substrate workpiece assembly with a cutting machine; utilizing the cutting machine for conducting work on the multi-substrate workpiece assembly; discharging the worked-on multi-substrate workpiece assembly from the cutting machine; and removing a cutout portion from the worked-on multi-substrate workpiece assembly for modifying the multi-substrate workpiece assembly for defining a crafted multi-substrate workpiece assembly.

Implementations of the disclosure may include one or more of the following optional features. In some implementations, prior to interfacing the multi-substrate workpiece assembly with a cutting machine, the method includes: interfacing the multi-substrate workpiece assembly with a workpiece support material. The multi-substrate workpiece assembly includes a front cover panel joined to a rear cover panel by a living hinge. Interfacing the multi-substrate workpiece assembly with the workpiece support material includes: arranging the rear cover panel within a workpiece-receiving cavity of the workpiece support material; and arranging the front cover panel over an outer surface of the workpiece support material and not within the workpiece-receiving cavity of the workpiece support material.

In some implementations, the step of utilizing the cutting machine for conducting work on the multi-substrate workpiece assembly includes: driving a tool of the cutting machine through a first thickness portion of the multi-substrate workpiece assembly but not through a second thickness portion of the multi-substrate workpiece assembly. The utilizing the cutting machine for conducting work on the multi-substrate workpiece assembly further includes: moving the tool through the first thickness portion of the multi-substrate workpiece assembly for forming a cut pattern that defines a perimeter of the cutout portion of the multi-substrate workpiece assembly; and forming at least one passageway that extends through first thickness portion of the multi-substrate workpiece assembly.

In other implementations, preparing the multi-substrate workpiece assembly includes: providing a dual-sided adhesive layer assembly having a first side surface including a first adhesive layer and a second side surface including a second adhesive layer that is arranged opposite the first adhesive layer; removing a first removable liner portion from the first adhesive layer of the dual-sided adhesive layer assembly; and non-removably-attaching a first substrate layer to the first adhesive layer of the dual-sided adhesive layer assembly for forming a single substrate workpiece assembly. Preparing the multi-substrate workpiece assembly further includes: removing a second removable liner portion from the second adhesive layer; and removably-attaching a second substrate layer to the second adhesive layer of the dual-sided adhesive layer assembly for forming a multi-substrate workpiece assembly.

In yet other implementations, the step of utilizing the cutting machine for conducting work on the multi-substrate workpiece assembly includes: driving a tool of the cutting machine through a first thickness portion of the multi-substrate workpiece assembly defined by the first substrate layer and the dual-sided adhesive layer assembly but not through a second thickness portion of the multi-substrate workpiece assembly defined by the second substrate layer. Utilizing the cutting machine for conducting work on the multi-substrate workpiece assembly further includes: moving the tool through the first thickness portion of the multi-substrate workpiece assembly for forming a cut pattern that defines a perimeter of the cutout portion of the multi-substrate workpiece assembly; and forming at least one passageway that extends through first thickness portion of the multi-substrate workpiece assembly. The second substrate layer is formed from a transparent material for configuring the crafted multi-substrate workpiece assembly to viewable through the at least one passageway from a first side of the crafted multi-substrate workpiece assembly defined by the first substrate layer to a second side of the crafted multi-substrate workpiece assembly defined by the second substrate layer.

The details of one or more implementations of the disclosure are set forth in the accompanying drawings and the description below. Other aspects, features, and advantages will be apparent from the description and drawings, and from the claims.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

Additional features and advantages of exemplary aspects of the disclosure will be set forth in the description which follows, and in part will be obvious from the description, or may be learned by the practice of such exemplary aspects. The features and advantages of such aspects may be realized and obtained by means of the instruments and combinations particularly pointed out in the appended claims. These and other features will become more fully apparent from the following description and appended claims or may be learned by the practice of such exemplary aspects as set forth hereinafter.

DESCRIPTION OF DRAWINGS

In order that the advantages of the disclosure will be readily understood, a more particular description of the disclosure briefly described above will be rendered by reference to specific implementations that are illustrated in the appended drawings. Thus, although the subject matter of the present disclosure is particularly pointed out and distinctly claimed in the concluding portion of the specification, a more complete understanding of the present disclosure, may best be obtained by referring to the detailed description and claims when considered in connection with the drawing figures. Understanding that these drawings depict only typical implementations of the disclosure and are not therefore to be considered to be limiting of its scope, the subject matter of the present application will be described and explained with additional specificity and detail through the use of the accompanying drawings, in which:

Corresponding reference numerals indicate corresponding parts throughout the drawings.

DETAILED DESCRIPTION

The detailed description of implementations herein refers to the accompanying drawings, which show implementations by way of illustration. While these implementations are described in sufficient detail to enable those skilled in the art to practice the disclosure, other implementations may be realized and logical changes and adaptations in design and construction may be made in accordance with this disclosure without departing from the spirit and scope of the disclosure. Thus, the detailed description herein is presented for purposes of illustration only and not of limitation.

Disclosed herein, according to various implementations, are a plurality of workpiece layers of material that contribute to forming: (1) an exemplary original equipment manufacturer (OEM) single substrate workpiece assembly; (2) a trim substrate workpiece assembly; (3) a user-assembled multi-substrate workpiece assembly; and (4) a user-crafted multi-substrate workpiece assembly. Also disclosed herein, according to various implementations, are associated systems, methods, and apparatuses, that assist in the forming of the user-crafted multi-substrate workpiece assembly from the user-assembled multi-substrate workpiece assembly, thereby enabling unique design aesthetics to be easily and reliably created.

Figure 1:
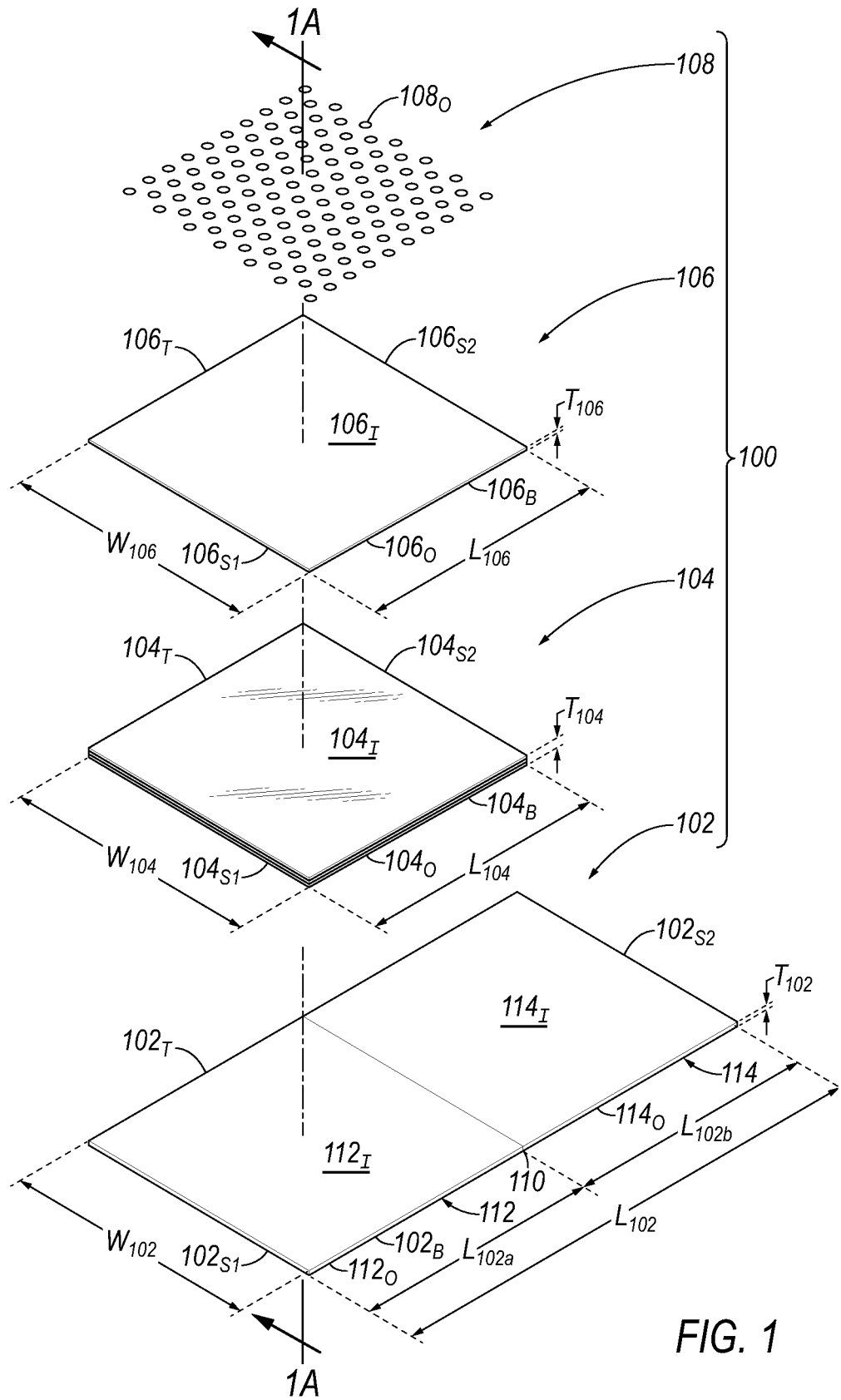
FIG. 1 is an exploded perspective view of a plurality of exemplary workpiece layers of material.
Figure 1A:
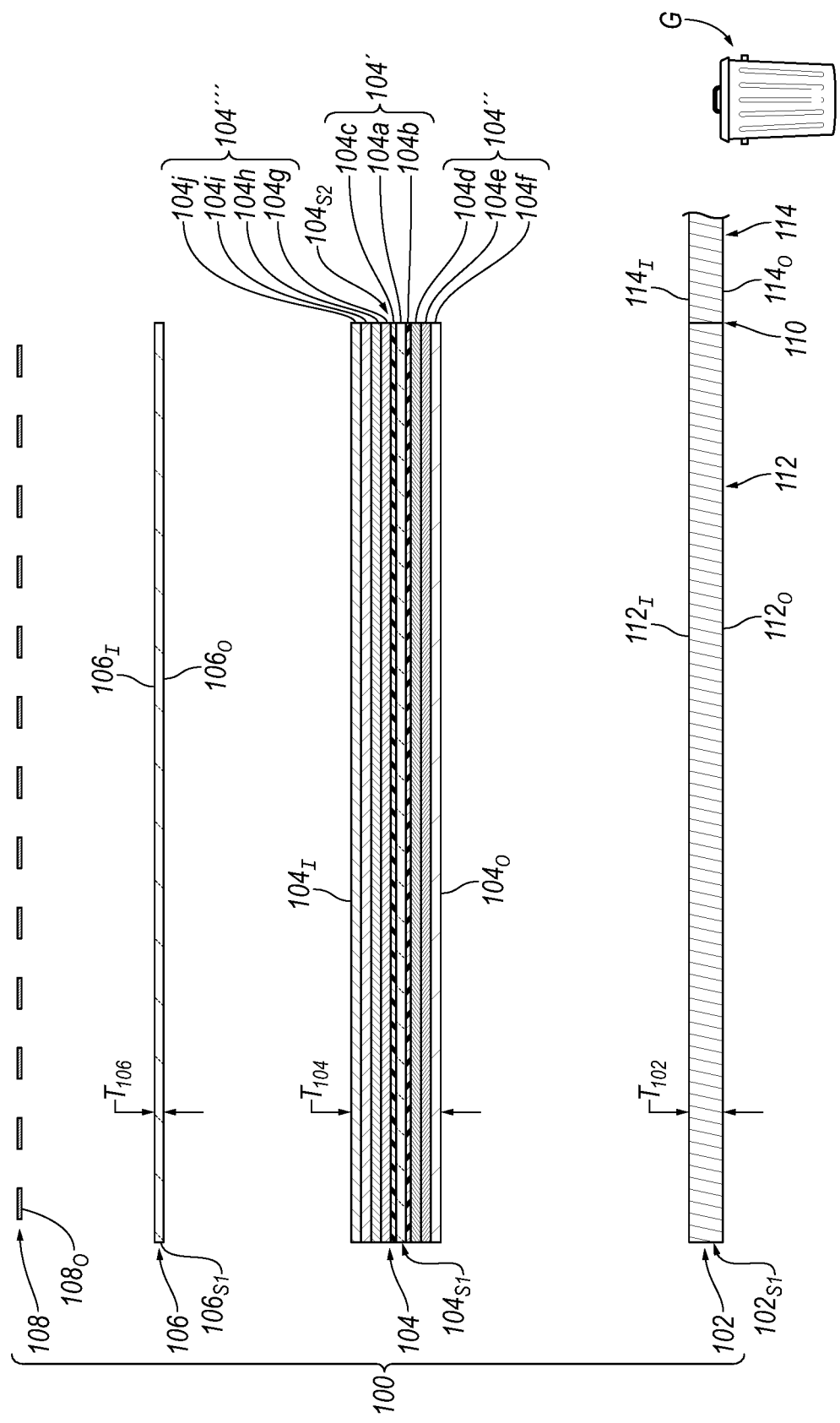
FIG. 1A is a cross-sectional view of the plurality of exemplary workpiece layers of material according to line 1A-1A of FIG. 1.

Referring to FIGS. 1 and 1A, an exemplary plurality of workpiece layers of material 100 are shown. The plurality of workpiece layers of material 100 include, for example, an exemplary first substrate layer 102, an exemplary dual-sided adhesive layer assembly 104, an exemplary second substrate layer 106, and an exemplary second substrate layer design portion 108.

In some implementations, the second substrate layer design portion 108 may be integrally-formed with the second substrate layer 106. In other implementations, the second substrate layer design portion 108 is not integrally-formed with the second substrate layer 106.

With reference to FIG. 1A, the dual-sided adhesive layer assembly 104 includes a plurality of sub-layer portions 104', 104", 104'". The sub-layer portion 104' may be referred to as a "core portion" of the dual-sided adhesive layer assembly 104. The sub-layer portion 104" may be referred to as a "first removable liner portion" of the dual-sided adhesive layer assembly 104. The sub-layer portion 104'" may be referred to as a "second removable liner portion" of the dual-sided adhesive layer assembly 104.

Figure 3:
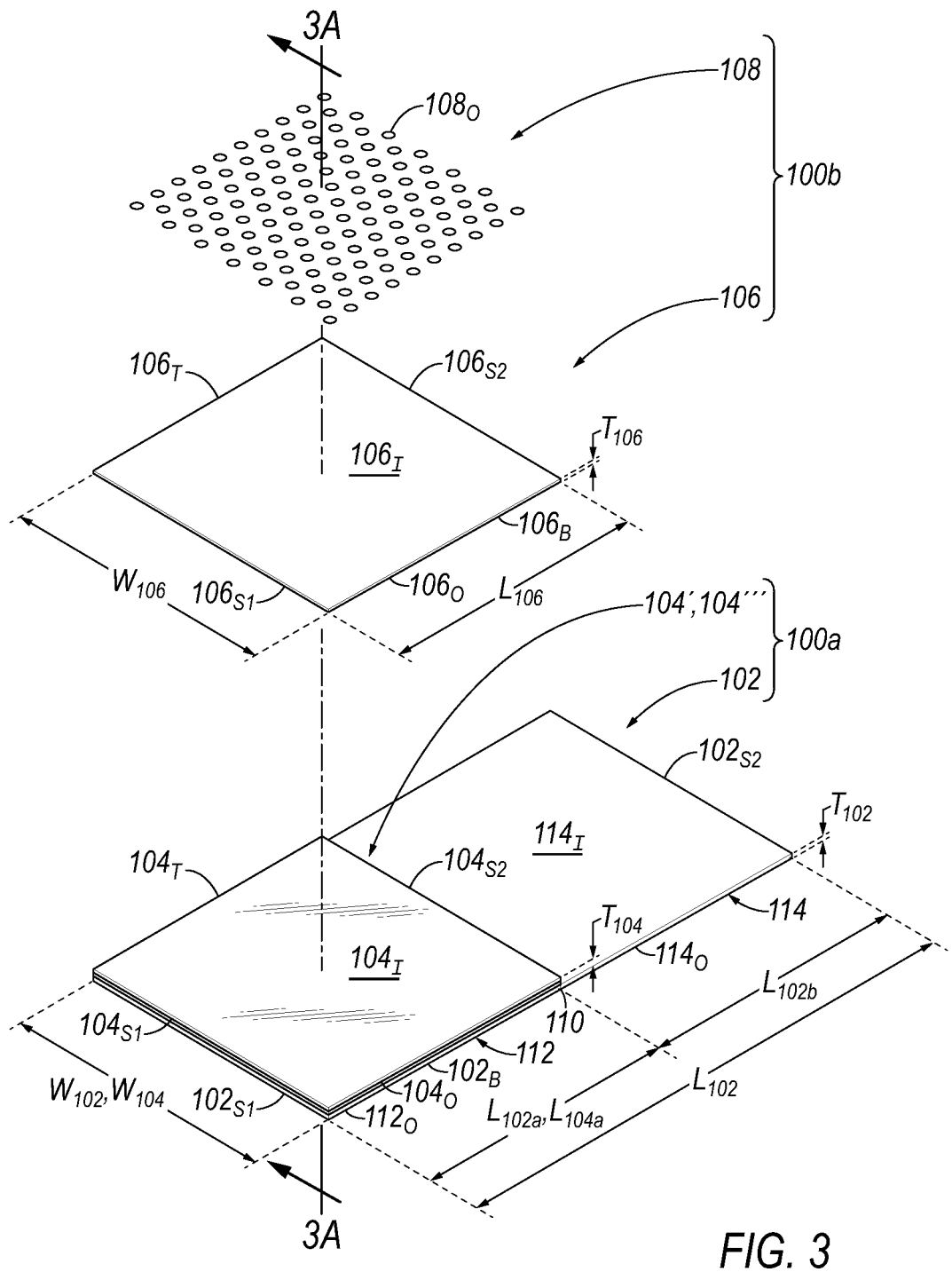
FIG. 3 is another exploded perspective view of some of the plurality of workpiece layers of material of FIG. 1 illustrating a second step for forming the OEM single substrate workpiece assembly including the arrangement of the first adhesive sub-layer of the dual-sided adhesive layer being disposed adjacent a first surface of a first substrate layer.
Figure 3A:
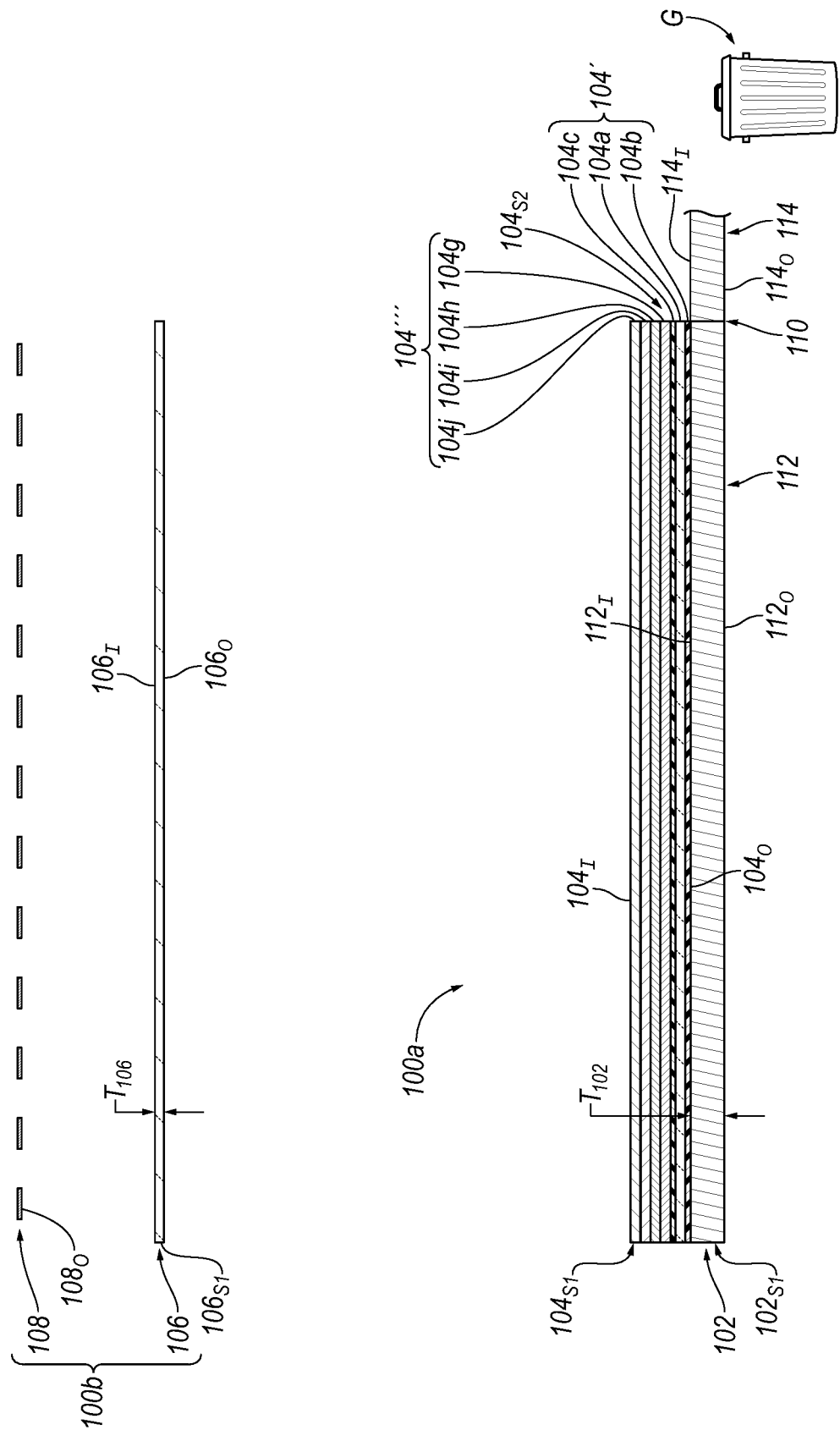
FIG. 3A is a cross-sectional view of some of the plurality of exemplary workpiece layers of material according to line 3A-3A of FIG. 3.
Figure 4:
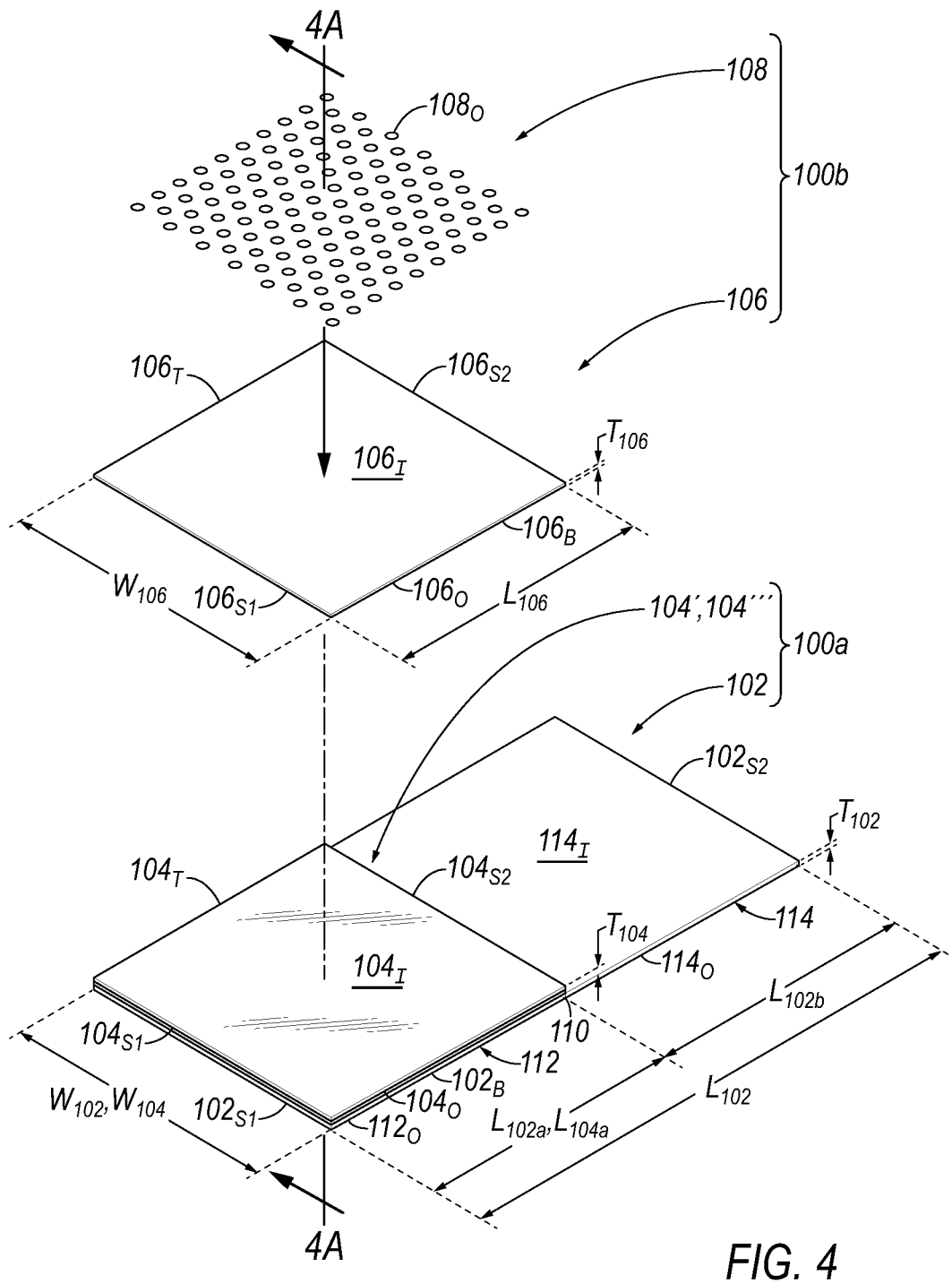
FIG. 4 is another exploded perspective view of some of the plurality of workpiece layers of material of FIG. 1 illustrating a step for forming a trim substrate workpiece assembly including the arrangement of a second substrate layer design portion upon a first surface of a second substrate layer.
Figure 4A:
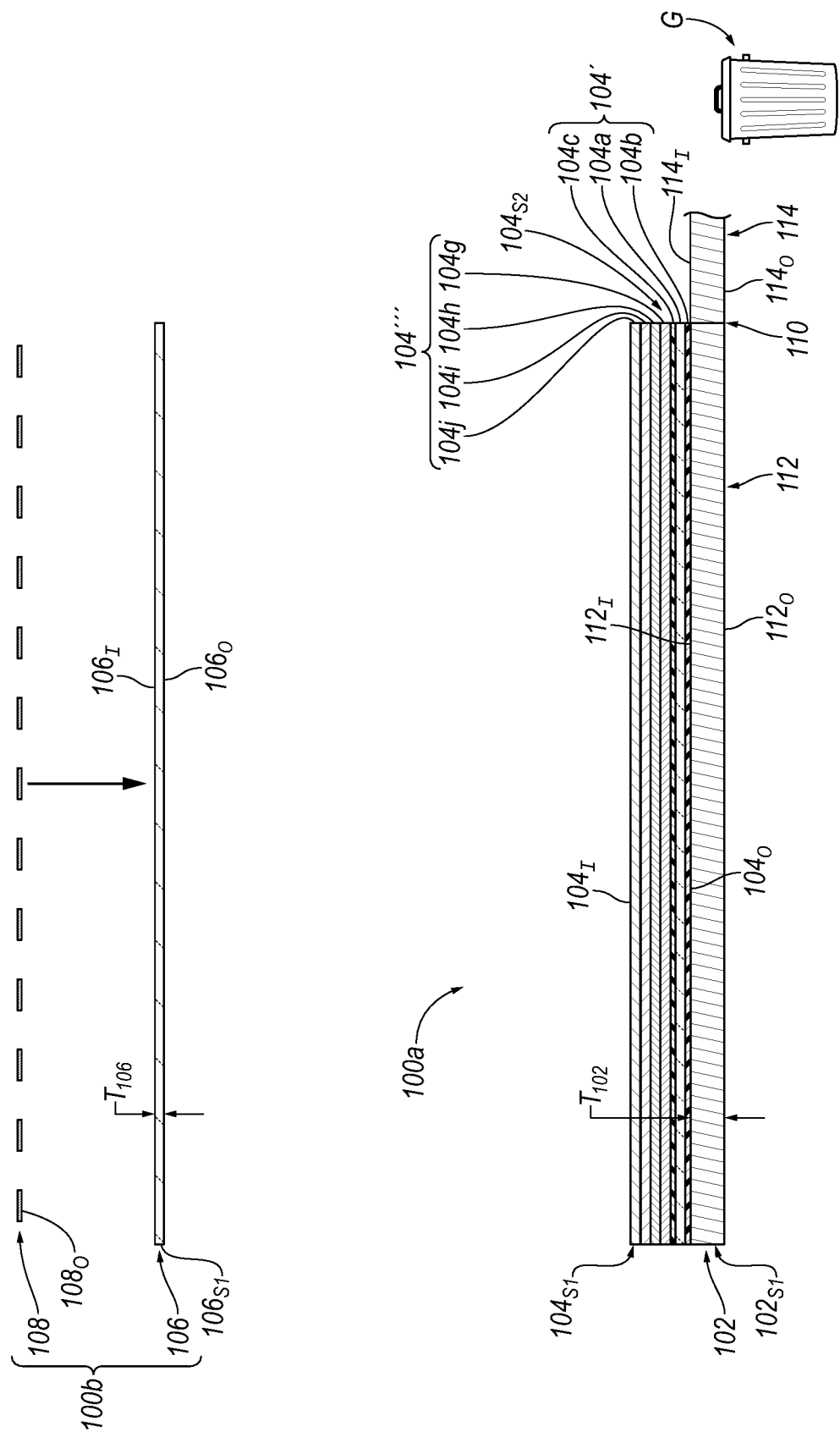
FIG. 4A is a cross-sectional view of some of the plurality of exemplary workpiece layers of material according to line 4A-4A of FIG. 4.
Figure 5:
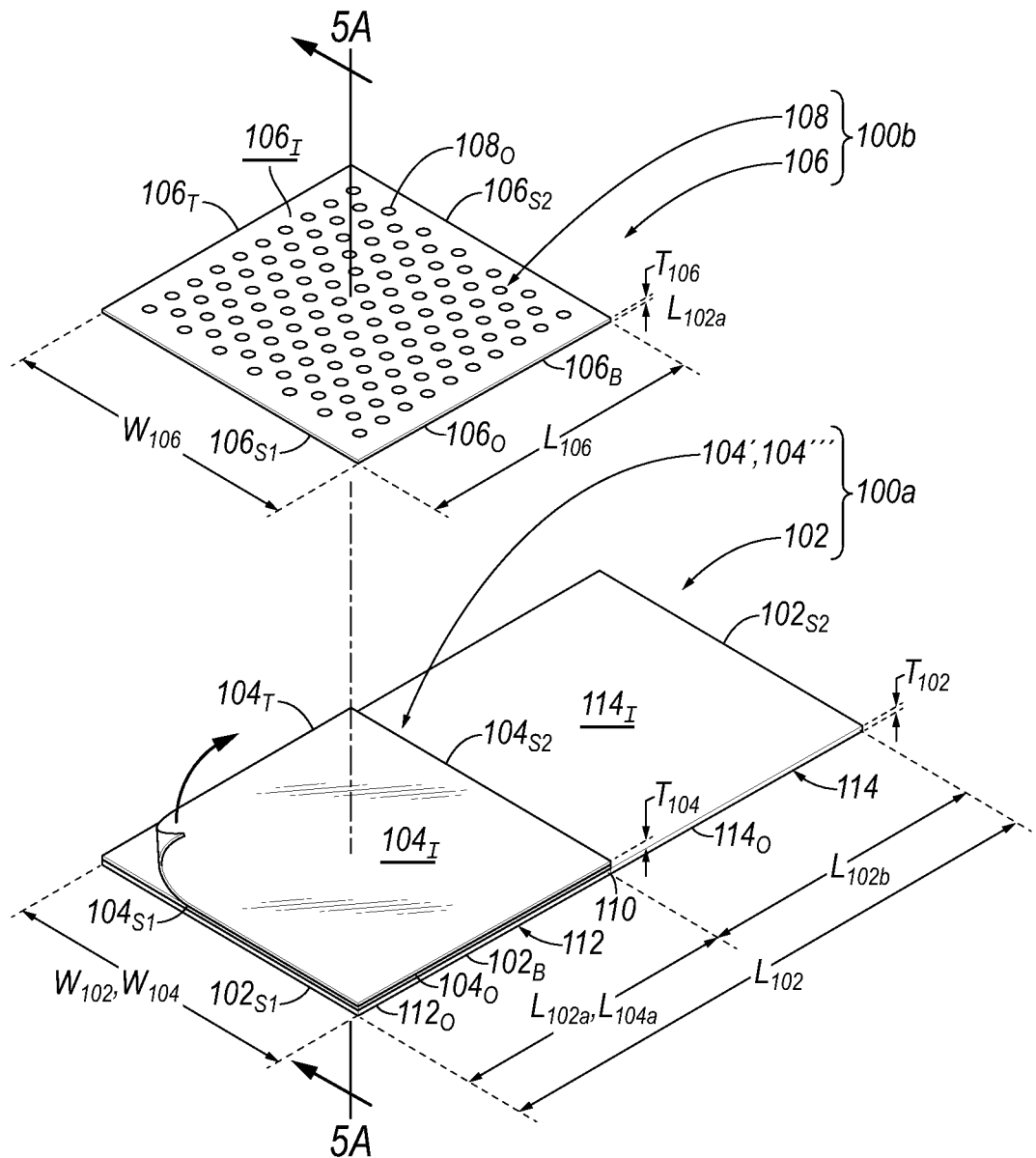
FIG. 5 is another exploded perspective view of some of the plurality of workpiece layers of material of FIG. 1 illustrating a first step for forming a user-assembled multi-substrate workpiece assembly including the removal of a second removable liner portion from the dual-sided adhesive layer for exposing a second adhesive sub-layer of the dual-sided adhesive layer.
Figure 5A:
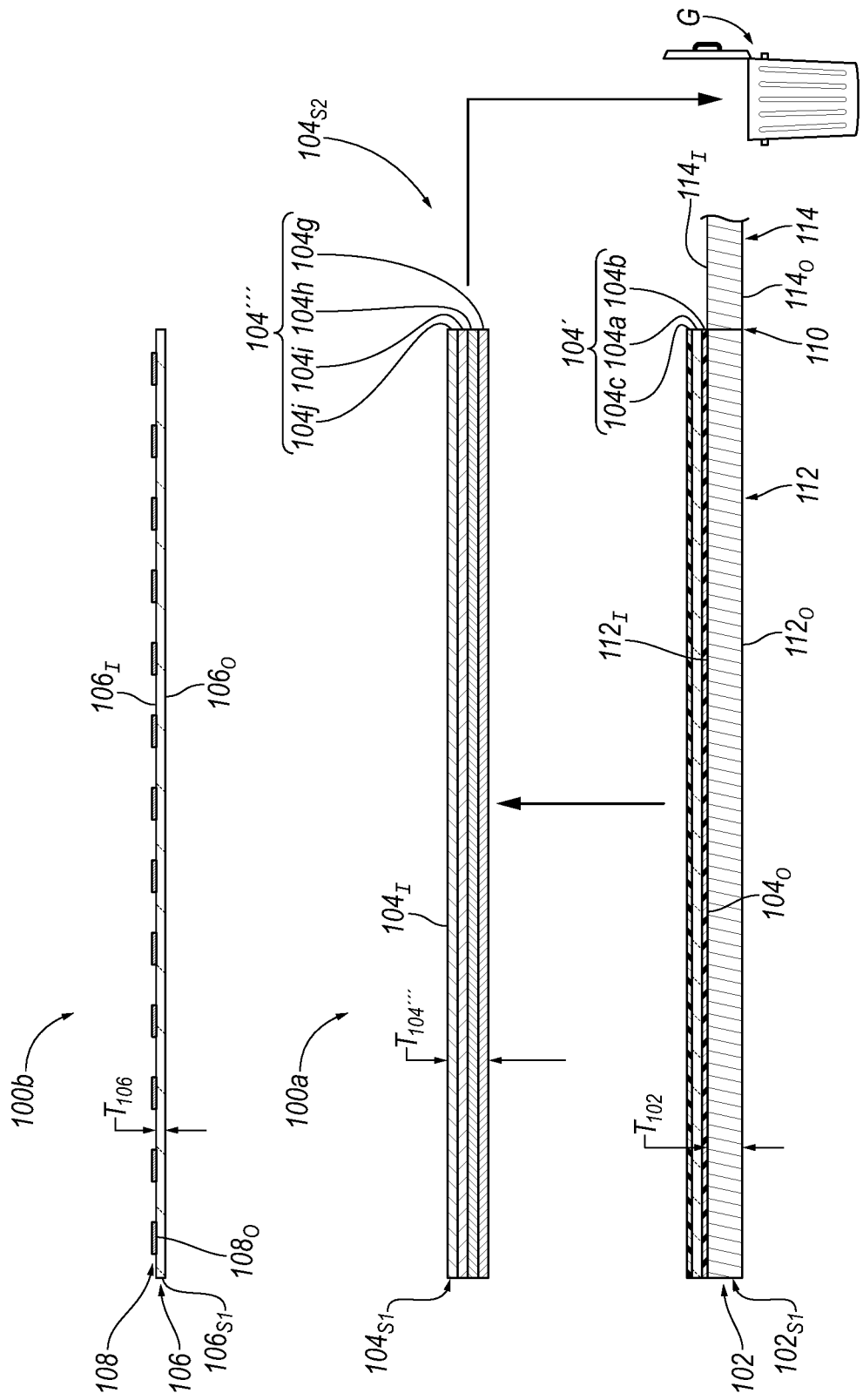
FIG. 5A is a cross-sectional view of some of the plurality of exemplary workpiece layers of material according to line 5A-5A of FIG. 5.
Figure 7:
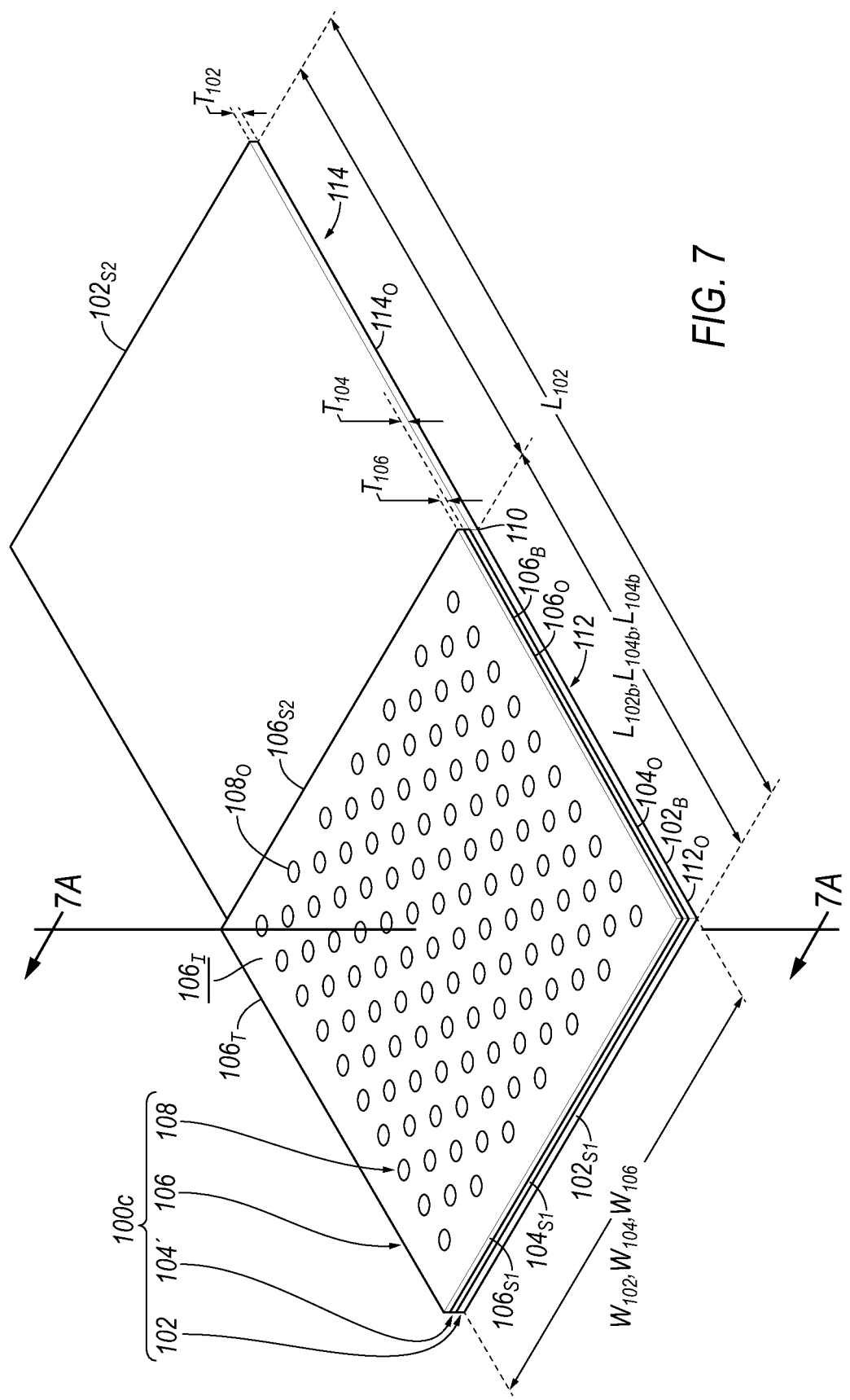
FIG. 7 is an assembled perspective view of some of the plurality of workpiece layers of material of FIG. 1 illustrating the user-assembled multi-substrate workpiece assembly including the arrangement of the trim substrate workpiece assembly adjacent the second adhesive sub-layer of the dual-sided adhesive layer.
Figure 7A:
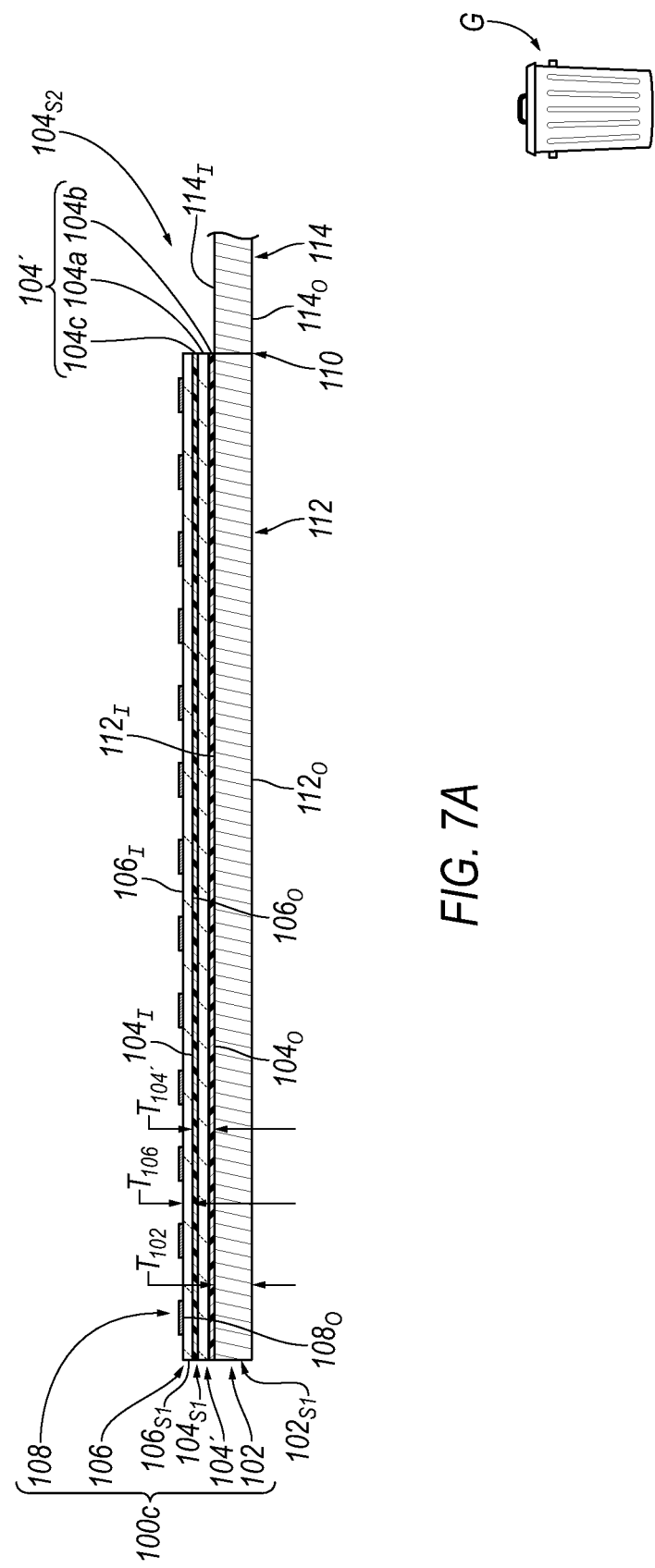
FIG. 7A is a cross-sectional view of some of the plurality of exemplary workpiece layers of material according to line 7A-7A of FIG. 7.
Figure 10:
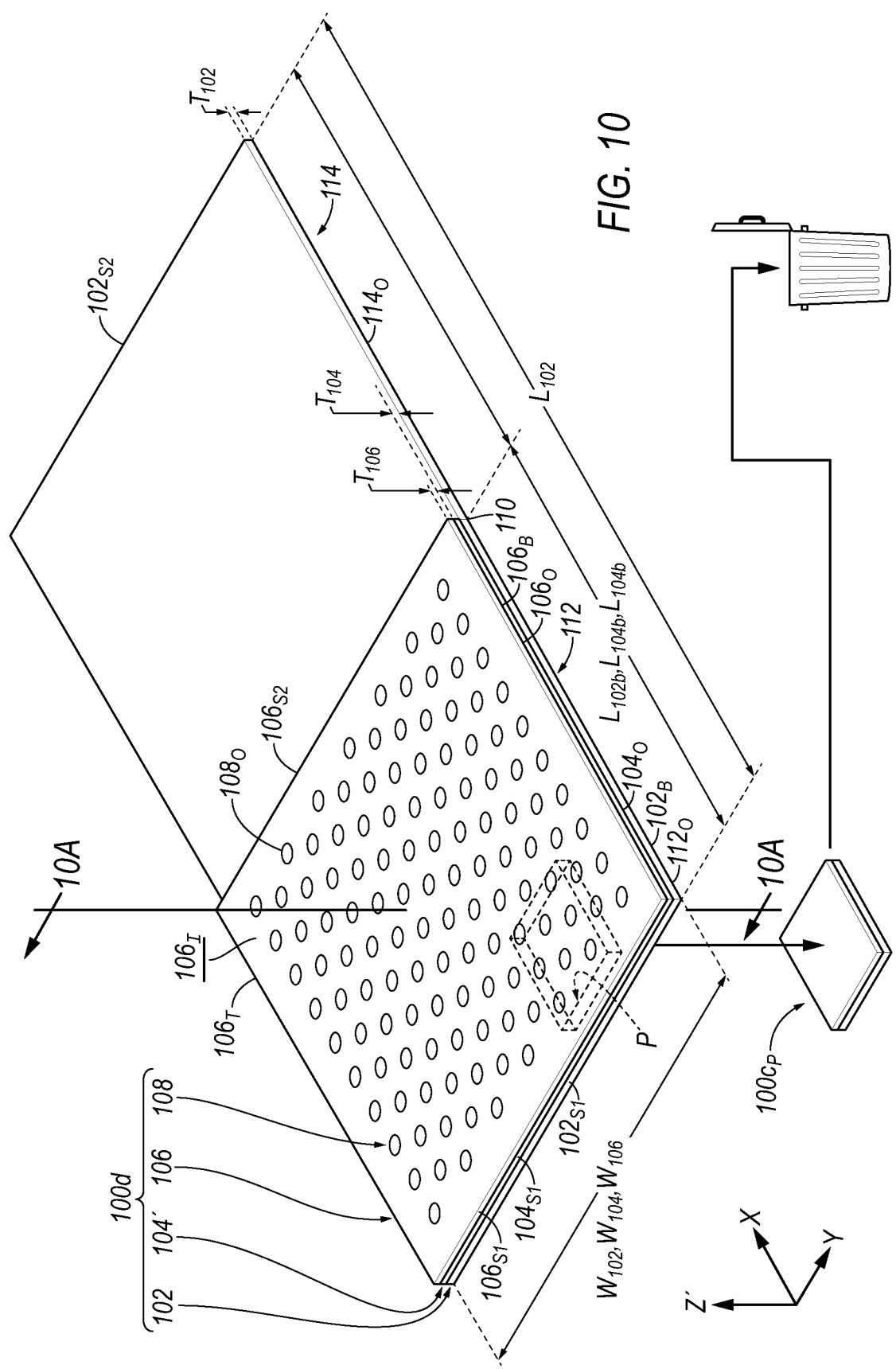
FIG. 10 is a perspective view of the user-assembled multi-substrate workpiece assembly of FIG. 9 in a non-virgin, cut-and-weeding state showing the cutout portion being removed from the user-assembled multi-substrate workpiece assembly of FIG. 9.

As seen at FIGS. 3 and 3A, the first substrate layer 102, the core portion 104' of the dual-sided adhesive layer assembly 104, and the second removable liner portion 104'" of the plurality of workpiece layers of material 100 contributes to forming an exemplary OEM single substrate workpiece assembly 100a. With reference to FIGS. 5 and 5A, the second substrate layer 106, and, optionally, the second substrate layer design portion 108 contributes to forming an exemplary trim substrate workpiece assembly 100b. Furthermore, as seen at FIGS. 7 and 7A, the first substrate layer 102, the core portion 104' of the dual-sided adhesive layer assembly 104, and the trim substrate workpiece assembly 100b (including the second substrate layer 106, alone, or, optionally, the second substrate layer design portion 108 formed with or joined to the second substrate layer 106) contributes to forming an exemplary user-assembled multi-substrate workpiece assembly 100c. Yet even further, as seen at FIGS. 11 and 11A, a "weeded portion" (see, e.g., 100$c_P$ at FIGS. 10 and 10A) of the user-assembled multi-substrate workpiece assembly 100c is removed from the first substrate layer 102 and the core portion 104' of the dual-sided adhesive layer assembly 104 (without, in some examples, removing any of the trim substrate workpiece assembly 100b) for forming an exemplary user-crafted multi-substrate workpiece assembly 100d.

Referring initially to FIGS. 1 and 1A, the first substrate layer 102 may include any desirable material such as, for example, paper, cardstock, cardboard, plastic, vinyl, or the like. Such exemplary above-described materials may be utilized as a base material for forming a user-crafted multi-substrate workpiece assembly 100d defining a card (e.g., a "greeting card" as seen at, for example, FIG. 25), an envelope, stationary, or any combination thereof. The first substrate layer 102 is not limited to forming cards, and, as such, the first substrate layer 102 may provide any desirable utility such as, for example, banners, signage, and the like.

Figure 25:
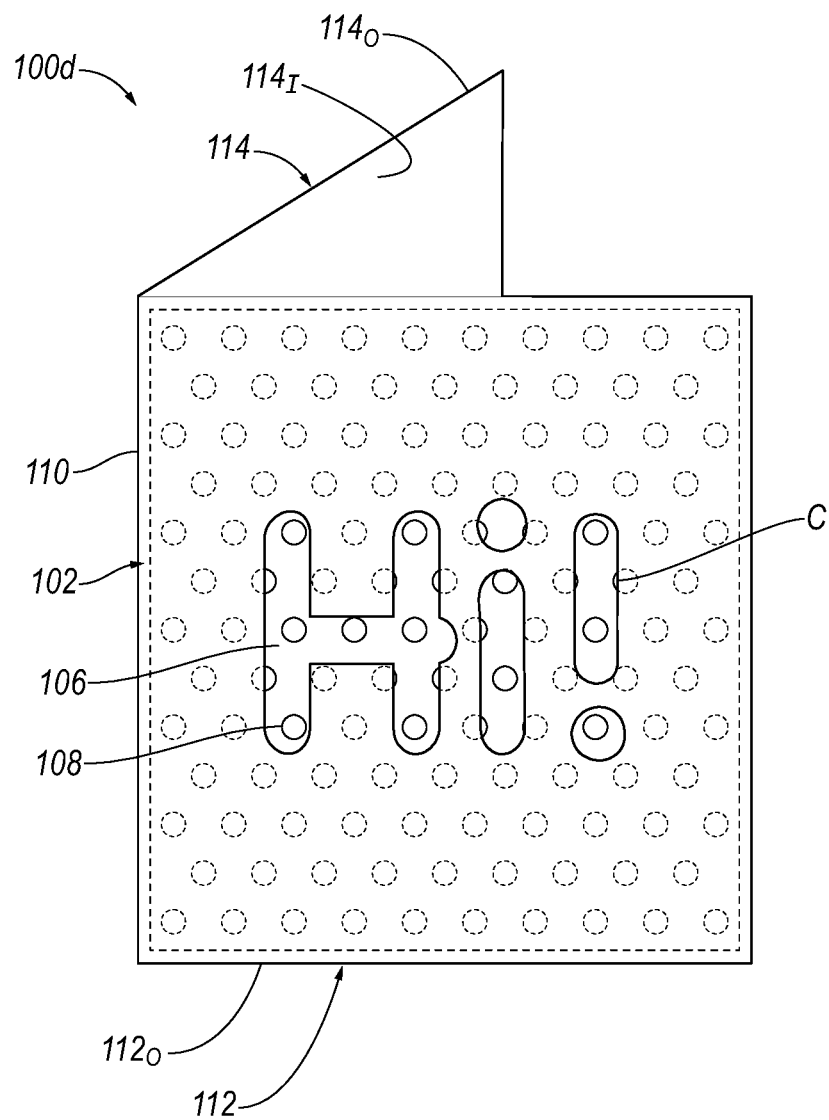
FIG. 25 is a perspective view of the user-assembled multi-substrate workpiece assembly that was: interfaced with the cutting machine of FIG. 18 and subsequently worked upon by the cutting machine at FIGS. 19-23; and then "weeded" by the user at FIG. 24 for transforming the user-assembled multi-substrate workpiece assembly of FIG. 18 into a user-crafted multi-substrate workpiece assembly.

If, for example, the first substrate layer 102 is configured as a card, the first substrate layer 102 may be folded upon itself to form a living hinge 110. The living hinge 110 results in the first substrate layer 102 including: (1) a front cover panel 112 defining an outer surface $112_O$ and an inner surface $112_I$; and (2) a rear cover panel 114 defining an outer surface $114_O$ and an inner surface $114_I$. Accordingly, one or both of the inner surface $112_I$ of the front cover panel 112 and the inner surface $114_I$ of the rear cover panel 114 may include a note or message from a sender that is intended to be read by a user whereas, for example (as seen at FIGS. 8-9 and 8A-9A), the outer surface $112_O$ of the front cover panel 112 may be altered or worked-on by the tool 19 in order to provide a design (see, e.g., a cut pattern C as seen at FIG. 25) that is at least partially defined by the front cover panel 112 of the first substrate layer 102. Accordingly, one or both of the cut pattern C and the outer surface $112_O$ of the front cover panel 112 may include, for example, a decorative feature, pattern, or message that precedes viewing of the note or message to be later read by the user after "opening the card" on one or both of the the inner surface $112_I$ of the front cover panel 112 and the inner surface $114_I$ of the rear cover panel 114.

In some configurations, when the first substrate layer 102 defines a card, the first substrate layer 102 may define a length $L_{102}$ and a width $W_{102}$. The length $L_{102}$ may be further defined by a first length portion $L_{102a}$ and a second length portion $L_{102b}$. The first length portion $L_{102a}$ extends across the front cover panel 112 from a first side edge $102_{S1}$ of the first substrate layer 102 toward the living hinge 110. The second length portion $L_{102b}$ extends across the rear cover panel 114 from the living hinge 110 toward a second side edge $102_{S2}$ of the first substrate layer 102. The width $W_{102}$ extends between a bottom side edge 102B of the first substrate layer 102 toward a top side edge $102_T$ of the first substrate layer 102 such that the width $W_{102}$ extends across each of the front cover panel 112 and the rear cover panel 114 from. A thickness $T_{102}$ defining the first substrate layer 102 extends between the outer surface $112_O$, $114_O$ of each of the front cover panel 112 and the rear cover panel 114 and the inner surface $112_I$, $114_I$ of each of the front cover panel 112 and the rear cover panel 114. The thickness $T_{102}$ may be between about 0.27 mm and 0.32 mm. In some implementations, the thickness $T_{102}$ may be about 0.29 mm.

As also seen at FIGS. 1 and 1A, each of the dual-sided adhesive layer assembly 104 and the second substrate layer 106 also respectively include: a first side edge $104_{S1}$, $106_{S1}$; a second side edge $104_{S2}$, $106_{S2}$; a bottom side edge $104_B$, $106_B$; and a top side edge $104_T$, $106_T$. Furthermore, each of the dual-sided adhesive layer assembly 104 and the second substrate layer 106 also respectively include: an inner surface $104_I$, $106_I$ and an outer surface $104_O$, $106_O$. Yet even further, each of the dual-sided adhesive layer assembly 104 and the second substrate layer 106 also respectively include a thickness $T_{104}$, $T_{106}$ extending between the inner surface $104_I$, $106_I$ and the outer surface $104_O$, $106_O$. Each of the thicknesses $T_{104}$, $T_{106}$ may be between about 0.27 mm and 0.33 mm. In some implementations, the thicknesses $T_{104}$, $T_{106}$ may be about 0.30 mm.

As also seen at FIGS. 1 and 1A, each of the dual-sided adhesive layer assembly 104 and the second substrate layer 106 also respectively include a length $L_{104}$, $L_{106}$, and a width $W_{104}$, $W_{106}$. In some configurations, the length $L_{104}$, $L_{106}$ may extend between the first side edge $104_{S1}$, $106_{S1}$ and the second side edge $104_{S2}$, $106_{S2}$ of each of, respectively, the dual-sided adhesive layer assembly 104 and the second substrate layer 106. In other configurations, the width $W_{104}$, $W_{106}$ may extend between the bottom side edge $104_B$, $106_B$ and the top side edge $104_T$, $106_T$ of each of, respectively, the dual-sided adhesive layer assembly 104 and the second substrate layer 106.

In some configurations, the length $L_{104}$, $L_{106}$ of each of the dual-sided adhesive layer assembly 104 and the second substrate layer 106 may be substantially equal to the first length portion $L_{102a}$ associated with, for example, the front cover panel 112. In other configurations, the width $W_{104}$, $W_{106}$ of each of the dual-sided adhesive layer assembly 104 and the second substrate layer 106 may be substantially equal to the width $W_{102}$ associated with, for example, the front cover panel 112.

In some configurations, the second substrate layer 106 may, for example, be defined by a length $L_{106}$ and a width $W_{106}$ that are less than, respectively, the first length portion $L_{102a}$ associated with the front cover panel 112 and the width $W_{102}$ associated with, for example, the front cover panel 112. Furthermore, in some configurations, the plurality of workpiece layers of material 100 are not limited to including one second substrate layer 106; accordingly, for example, the plurality of workpiece layers of material 100 may include two or more second substrate layers 106; in such exemplary configurations, the two or more second substrate layers 106, may include any desirable shape, such as, for example, a rectangular shape or a square shape.

In some implementations, one or more second substrate layers 106 may singularly or collectively be substantially equal to a surface area defined by the first length portion $L_{102a}$ and the width $W_{102}$ associated with the front cover panel 112. In other implementations, one or more second substrate layers 106 may be singularly or collectively be substantially less than the surface area defined by the first length portion $L_{102a}$ and the width $W_{102}$ associated with the front cover panel 112. As will be explained in the following disclosure, in such configurations (when the one or more second substrate layers 106 may singularly or collectively be substantially less than the surface area defined by the first length portion $L_{102a}$ and the width $W_{102}$ associated with the front cover panel 112), the first substrate layer 102 may be directly disposed adjacent (by way of the, the core portion 104' of the dual-sided adhesive layer assembly 104) a pressure sensitive adhesive layer $21_A$ (see, e.g., FIGS. 19-21 and 19A-21A) of a workpiece support material 20; in such a configuration, if the one or more second substrate layers 106 is/are not arranged as an intervening layer of material (as seen at, e.g., FIG. 21A) between the pressure sensitive adhesive layer $21_A$ and the core portion 104' of the dual-sided adhesive layer assembly 104, the first substrate layer 102 may adhere indirectly (by way of the core portion 104' of the dual-sided adhesive layer assembly 104) to the pressure sensitive adhesive layer $21_A$ after cutting C (see, e.g., FIGS. 23 and 23A) the first substrate layer 102 with the tool 19.

With reference to FIG. 1A, in some implementations, the core portion 104' of the dual-sided adhesive layer assembly 104 includes a plurality of layers 104a-104c such as, for example, a first layer 104a, a second layer 104b, and a third layer 104c. The plurality of layers 104a-104c collectively define the thickness $T_{104'}$ (see, e.g., FIGS. 6A-11A) of the core portion 104' of the dual-sided adhesive layer assembly 104. The thickness $T_{104'}$ may be between about 0.043 mm and 0.066 mm. In some implementations, the thickness $T_{104'}$ may be about 0.057 mm.

In some examples, the first layer 104a of the core portion 104' of the dual-sided adhesive layer assembly 104 includes a carrier layer. In other examples, the second layer 104b of the core portion 104' of the dual-sided adhesive layer assembly 104 includes a first adhesive layer. In yet other examples, the third layer 104c of the core portion 104' of the dual-sided adhesive layer assembly 104 includes a second adhesive layer.

The carrier layer 104a may be formed from, for example, a plastic material that, in some circumstances, may be transparent. The carrier layer 104a may be formed from, for example, a thermoplastic polymer compound, a polyethylene terephthalate (PET) material, or the like.

The first adhesive layer 104b may be a "permanent" glue compound that is utilized for permanently adhering or non-removably-adhering the core portion 104' of the dual-sided adhesive layer assembly 104 to the first substrate layer 102. Accordingly, as seen at FIGS. 3 and 3A, the first adhesive layer 104b is utilized for non-removably-securing the core portion 104' of the dual-sided adhesive layer assembly 104 to the inner surface $112_I$ of the front cover panel 112 of the first substrate layer 102.

The second adhesive layer 104c may be a "non-permanent" glue compound that is utilized for removably-adhering the second removable liner portion 104''' (as seen at FIGS. 4-5 and 4A-5A) or the second substrate layer 106 (as seen at FIGS. 6-7 and 6A-7A) to the core portion 104' of the dual-sided adhesive layer assembly 104. In other words, the first adhesive layer 104b may have a greater adhesive strength than the second adhesive layer 104c. In some examples, the first adhesive layer 104b may have a higher adhesive shear strength than the second adhesive layer 104c.

In some implementations, the first adhesive layer 104b or the second adhesive layer 104c may be a pressure sensitive adhesive. In other implementations, the first adhesive layer 104b or the second adhesive layer 104c may be an acrylic-based adhesive material, a rubber-based adhesive material, a wax-based adhesive material, a polyurethane-based adhesive material, or a water-based adhesive material. In other implementations, the first adhesive layer 104b or the second adhesive layer 104c may be a double-sided tape.

The carrier layer 104a functions as a central or intermediate layer that retains the first adhesive layer 104b and the second adhesive layer 104c thereto. For example, the first adhesive layer 104b is retained on an outer surface of the carrier layer 104a (relative to, for example, the outer surface $112_O$ of the front cover panel 112). In another example, the second adhesive layer 104c is retained on an inner surface of the carrier layer 104a (relative to, for example, the inner surface $112_I$ of the front cover panel 112). In other words, the first adhesive layer 104b is supported on a first surface of the carrier layer 104a that is opposite a second surface of the carrier layer 104a that supports the second adhesive layer 104c.

With continued reference to FIG. 1A, in other implementations, the first removable liner portion 104'' of the dual-sided adhesive layer assembly 104 may include a plurality of layers 104d-104f such as, for example, a first layer 104d, a second layer 104e, and a third layer 104f. The plurality of layers 104d-104f collectively define a thickness $T_{104''}$ (see, e.g., FIG. 2A) of the first removable liner portion 104'' of the dual-sided adhesive layer assembly 104. The thickness $T_{104''}$ may be between about 0.082 mm and 0.098 mm. In some implementations, the thickness $T_{104''}$ may be about 0.09 mm.

The first layer 104d of the plurality of layers 104d-104f that forms the first removable liner portion 104" may include, for example, a solvent silicon releaser. The second layer 104e of the plurality of layers 104d-104f that forms the first removable liner portion 104" may include, for example, a polyethylene (PE) lamination layer. The third layer 104f of the plurality of layers 104d-104f that forms the first removable liner portion 104" may include, for example, a paper material, which may be alternatively referred to as "art paper". Functionally, the solvent silicon releaser 104d permits separation of the paper material 104f from the first adhesive layer 104b. The PE lamination layer 104e functions as a moisture barrier that prevents curling or undesirable separation of the art paper 104f from the first adhesive layer 104b as a result of, for example, the dual-sided adhesive layer assembly 104 being exposed to a high humidity surrounding atmosphere.

With even further reference to FIG. 1A, in yet other implementations, the second removable liner portion 104''' of the dual-sided adhesive layer assembly 104 includes a plurality of layers 104g-104j such as, for example, a first layer 104g, a second layer 104h, a third layer 104i, and a fourth layer 104j. The plurality of layers 104g-104j collectively define a thickness $T_{104'''}$ (see, e.g., FIG. 5A) of the second removable liner portion 104''' of the dual-sided adhesive layer assembly 104. In some examples, the thickness $T_{104'''}$ may be between about 0.074 mm and 0.090 mm. In some implementations, the thickness $T_{104'''}$ may be about 0.082 mm.

The first layer 104g of the plurality of layers 104g-104j that forms the second removable liner portion 104''' may include, for example, a solvent silicon releaser. The second layer 104h of the plurality of layers 104g-104j that forms the second removable liner portion 104''' may include, for example, a polyethylene (PE) lamination layer. The third layer 104i of the plurality of layers 104g-104j that forms the second removable liner portion 104''' may include, for example, a paper material. The fourth layer 104j of the plurality of layers 104g-104j that forms the second removable liner portion 104''' may include, for example, a layer of ink that may be spayed, printed, or the like. Functionally, the solvent silicon releaser 104g permits separation of the paper material 104i from the second adhesive layer 104c. The PE lamination layer 104h functions as a moisture barrier that prevents curling or undesirable separation of the art paper 104f from the first adhesive layer 104b as a result of, for example, the dual-sided adhesive layer assembly 104 being exposed to a high humidity surrounding atmosphere.

Figure 2:
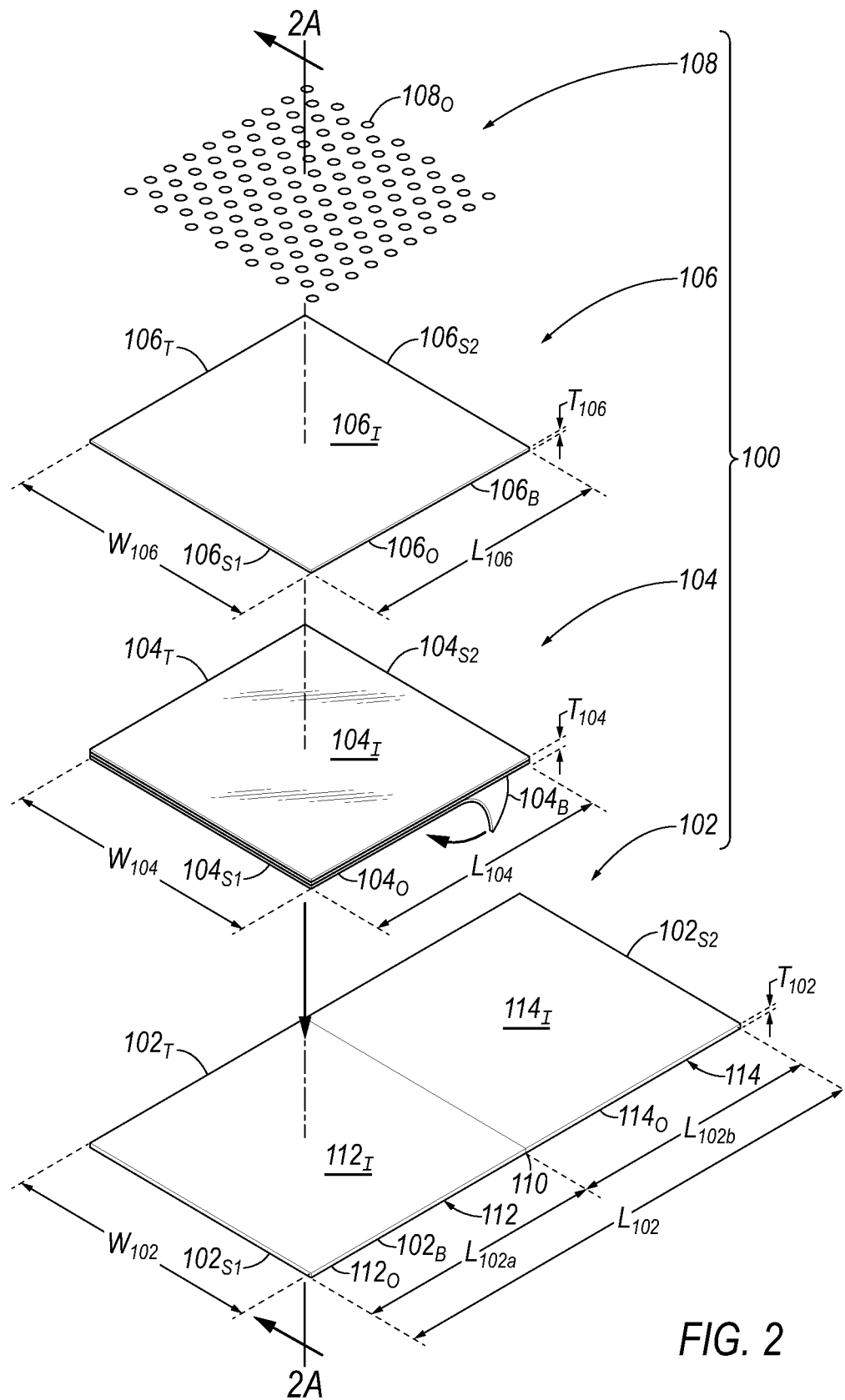
FIG. 2 is another exploded perspective view of the plurality of workpiece layers of material of FIG. 1 illustrating a first step for forming an exemplary original equipment manufacturer (OEM) single substrate workpiece assembly including the removal of a first removable liner portion from a dual-sided adhesive layer for exposing a first adhesive sub-layer of the dual-sided adhesive layer.
Figure 2A:
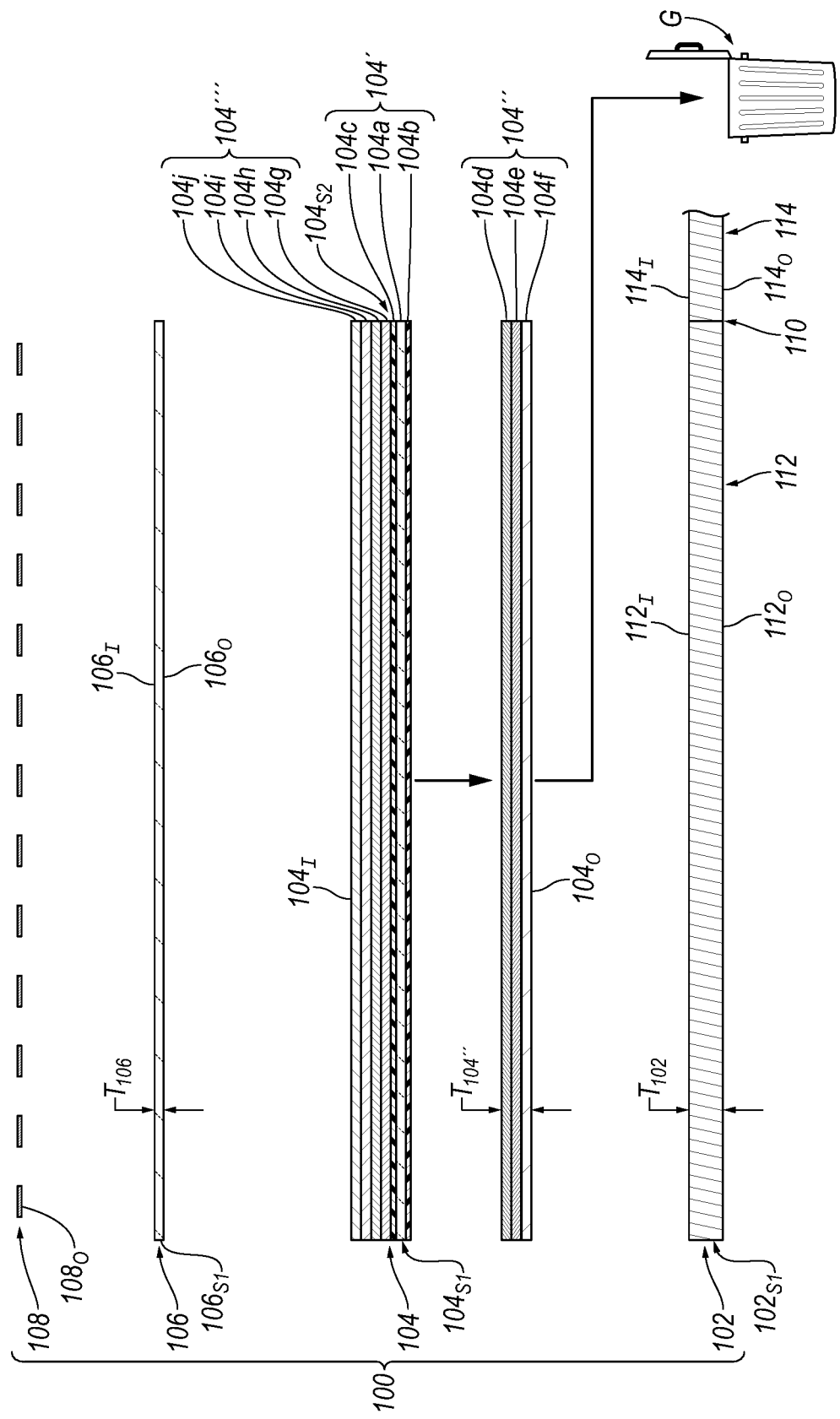
FIG. 2A is a cross-sectional view of the plurality of exemplary workpiece layers of material according to line 2A-2A of FIG. 2.

A method for forming the OEM single substrate workpiece assembly 100a is now described. Referring to FIGS. 2 and 2A, a first step in the process of forming the OEM single substrate workpiece assembly 100a includes modifying the outer surface $104_O$ of the dual-sided adhesive layer assembly 104 by peeling or removing the first removable liner portion 104" (see, e.g., FIG. 2A) from the first adhesive layer 104b of the core portion 104'. Accordingly, as seen at FIG. 2A, during the manufacture of the OEM single substrate workpiece assembly 100a, the first removable liner portion 104" is a temporary layer of the dual-sided adhesive layer assembly 104 that, once removed, subsequently discarded in a refuse receptacle G.

Referring to FIGS. 2-3 and 2A-3A, after the first removable liner portion 104" is removed from the first adhesive layer 104b of the dual-sided adhesive layer assembly 104, the first adhesive layer 104b of the dual-sided adhesive layer assembly 104 is exposed. As seen at FIGS. 3 and 3A, the fully exposed first adhesive layer 104b of the dual-sided adhesive layer assembly 104 is then non-removably-attached to the inner surface $112_I$ of the front cover panel 112 of the first substrate layer 102. Upon non-removably-attaching the first adhesive layer 104b of the dual-sided adhesive layer assembly 104 to the inner surface $112_I$ of the front cover panel 112 of the first substrate layer 102, the OEM single substrate workpiece assembly 100a may be said to be formed.

The OEM single substrate workpiece assembly 100a may be obtained or purchased by an end user at a brick-and-mortar retailer, online, or the like. In some instances, the OEM single substrate workpiece assembly 100a may be packaged in a bag, container, or the like (not shown). The bag, container, or the like may maintain the quality of the OEM single substrate workpiece assembly 100a after manufacture thereof until the bag, container, or the like is obtained by an end user. Once received by the end user, the end user may rupture the bag, container, or the like in order to remove the OEM single substrate workpiece assembly 100a from the bag, container, or the like.

With reference to FIGS. 3-4 and 3A-4A, the end user may obtain or prepare the trim substrate workpiece assembly 100b. As will be described in the following disclosure, the trim substrate workpiece assembly 100b may be utilized for decorating or modifying, in an aesthetically-pleasing manner, the first substrate layer 102.

The trim substrate workpiece assembly 100b includes one or more second substrate layers 106 and, optionally, the second substrate layer design portion 108. The second substrate layer 106 may be any desirable material (e.g., a paper material, a coated cardstock material, a plastic material, a polyethylene terephthalate (PET) material, a foil acetate material, a metallic material, or the like). If the second substrate layer 106 is formed from a plastic material, in some instances, the plastic material may be transparent or opaque. In other examples, the second substrate layer 106 is formed from a material having one or more colors, design elements (e.g., patterns, text, or other visual markings, embossments, debossments, or the like).

In some configurations, the optional second substrate layer design portion 108 may be an ink, dye, paint, or the like. The ink, dye, paint, or the like defining the second substrate layer design portion 108 may be printed (by a printer, not shown), dyed, sublimated (by a sublimating device, not shown), or brushed upon (with a brush, not shown) or arranged within the second substrate layer 106. In some implementations, the second substrate layer design portion 108 may form the one or more colors, design elements (e.g., patterns, text, or other visual markings, embossments, debossments, or the like) of the second substrate layer 106.

In other configurations, the second substrate layer design portion 108 may be one or more stickers, decals, shaped plastic portions (e.g., artificial jewelry, artificial gemstones), or the like. In yet other configurations, the second substrate layer design portion 108 may be glitter. In some configurations, the second substrate layer design portion 108 may include a combination of the ink, dye, paint, one or more stickers, decals, shaped plastic portions, glitter, or the like.

In some instances, the second substrate layer design portion 108 is optionally deposited upon, attached to, or otherwise joined to the inner surface $106_I$ of the second substrate layer 106. In some implementations, the second substrate layer design portion 108 is optionally deposited upon, attached to, or otherwise joined to the outer surface $106_O$ of the second substrate layer 106. In other implementations, the second substrate layer design portion 108 is optionally deposited upon, attached to, or otherwise joined to both of the inner surface $106_I$ of the second substrate layer 106 and the outer surface $106_O$ of the second substrate layer 106. In yet other implementations, the second substrate layer design portion 108 is optionally deposited upon, attached to, or otherwise joined to the inner surface $106_I$ of the second substrate layer 106 but not the outer surface $106_O$ of the second substrate layer 106. In other examples, the second substrate layer design portion 108 is optionally impregnated into at least a portion of the thickness $T_{106}$ of the second substrate layer 106.

After the trim substrate workpiece assembly 100b is formed, with reference to FIGS. 5-7 and 5A-7A, a method of forming the user-assembled multi-substrate workpiece assembly 100c is shown. Functionally, the trim substrate workpiece assembly 100b permits the end user to decorate or customize the appearance of the OEM single substrate workpiece assembly 100a by removably attaching the trim substrate workpiece assembly 100b to the first substrate layer 102 (by way of the core portion 104' of the dual-sided adhesive layer assembly 104) of the OEM single substrate workpiece assembly 100a.

As seen at FIGS. 5 and 5A, a first step in the process of forming the user-assembled multi-substrate workpiece assembly 100c is the removal of the second removable liner portion 104''' of the dual-sided adhesive layer assembly 104 from the second adhesive layer 104c of the core portion 104' of the dual-sided adhesive layer assembly 104 of the OEM single substrate workpiece assembly 100a. Once the second removable liner portion 104''' is removed from the core portion 104', the second removable liner portion 104''' is subsequently discarded in a refuse receptacle G.

Figure 6:
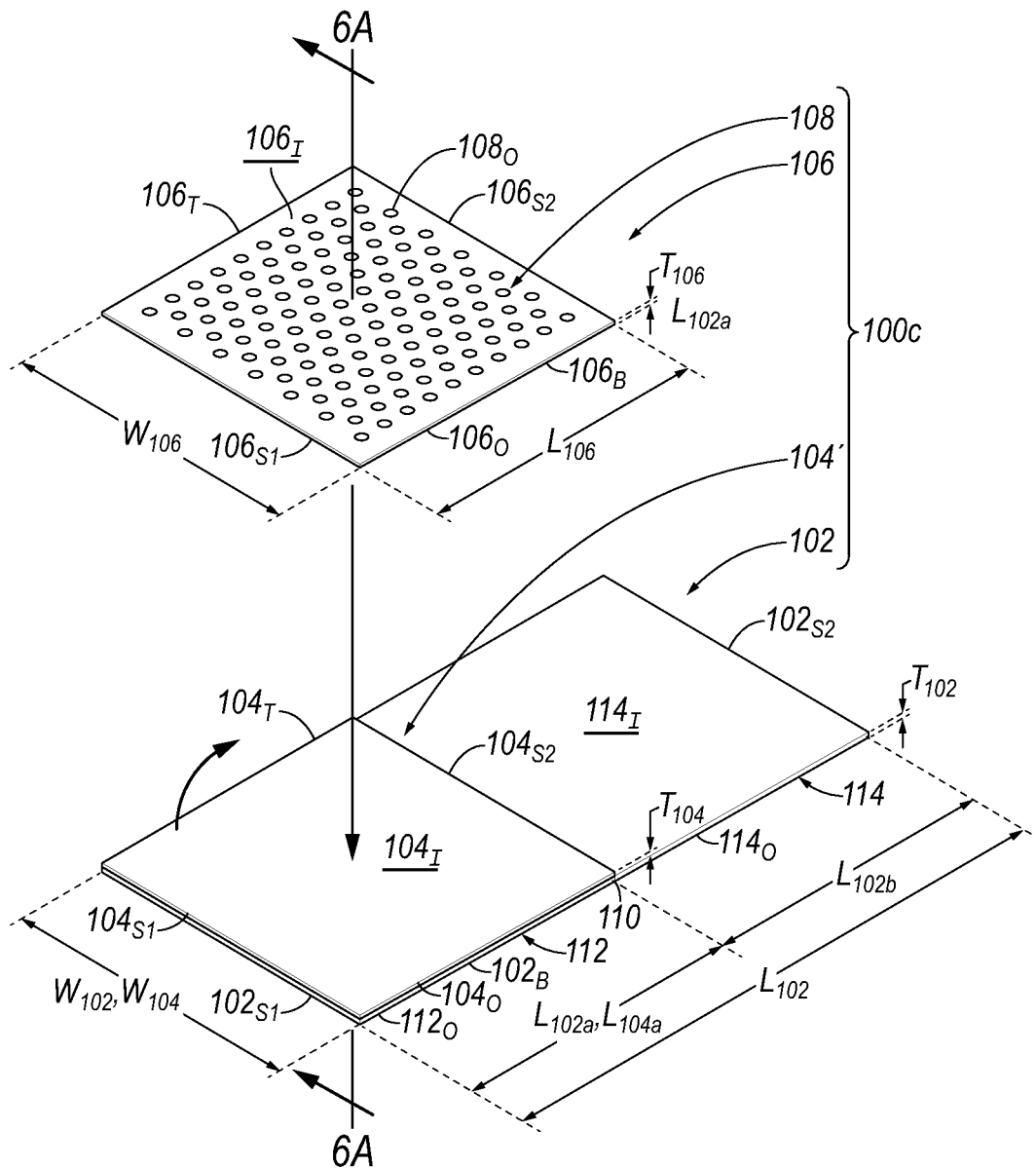
FIG. 6 is another exploded perspective view of some of the plurality of workpiece layers of material of FIG. 1 illustrating a second step for forming the user-assembled multi-substrate workpiece assembly including arranging the trim substrate workpiece assembly over the second adhesive sub-layer of the dual-sided adhesive layer.
Figure 6A:
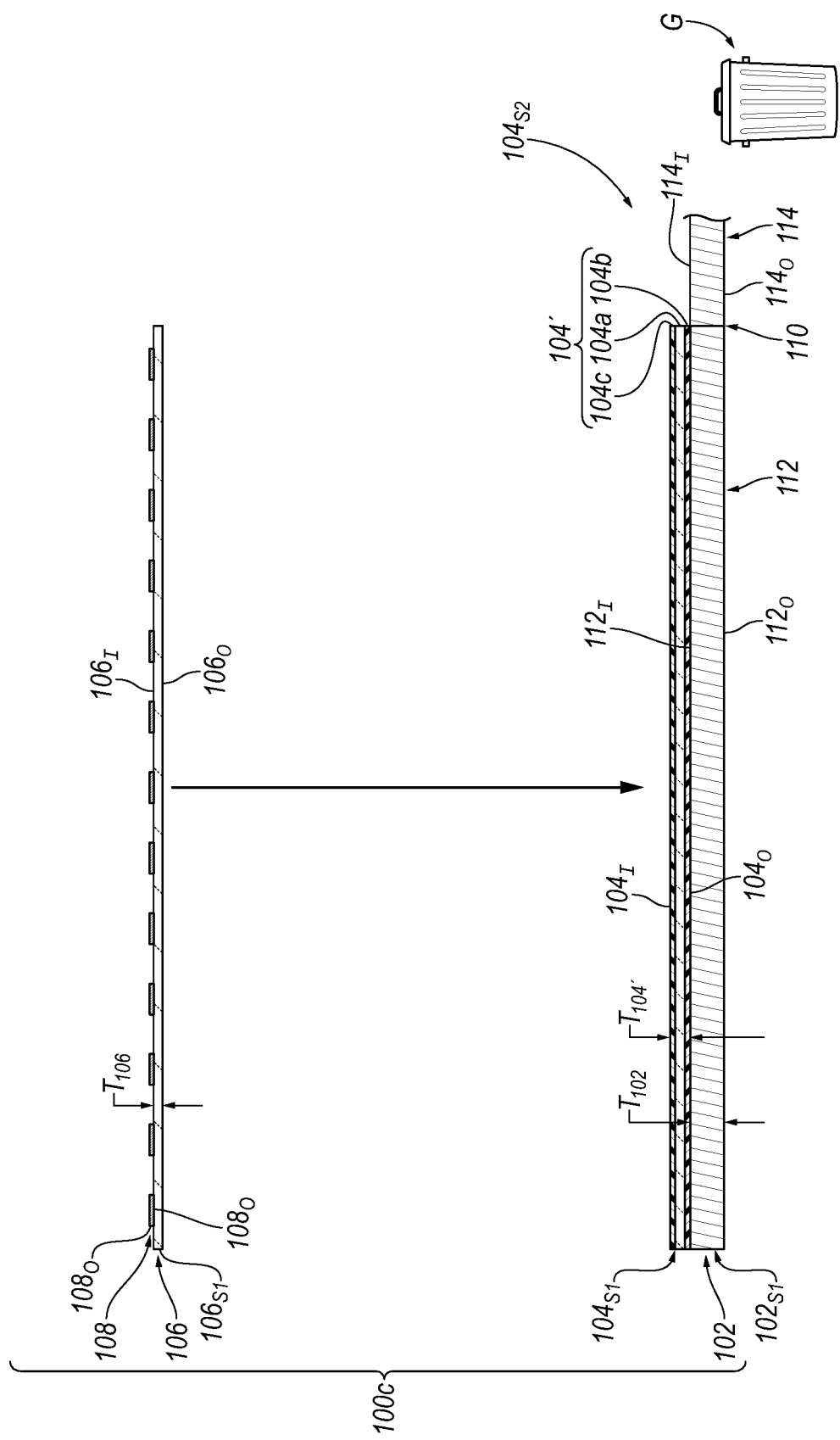
FIG. 6A is a cross-sectional view of some of the plurality of exemplary workpiece layers of material according to line 6A-6A of FIG. 6.

With reference to FIGS. 6 and 6A, once the second removable liner portion 104''' is fully removed from the core portion 104' of the dual-sided adhesive layer assembly 104, the second adhesive layer 104c of the core portion 104' of the dual-sided adhesive layer assembly 104 is fully exposed to surrounding atmosphere. Thereafter, the outer surface $106_O$ of the second substrate layer 106 of the trim substrate workpiece assembly 100b is aligned with the fully exposed second adhesive layer 104c of the core portion 104' of the dual-sided adhesive layer assembly 104.

As seen at FIGS. 7 and 7A, the outer surface $106_O$ of the second substrate layer 106 of the trim substrate workpiece assembly 100b is removably-attached to the second adhesive layer 104c of the core portion 104' of the dual-sided adhesive layer assembly 104 for forming the user-assembled multi-substrate workpiece assembly 100c. Unlike the non-removable-attachment of the first adhesive layer 104b of the dual-sided adhesive layer assembly 104 to the inner surface $112_I$ of the front cover panel 112 of the first substrate layer 102 as described above for forming the OEM single substrate workpiece assembly 100a (arising from the "permanent" quality of the glue compound defining the first adhesive layer 104b of the core portion 104' of the dual-sided adhesive layer assembly 104), the removable-attachment of the outer surface $106_O$ of the second substrate layer 106 of the trim substrate workpiece assembly 100b to the second adhesive layer 104c of the core portion 104' of the dual-sided adhesive layer assembly 104 permits the end user to remove and reposition the second substrate layer 106 relative of the second adhesive layer 104c of the core portion 104' of the dual-sided adhesive layer assembly 104, as desired, due to the "non-permanent" quality of the glue compound defining the second adhesive layer 104c. Furthermore, although each of the first adhesive layer 104b and the second adhesive layer 104c of the core portion 104' are respectively formed from a glue compound having, respectively, a "permanent" quality and a "non-permanent" quality, when any adjacently-attached layer (e.g., the first removable liner portion 104'', the second removable liner portion 104''', or the second substrate layer 106) is removed therefrom, the first adhesive layer 104b and the second adhesive layer 104c will remain attached to the carrier layer 104a of the core portion 104' of the dual-sided adhesive layer assembly 104.

Figure 8:
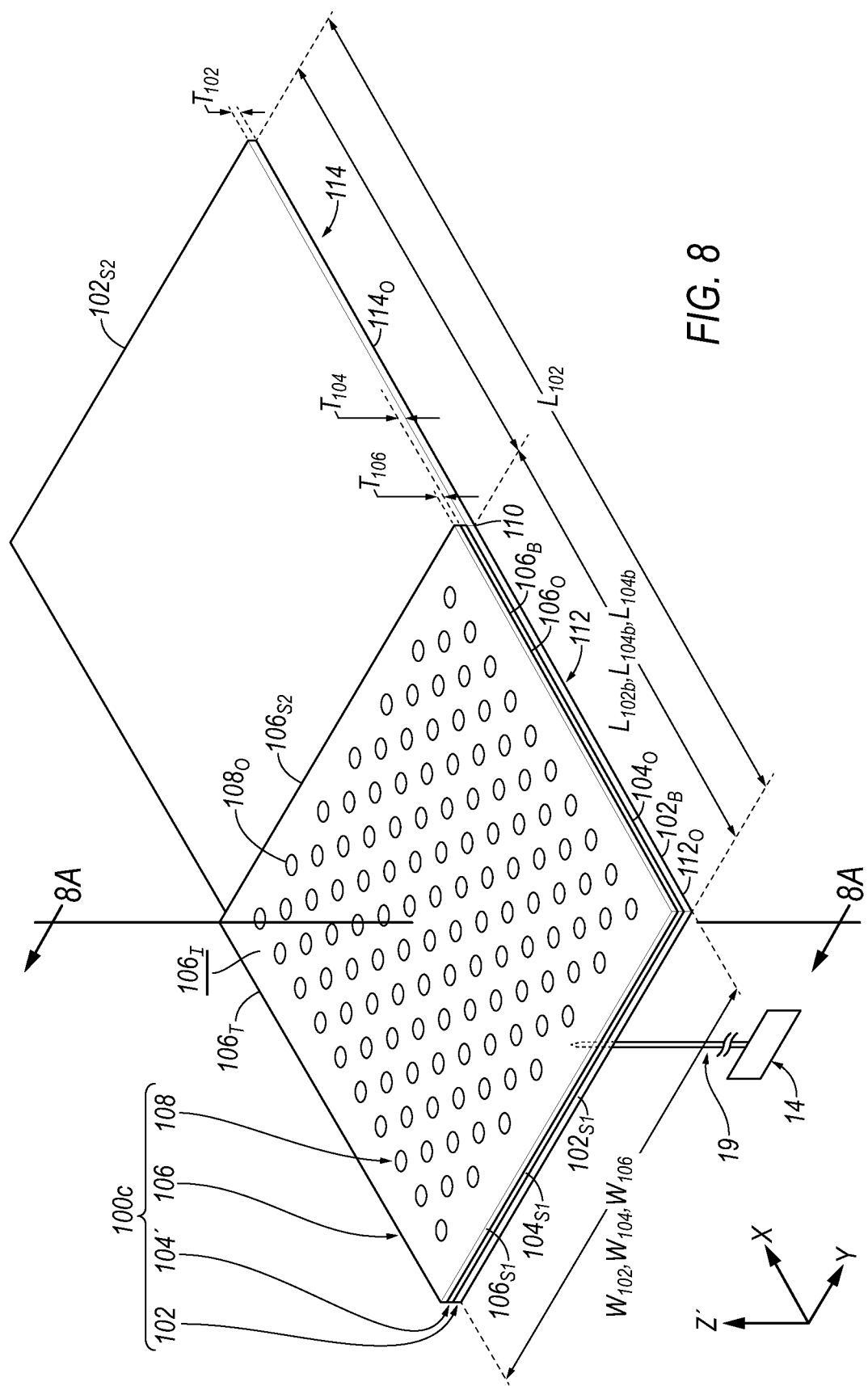
FIG. 8 is a perspective view of the user-assembled multi-substrate workpiece assembly of FIG. 7 in a virgin, non-cut-and-non-weeded state showing a cutting device arranged proximate a second surface of the first substrate layer of the user-assembled multi-substrate workpiece assembly.
Figure 8A:
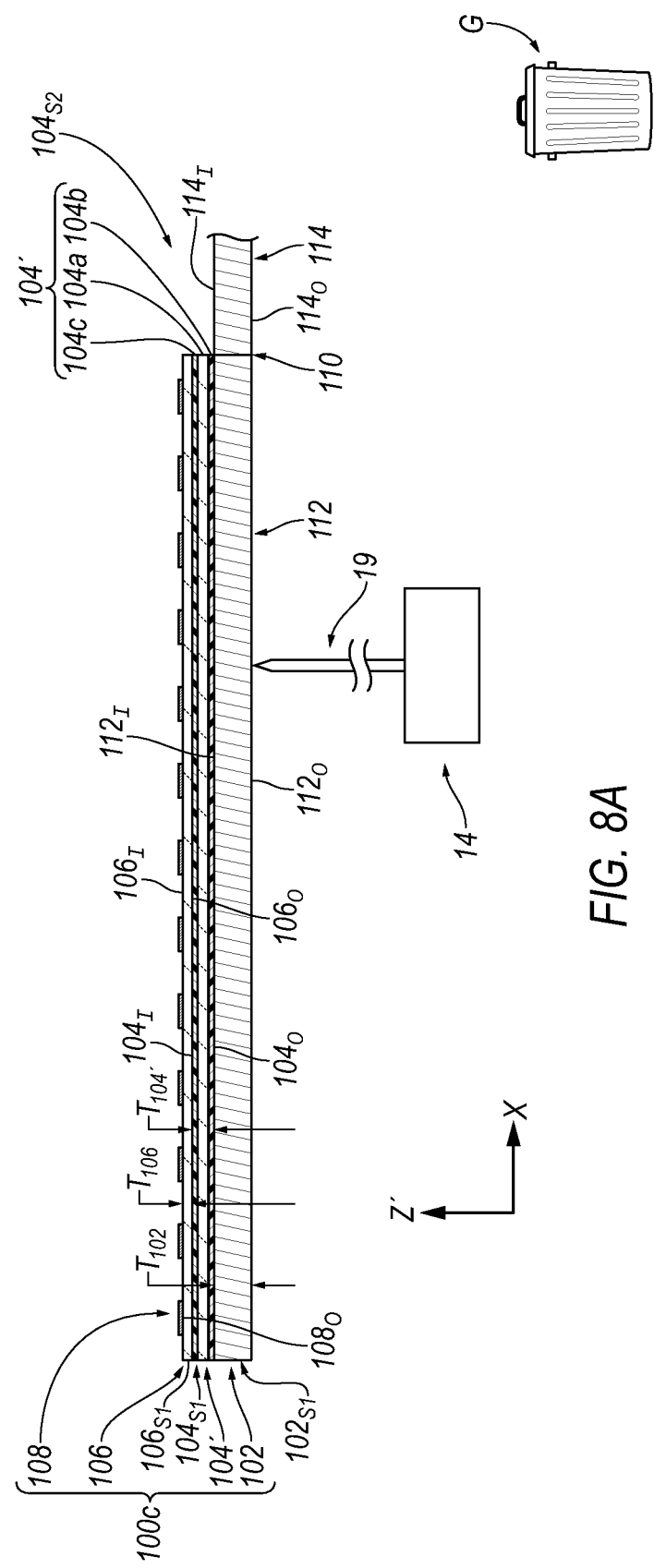
FIG. 8A is a cross-sectional view of some of the plurality of exemplary workpiece layers of material according to line 8A-8A of FIG. 8.
Figure 9:
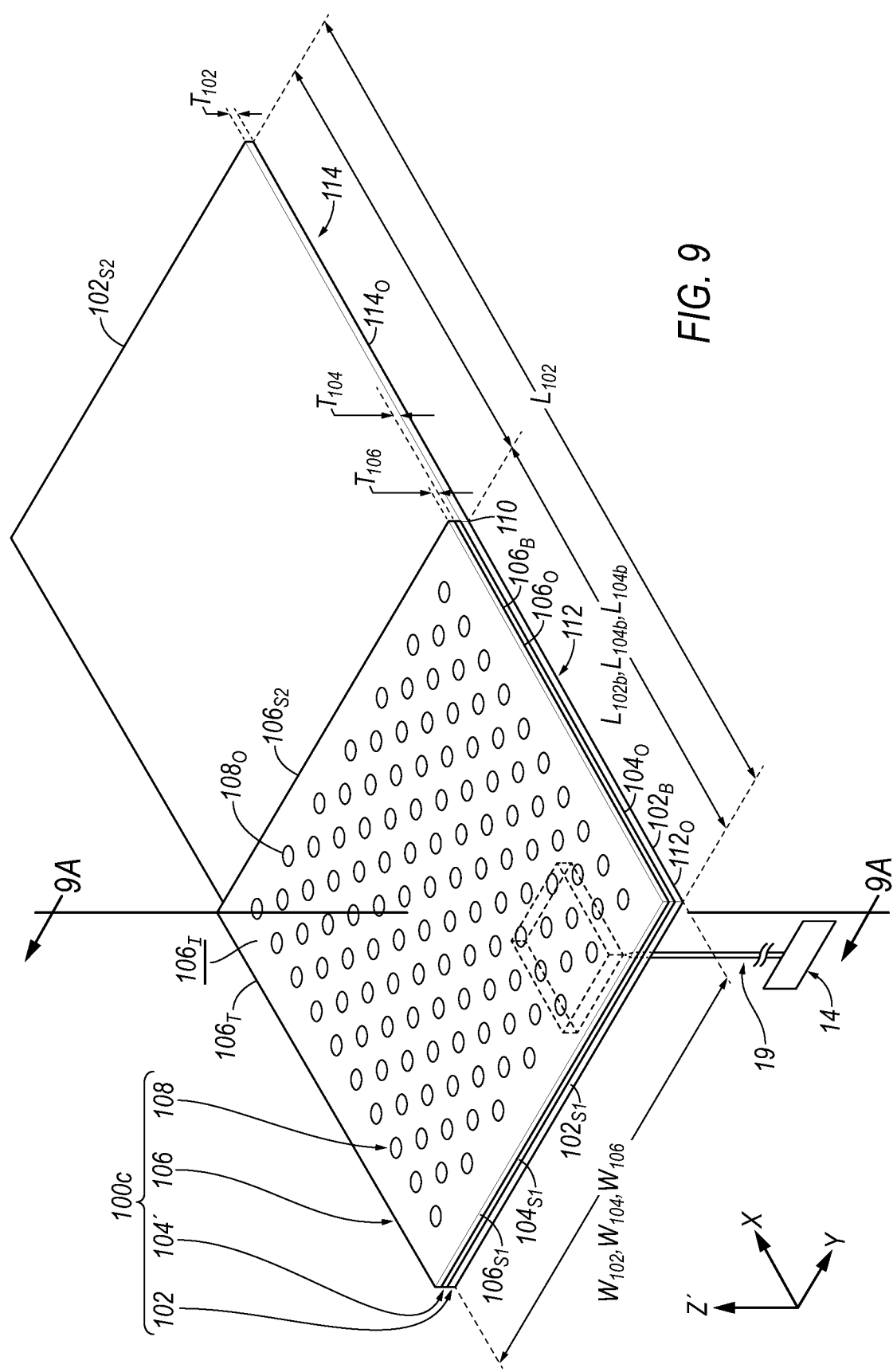
FIG. 9 is a perspective view of the user-assembled multi-substrate workpiece assembly of FIG. 8 in a non-virgin, cut-and-non-weeded state showing a portion of the first substrate layer and a portion of the dual-sided adhesive layer of the user-assembled multi-substrate workpiece assembly defining a cutout portion having been cut by the cutting device.
Figure 9A:
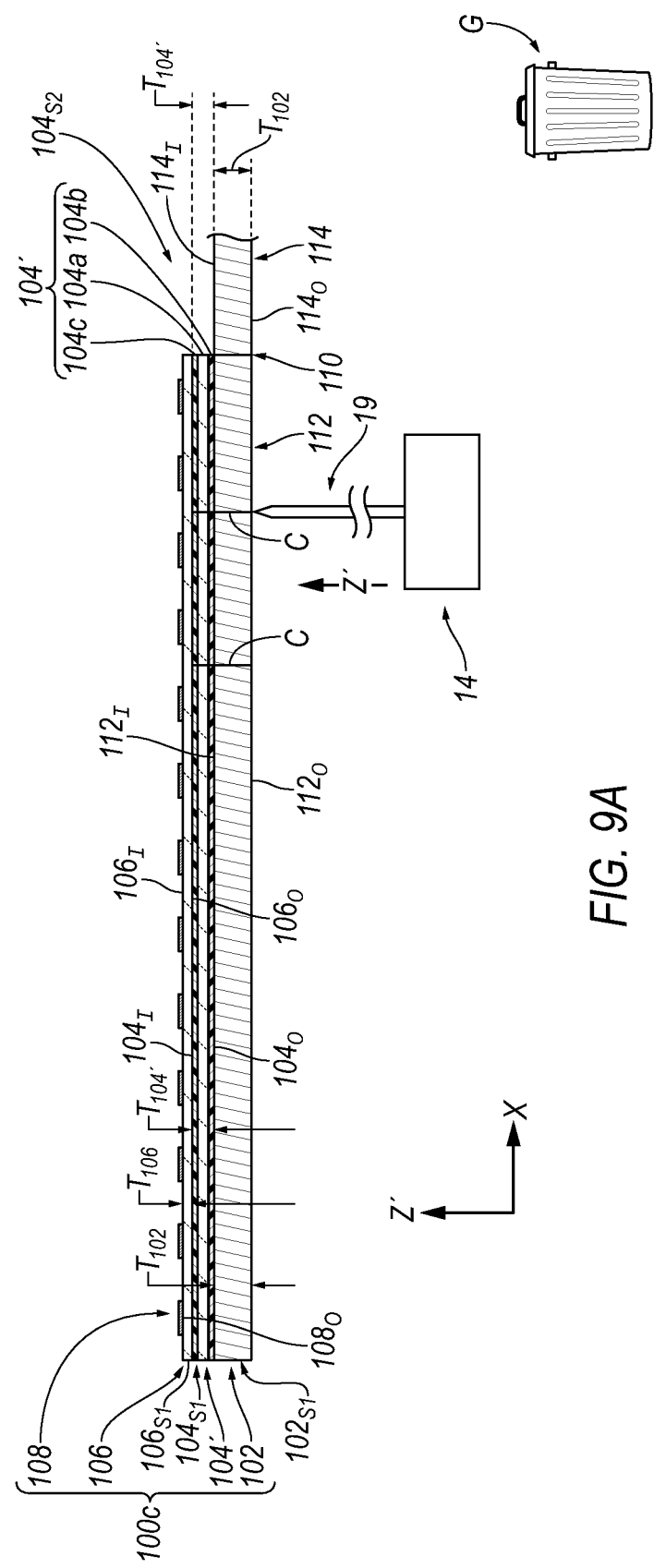
FIG. 9A is a cross-sectional view of some of the plurality of exemplary workpiece layers of material according to line 9A-9A of FIG. 9.

With reference to FIGS. 8-11 and 8A-11A, a method of forming the user-crafted multi-substrate workpiece assembly 100d is shown. With reference initially to FIGS. 8 and 8A, a device (e.g., a tool 19) may be utilized for conducting "work" on the user-assembled multi-substrate workpiece assembly 100c. As seen at FIG. 9A, the "work" that is conducted may include, for example, utilizing the tool 19 for partially or fully penetrating a combined thickness (see, e.g., $T_{102}+T_{104'}$ at FIGS. 8A-11A) defined by the thickness $T_{102}$ of the first substrate layer 102 and the thickness $T_{104'}$ of the core portion 104' of the dual-sided adhesive layer assembly 104 according to the direction of the arrow Z' (see, e.g., the X-Y-Z Cartesian coordinate system at FIGS. 8-11). The act of partially or fully penetrating the combined thickness $T_{102}+T_{104}$ defines a cut pattern that forms a perimeter P (see, e.g., FIG. 10) of a cutout portion $100c_P$ (see, e.g., FIGS. 10A and 11A) of the user-assembled multi-substrate workpiece assembly 100c. The cut pattern that forms the perimeter P may define one or more passageways 116 (see, e.g., FIGS. 11 and 11A) of the user-crafted multi-substrate workpiece assembly 100d, thereby providing the user-crafted multi-substrate workpiece assembly 100d with a die-cut pattern. Accordingly, in some implementations, the die-cut pattern may provide the user-crafted multi-substrate workpiece assembly 100d with, for example, as seen at FIG. 25, a design, text (e.g., "Hi!", "Happy Birthday", "Thinking Of You"), or the like.

The tool 19 may include a blade (such as, e.g., a straight blade, a castoring blade, a rotary blade, a serrated edge blade, an embossing tool, a marking tool or the like). In some instances, the tool 19 may be a hand-held tool, or, alternatively, is attached to a carriage 14 (see, e.g., FIGS. 8 and 8A). In some examples, the carriage 14 may be a component of a cutting machine 10 (see, e.g., FIG. 12). As will be explained in the following disclosure, the carriage 14 may move or drive movement of the tool 19 in the X-Y-Z Cartesian coordinate system.

Figure 10A:
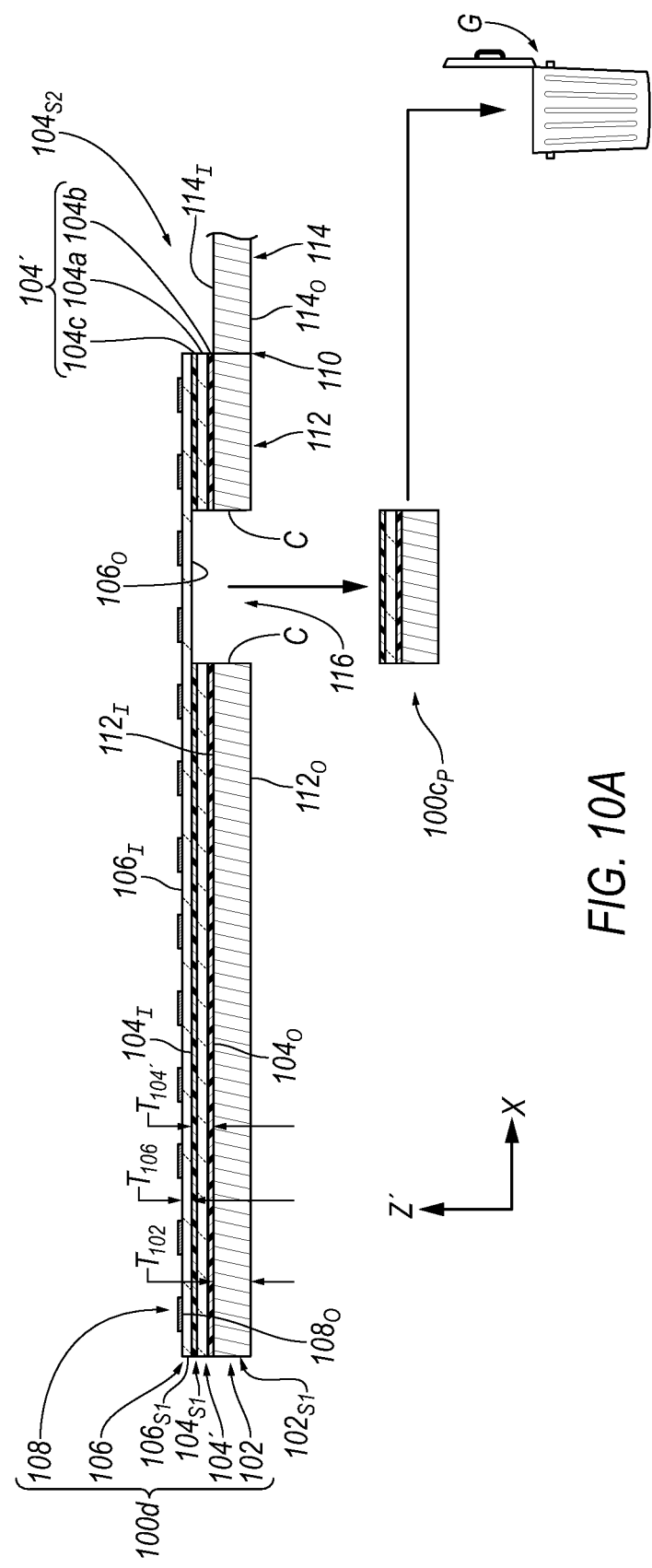
FIG. 10A is a cross-sectional view of some of the plurality of exemplary workpiece layers of material according to line 10A-10A of FIG. 10.
Figure 11:
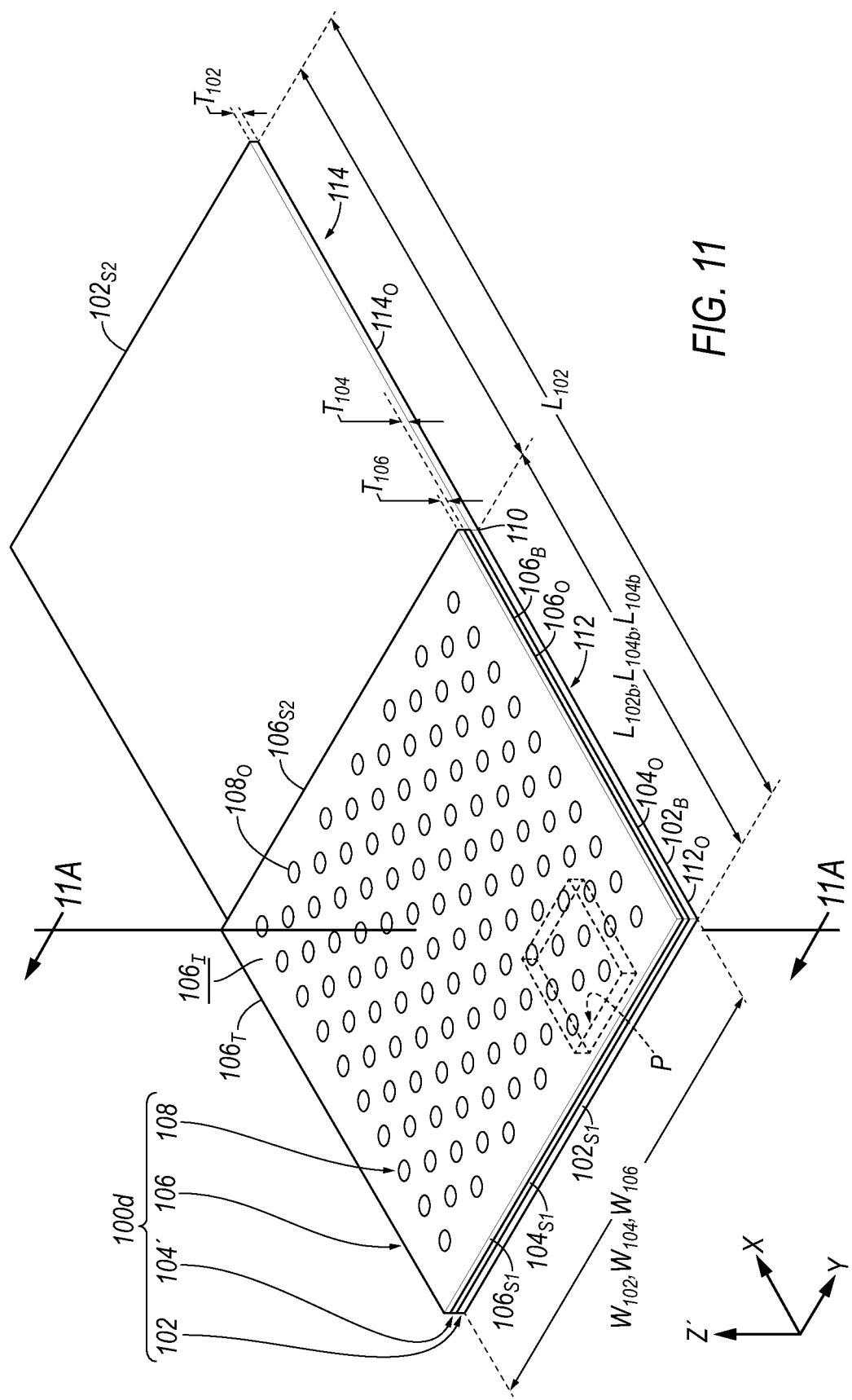
FIG. 11 is a perspective view of a user-crafted multi-substrate workpiece assembly of FIG. 10 in a non-virgin, cut-and-weeded state showing the cutout portion removed from the user-assembled multi-substrate workpiece assembly of FIG. 10.
Figure 11A:
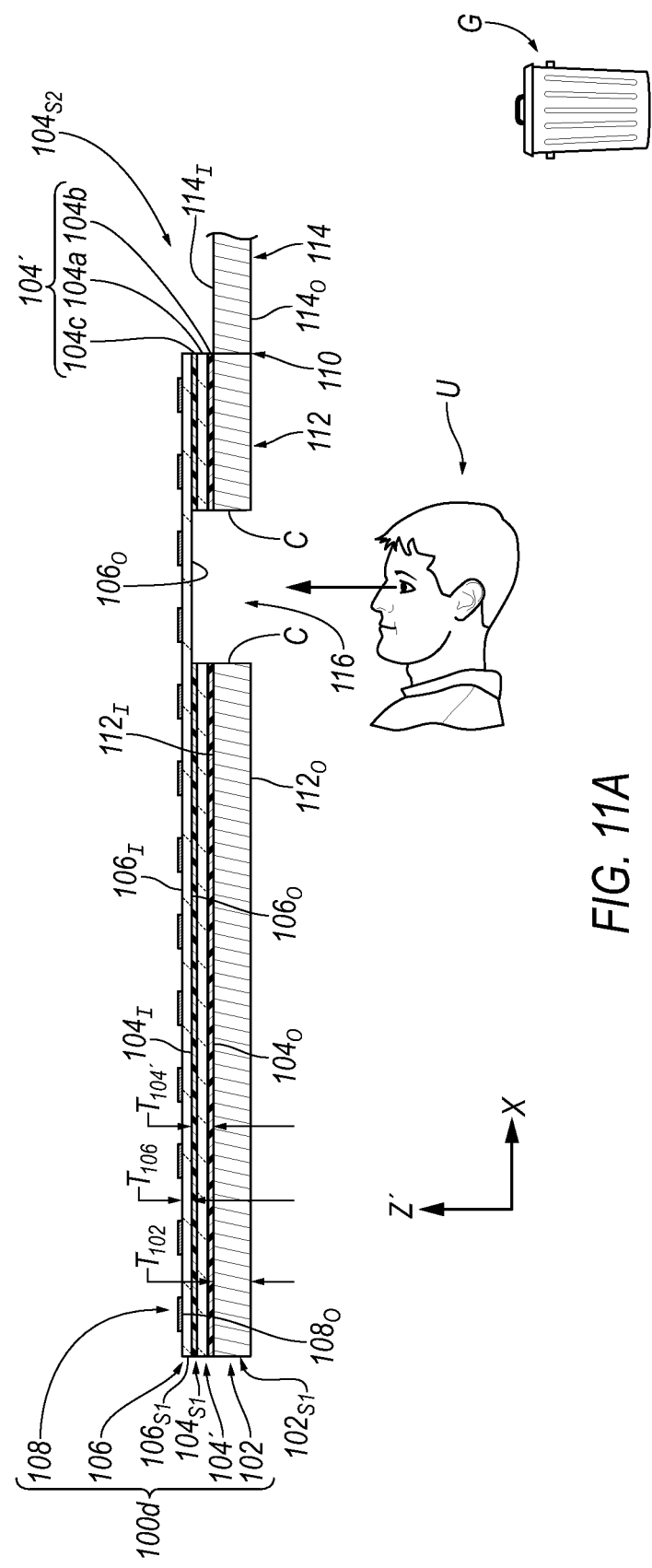
FIG. 11A is a cross-sectional view of some of the plurality of exemplary workpiece layers of material according to line 11A-11A of FIG. 11.

With reference to FIGS. 10A and 11A, the tool 19 may be configured to only be plunged (according to the direction of the arrow Z' at FIG. 9A with respect to the X-Y-Z Cartesian coordinate system) at a distance less than or equal to the combined thickness $T_{102}+T_{104'}$. Accordingly, as seen at FIGS. 10A and 11A, in some implementations, the tool 19 does not contact, penetrate, or otherwise disrupt the thickness $T_{106}$ of the second substrate layer 106 of the trim substrate workpiece assembly 100b.

In other implementations, the tool 19 may contact the outer surface $106_O$ of the second substrate layer 106 of the trim substrate workpiece assembly 100b. However, in such exemplary implementations, the second substrate layer 106 may be defined by a material that resists any deformation imparted to the outer surface $106_O$ of the second substrate layer 106 by the tool 19. Therefore, the second substrate layer 106 of the trim substrate workpiece assembly 100b may be defined by a harder material than that of the first substrate layer 102 and the core portion 104' of the dual-sided adhesive layer assembly 104.

Referring to FIGS. 10 and 10A, after the perimeter P that defines the cutout portion $100c_P$ of the user-assembled multi-substrate workpiece assembly $100c$ is formed (by, e.g., moving or driving the tool 19 in the X-Y-Z Cartesian coordinate system relative the user-assembled multi-substrate workpiece assembly $100c$), the end user may remove (i.e., "weed") the cutout portion $100c_P$ of the user-assembled multi-substrate workpiece assembly $100c$. Once the cutout portion $100c_P$ is removed from the remainder of the user-assembled multi-substrate workpiece assembly $100c$, the cutout portion $100c_P$ is subsequently discarded in a refuse receptacle G. Thereafter, as seen at FIGS. 11 and 11A, the remainder of the user-assembled multi-substrate workpiece assembly $100c$ defines the user-crafted multi-substrate workpiece assembly $100d$.

With reference to FIG. 11A, a region that was previously occupied by the cutout portion $100c_P$ may define the one or more passageways 116 extending through the combined thickness $T_{102}+T_{104'}$ of the first substrate layer 102 and the core portion 104' of the dual-sided adhesive layer assembly 104. Accordingly, if the second substrate layer 106 of the trim substrate workpiece assembly $100b$ is defined by a transparent material, an end user U viewing the user-crafted multi-substrate workpiece assembly $100d$ in a direction from the outer surface $112_O$ of the front cover panel 112 of the first substrate layer 102 may be permitted to look though not only the one or more passageways 116 but also the thickness disrupt the thickness $T_{106}$ of the second substrate layer 106 of the trim substrate workpiece assembly $100b$. Therefore, the end user U may be permitted to view at least a portion of the second substrate layer design portion 108 that is, for example: (1) optionally attached to, for example, the inner surface $106_I$ of the second substrate layer 106; or (2) optionally impregnated within at least a portion of the thickness $T_{106}$ of the second substrate layer 106 of the trim substrate workpiece assembly $100b$.

Referring now to FIGS. 12-23, a method for interfacing a user-assembled multi-substrate workpiece assembly $100c$ with a cutting machine 10 is described. Furthermore, a method for "weeding" (see, e.g., FIGS. 24 and 24A) a cutout portion $100c_P$ of the user-assembled multi-substrate workpiece assembly $100c$ (that was interfaced with the cutting machine 10) for forming a user-crafted multi-substrate workpiece assembly $100d$ (see, e.g., FIG. 25), which may be a "greeting card" is also described.

Figure 12:
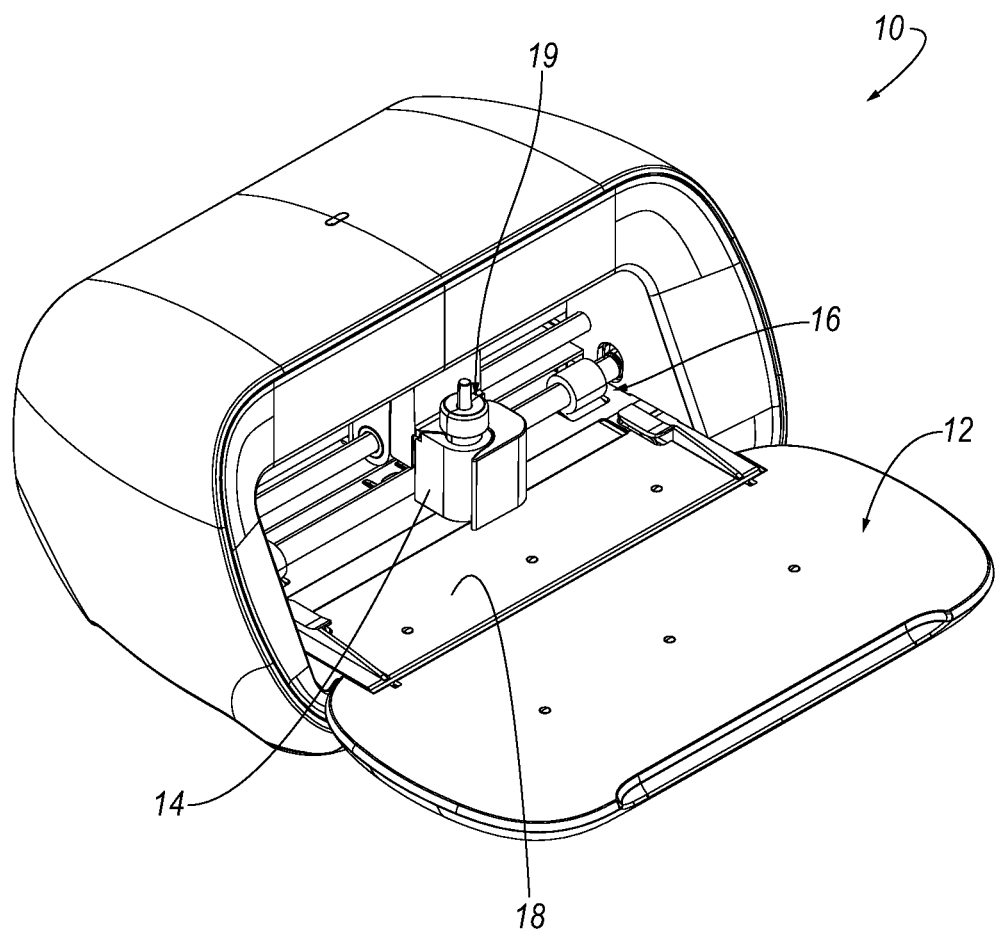
FIG. 12 illustrates a perspective view of a miniaturized cutting machine with the door open to receive material, according to the principles of the present disclosure.
Figure 13:
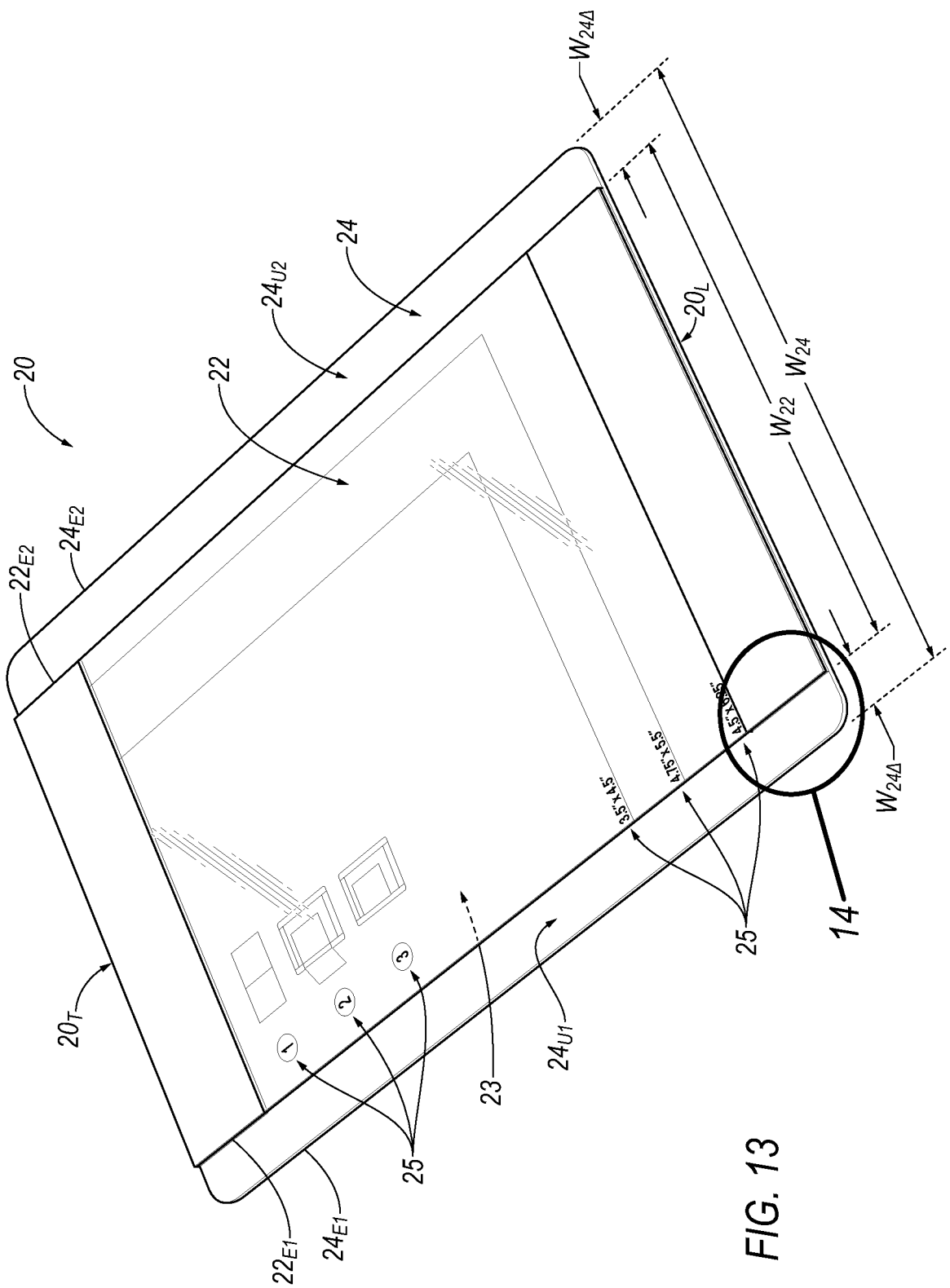
FIG. 13 is a perspective view of an exemplary workpiece support material that is configured for receiving a workpiece and being collectively received by the cutting machine of FIG. 12.
Figure 16A:
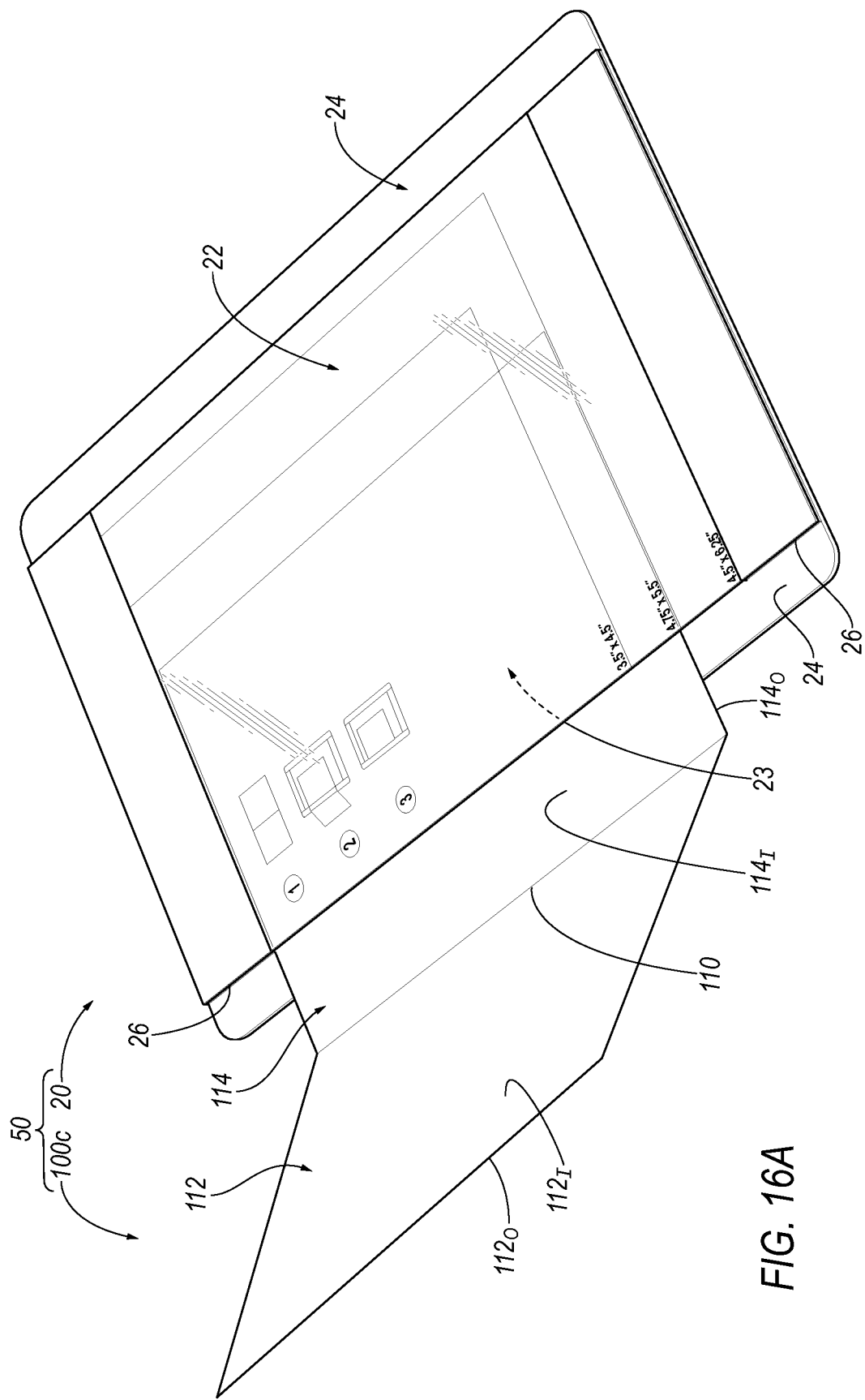
FIG. 16A is a perspective view of an exemplary workpiece defined by an exemplary user-assembled multi-substrate workpiece assembly interfaced with, and arranged in a first orientation with respect to, the workpiece support material of FIG. 13, according to the principles of the present disclosure.
Figure 16B:
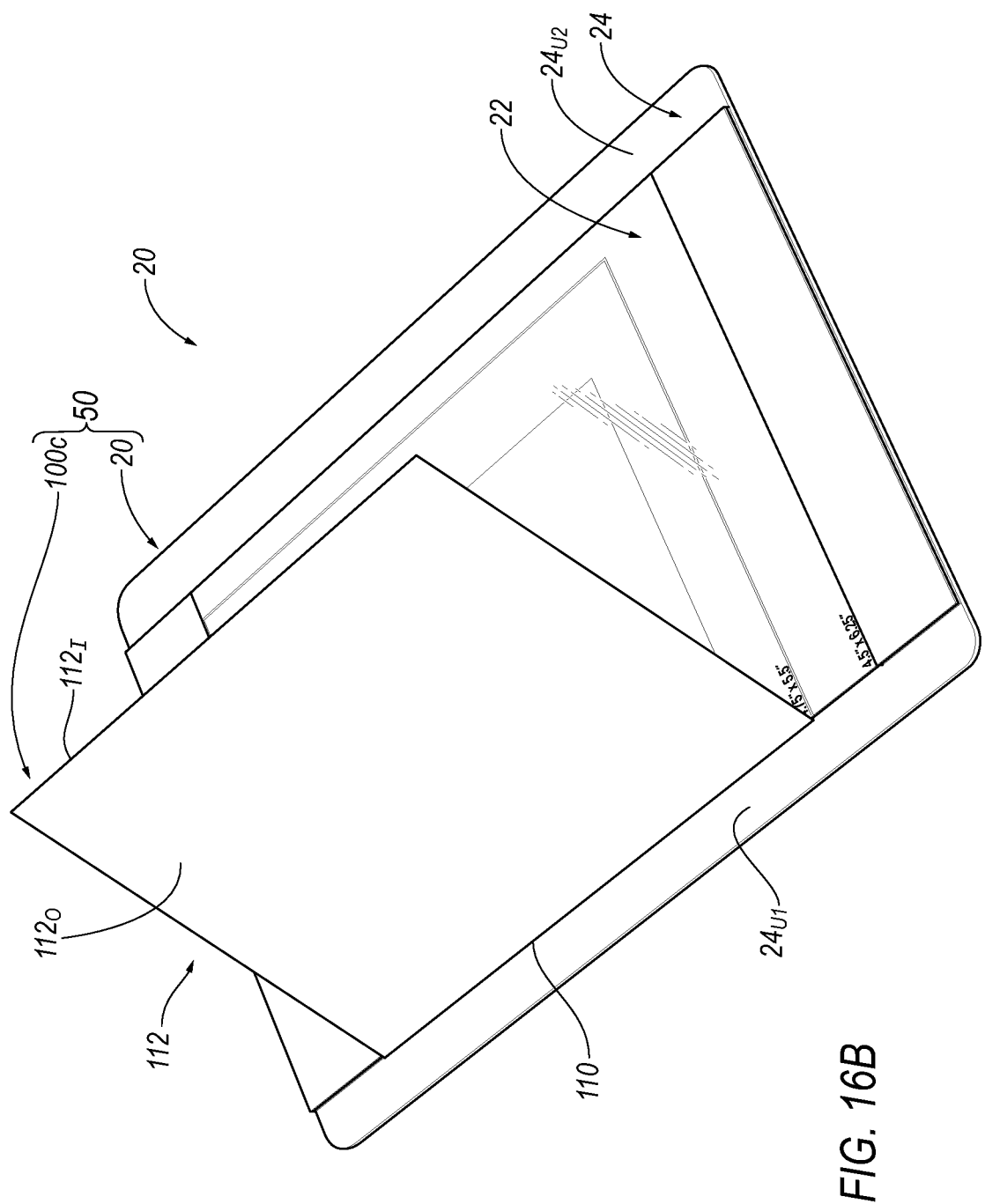
FIG. 16B is a perspective view of the user-assembled multi-substrate workpiece assembly of FIG. 16A further interfaced with, and arranged in a second orientation with respect to, the workpiece support material, according to the principles of the present disclosure.
Figure 16C:
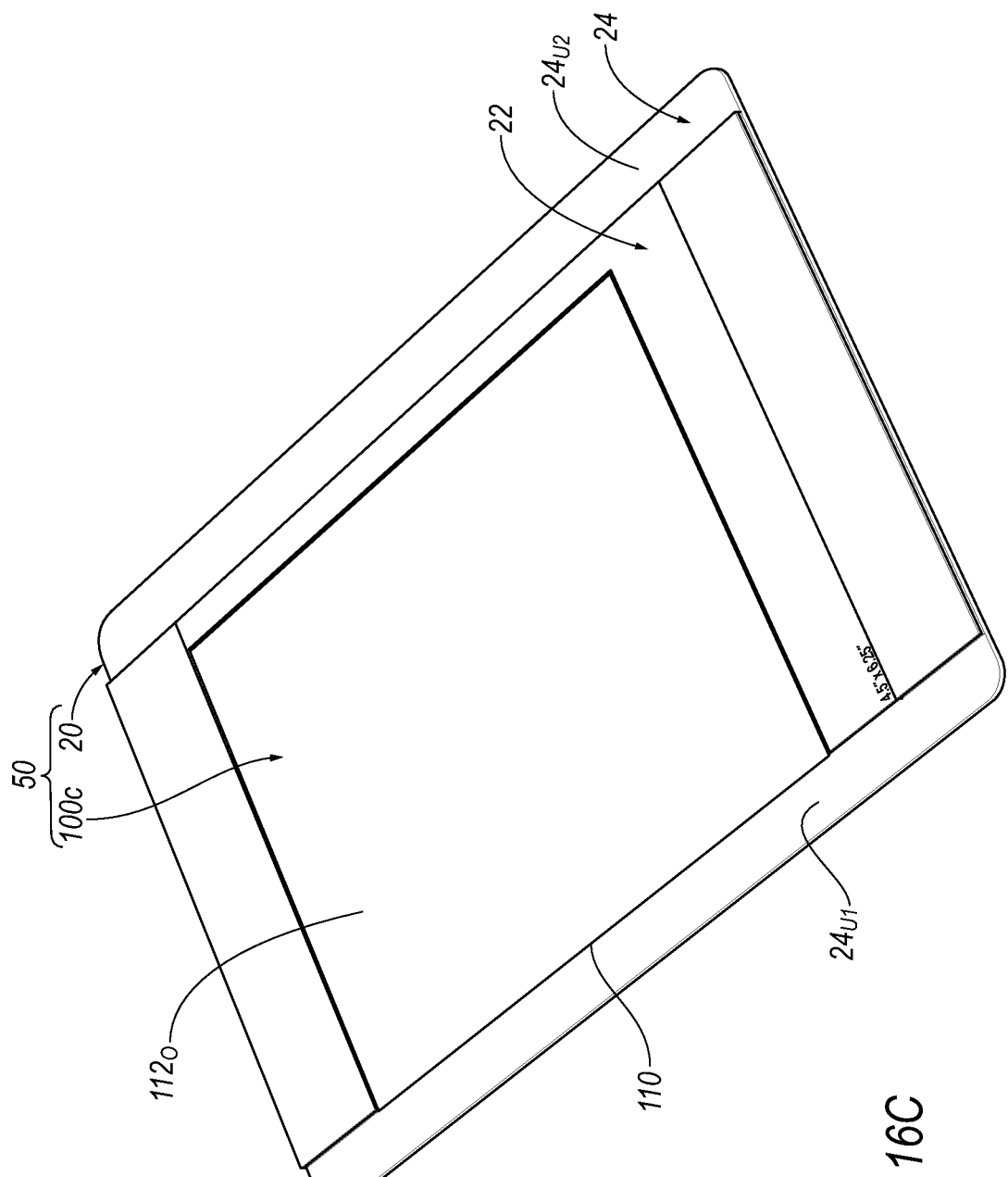
FIG. 16C is a perspective view of the user-assembled multi-substrate workpiece assembly of FIG. 16B further interfaced with, and arranged in a third orientation with respect to, the workpiece support material, according to the principles of the present disclosure.

As seen in FIG. 12, the cutting machine 10 includes a door 12 that is configured for arrangement in an open orientation in order to allow a workpiece 50 (e.g., FIG. 16A), which may include, collectively, a workpiece support material 20 of FIG. 13 and the user-assembled multi-substrate workpiece assembly $100c$ seen at FIGS. 16A-16C, to be inserted into the cutting machine 10. The door 12 may be selectively opened and closed via a hinge mechanism (not shown) where the door 12 connects to the cutting machine 10. The cutting machine 10 may also include various internal cutting components, such as, for example, the carriage 14, the tool 19, and a roller assembly 16.

As seen at FIG. 12, the cutting machine also define a working surface 18, a portion of which may define an upwardly-facing surface of the door 12 when the door 12 is arranged in an open configuration. The working surface 18 may provide a surface on which one or both of the user-assembled multi-substrate workpiece assembly $100c$ and the workpiece support material 20 (and/or other implements, such as, for example, other cutting mats) can rest when fed forward and/or backward through the cutting machine 10 by the roller assembly 16. As, for example, one or both of the user-assembled multi-substrate workpiece assembly $100c$ and the workpiece support material 20 is fed forward-and-backward by the roller assembly 16, the carriage 14, which manipulates the tool 19 upwardly-and-downwardly relative to the working surface 18, can move back-and-forth laterally across one or both of the user-assembled multi-substrate workpiece assembly $100c$ and the workpiece support material 20 (and/or other implements, such as, for example, other cutting mats) in order to conduct work on or alter the user-assembled multi-substrate workpiece assembly $100c$.

One or both of the user-assembled multi-substrate workpiece assembly $100c$ and the workpiece support material 20 that is/are fed into the cutting machine 10 may be worked upon or altered in a number of ways, depending on, for example, the type of the tool 19 that may be removably-interfaced with the carriage 14. For example, in some configurations, the tool 19 may include a cutting blade, a scoring tool, an ink pen/marker, or other tools that may be associated with creating arts-and-crafts projects. The workpiece support material 20 disclosed herein is configured to be fed into a machine such as cutting machine 10 illustrated in FIG. 12, as well as other home-use electronic cutting machines. In addition, workpiece support material 20 of the present disclosure is configured to be used without a cutting machine, where a user can alter the material 20 by hand using handheld cutting blades, pens/markers, scoring tools, or other handheld crafting tools.

Figure 20:
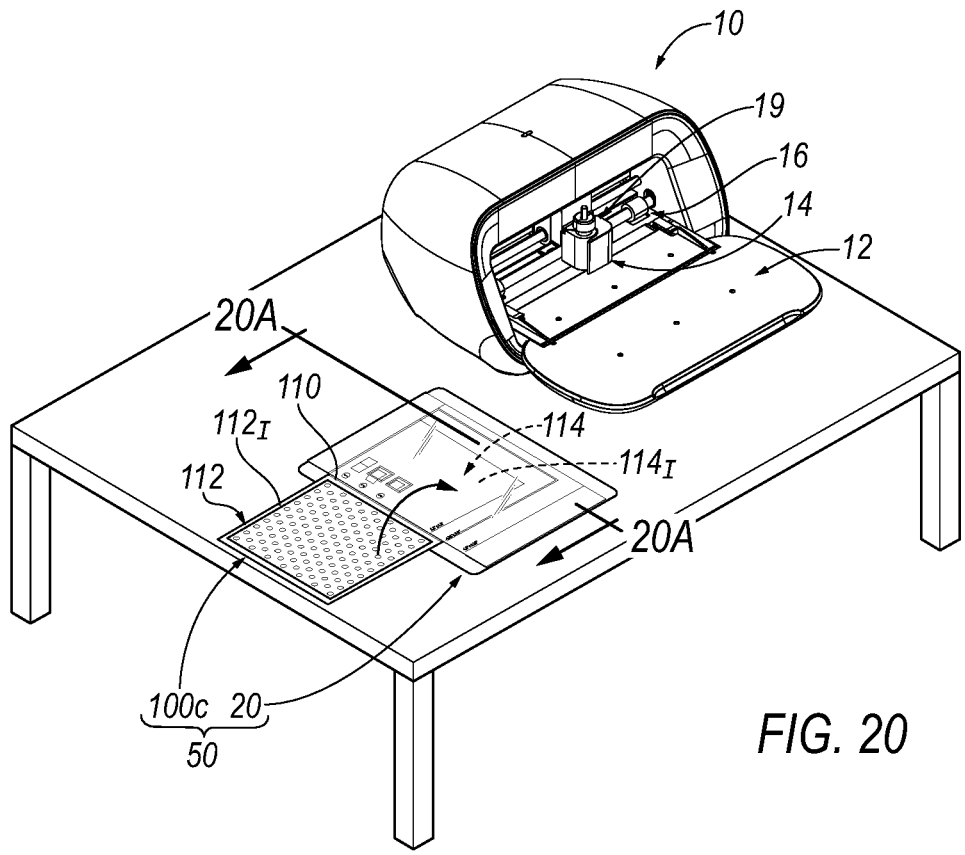
FIG. 20 is a perspective view of a third step of using the system according to FIG. 18.
Figure 20A:
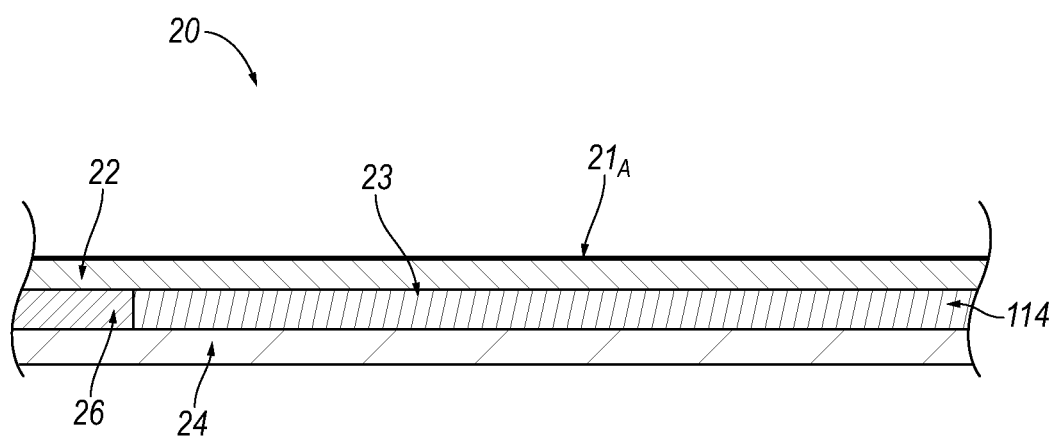
FIG. 20A is a cross-sectional view according to line 20A-20A of FIG. 20.

With reference to FIG. 13, the exemplary workpiece support material 20 may include an upper barrier layer 22 and a lower guiding layer 24 between which at least a portion of user-assembled multi-substrate workpiece assembly $100c$ may be inserted (as seen at, e.g., FIGS. 16A-16B and 20). A remaining portion of the user-assembled multi-substrate workpiece assembly $100c$ that may not be secured between the upper barrier layer 22 and the lower guiding layer 24 may be folded over on top of and above the upper barrier layer 22 of the workpiece support material 20 (as seen at, e.g., FIGS. 16B-16C and 21). Subsequently (as seen at, e.g., FIGS. 21-23), the workpiece support material 20 and the user-assembled multi-substrate workpiece assembly $100c$ nay be inserted into a cutting machine (e.g., cutting machine 10) (collectively, together, the workpiece support material 20 and the user-assembled multi-substrate workpiece assembly $100c$ may be referred to as the workpiece 50) such that the remaining portion of the user-assembled multi-substrate workpiece assembly $100c$ that is not secured between the upper barrier layer 22 and the lower guiding layer 24 of the workpiece support material 20 is arranged opposite the tool 19 of the cutting machine 10, such that the tool 19 can impinge upon (e.g., cut into) the remaining portion of the user-assembled multi-substrate workpiece assembly $100c$ that is not secured between the upper barrier layer 22 and the lower guiding layer 24 of the workpiece support material 20. For example, the tool 19 may engage the portion of the user-assembled multi-substrate workpiece assembly $100c$ that is disposed upon or on top of the upper barrier layer 22. Accordingly, during a cutting operation performed by the cutting machine 10, the portion of the user-assembled multi-substrate workpiece assembly $100c$ that is disposed between the upper barrier layer 22 and the lower guiding layer 24 is protected from being directly contacted by tool 19 as a result of the intervening arrangement of the upper barrier layer 22 of the workpiece support material 20 between portions of the user-assembled multi-substrate workpiece assembly $100c$.

Figure 22:
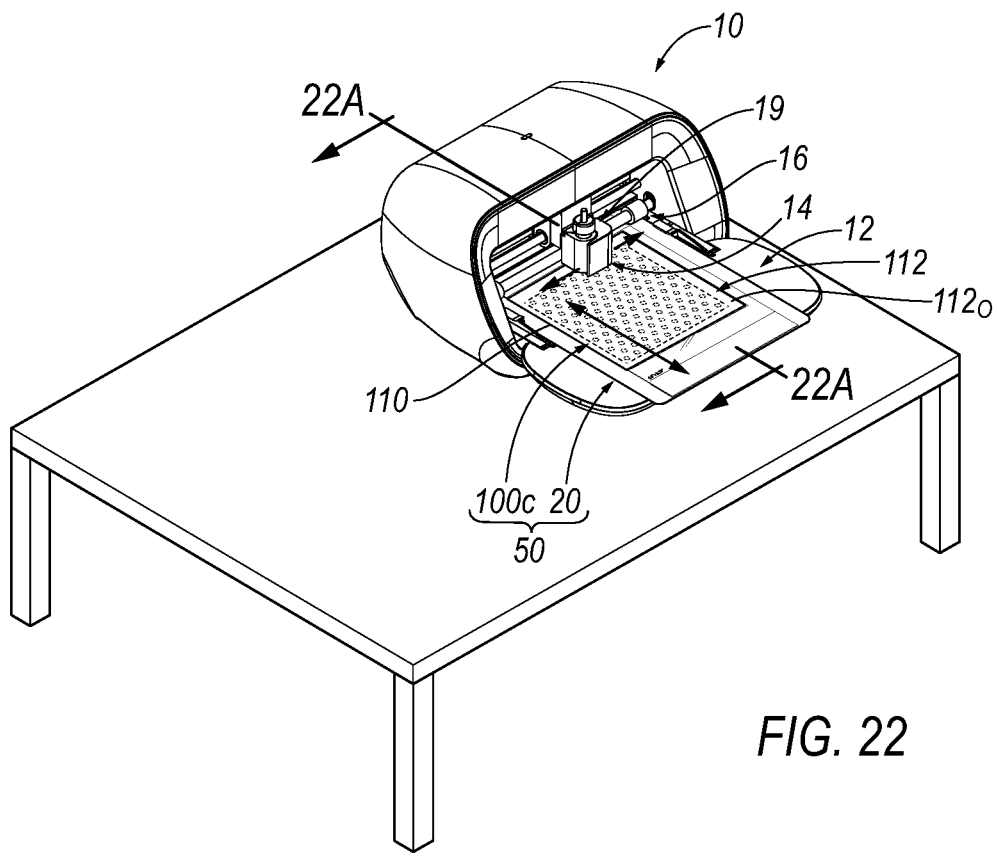
FIG. 22 is a perspective view of a fifth step of using the system according to FIG. 18.
Figure 23:
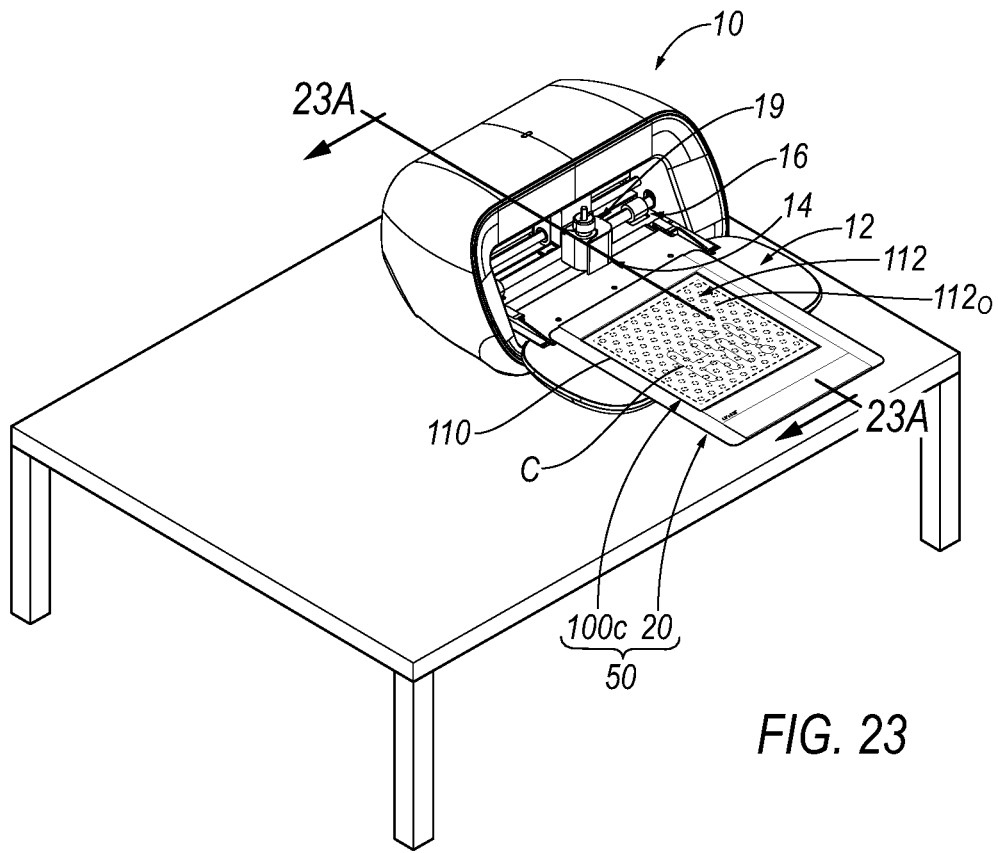
FIG. 23 is a perspective view of a sixth step of using the system according to FIG. 18.
Figure 24:
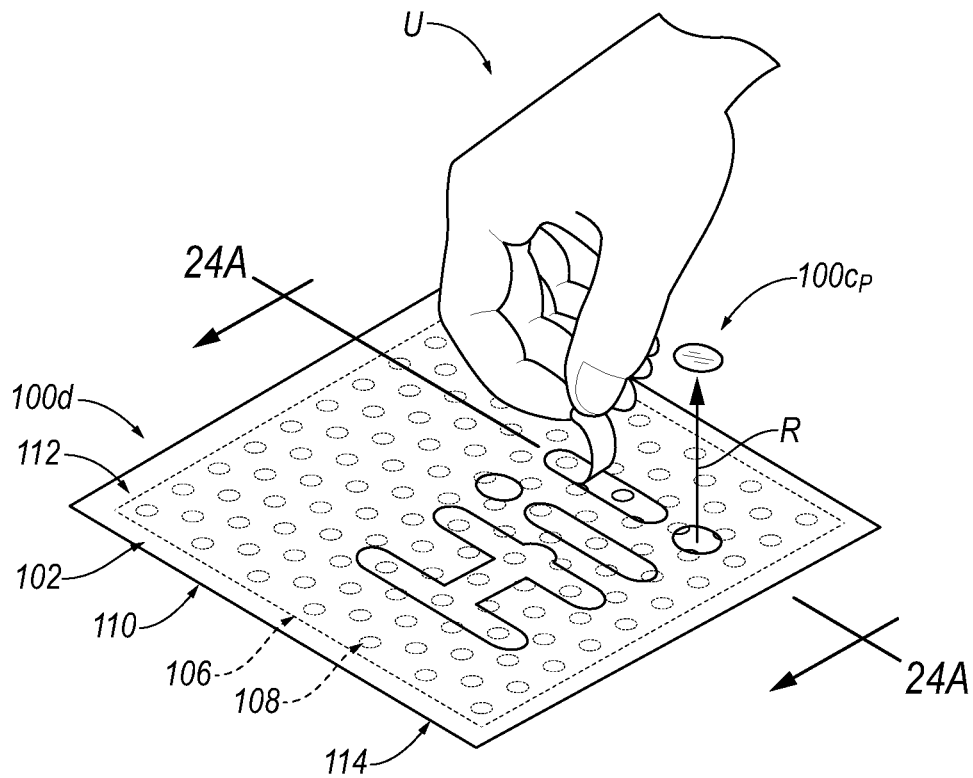
FIG. 24 is a perspective view of a seventh step illustrating a user "weeding" a non-virgin, cut-and-non-weeded workpiece that was worked on by the cutting machine of FIG. 18.
Figure 24A:
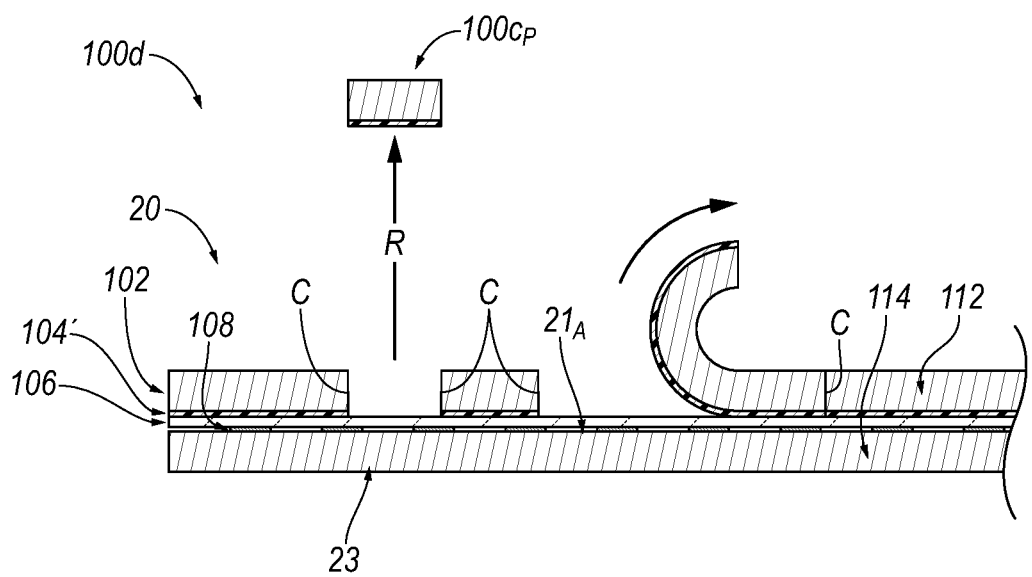
FIG. 24A is a cross-sectional view according to line 24A-24A of FIG. 24.

As described above with respect to the formation of the first substrate layer 102, with reference to FIG. 16A, the user-assembled multi-substrate workpiece assembly 100c may be alternatively referred to as a card (e.g., a sheet of material that is folded upon itself at a living hinge 110 that results in the user-assembled multi-substrate workpiece assembly 100c including: (1) the front cover panel 112 defining an outer surface 112$_O$ and an inner surface 112$_I$; and (2) a rear cover panel 114 defining an outer surface 114$_O$ and an inner surface 114$_I$). Accordingly, one or both of the inner surface 112$_I$ of the front cover panel 112 and the inner surface 114$_I$ of the rear cover panel 114 of the user-assembled multi-substrate workpiece assembly 100c may include a note or message from a sender that is intended to be read by a user whereas, for example (as seen at FIGS. 22-23), the front cover panel 112 of the user-assembled multi-substrate workpiece assembly 100c may be altered or worked-on by the cutting machine 10 in order to define a design (e.g. a cut pattern) that is formed by the tool 19 of the cutting machine 10.

Components of the user-assembled multi-substrate workpiece assembly 100c (which may be alternatively referred to as a "card mat") and methods of use thereof will be described in more detail below, but, in general, configurations of the user-assembled multi-substrate workpiece assembly 100c described herein reduce the space needed to alter or form a user-assembled multi-substrate workpiece assembly 100c by a factor of two. That is, the methods and apparatus for cutting the user-assembled multi-substrate workpiece assembly 100c in the present disclosure may not include the steps of laying a sheet of workpiece material in an unfolded orientation prior to cutting or inscribing a portion of that unfolded workpiece material (that would subsequently form a front cover panel of the unfolded workpiece material), and then subsequently folding the workpiece material to form a hinge such that the workpiece material resembled a card (defined by a front cover panel and a rear cover panel) after the workpiece material is altered or worked upon.

In view of the utilization of the workpiece support material 20, as described above, the user-assembled multi-substrate workpiece assembly 100c may be pre-formed or pre-purchased (and in some circumstances, may be packaged in a the bag, container C, or the like as seen at FIGS. 3 and 3A) in the form of a card that is already folded to define a living hinge 110 prior to being cut by the cutting machine 10, with the rear cover panel 114 of the user-assembled multi-substrate workpiece assembly 100c being protected from the tool 19 during a cutting operation performed by the cutting machine 10. As such, the workpiece support material 20 effectively reduces the area needed to form folded workpiece materials (defining a card) having only a one side cut or inscribed on by a factor of two. Thus, methods and apparatus of forming a card described herein enable larger cards to be made more efficiently using relatively smaller (e.g., "home-use") crafting devices such as, for example, the cutting machine 10, where a workspace or professional crafting resources are not available or are more limited than they are in larger, industrial factory setting.

Figure 14:
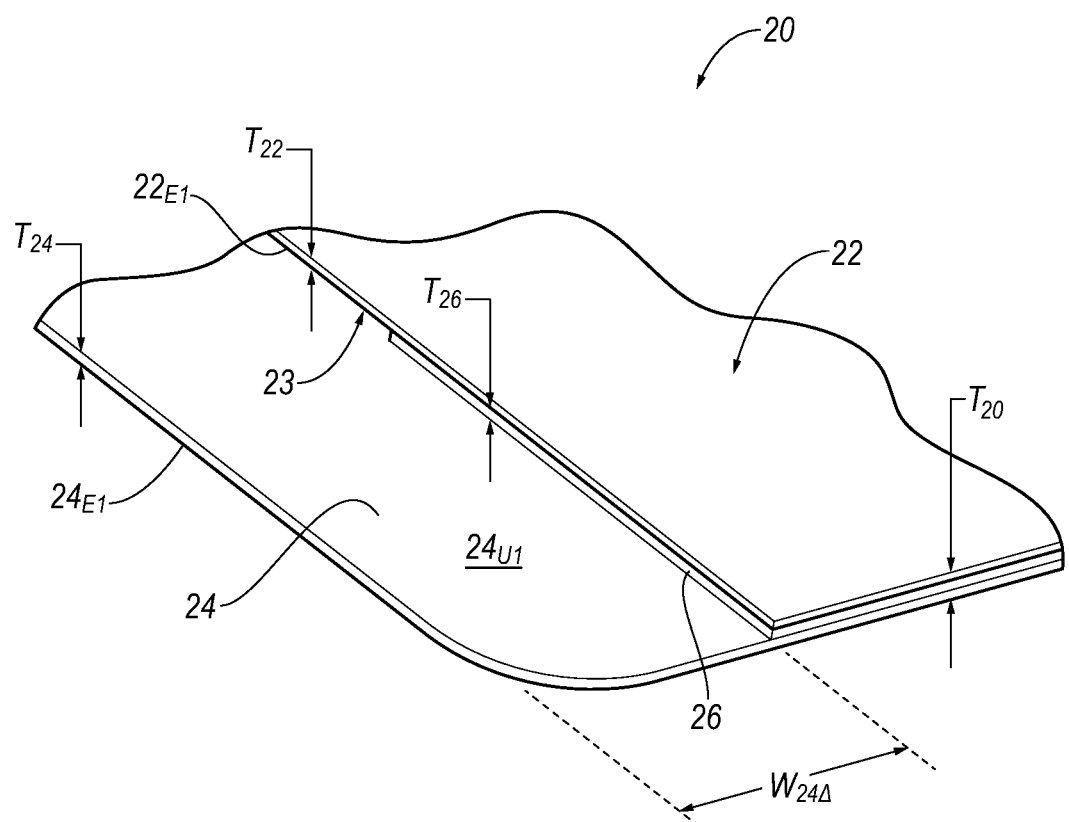
FIG. 14 is an enlarged view of the workpiece support material according to line 14 of FIG. 13.
Figure 15:
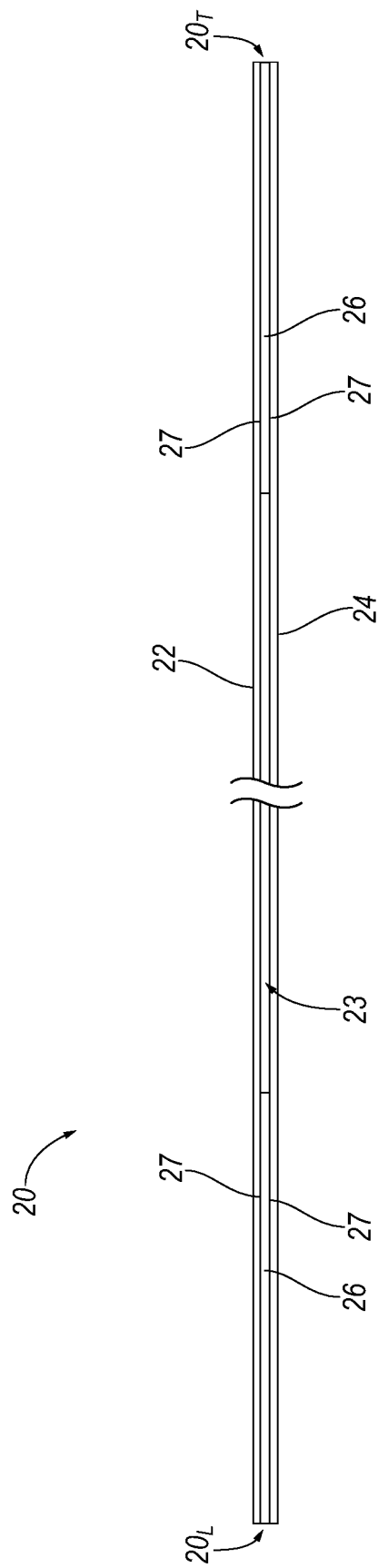
FIG. 15 is a side elevation view of the workpiece support material of FIG. 13 with break-in-length lines indicating an indeterminate length thereof.

Referring to FIGS. 13-15, an exemplary configurations of the workpiece support material 20 may include at least two layers. For example, the workpiece support material 20 may include the upper layer 22 and the lower layer 24. During use, the upper layer 22 may function as a protective layer acting as a wall or barrier that prevents the tool 19, which may include a cutting blade, from impinging onto anything (such as, e.g., the rear cover panel 114 of the user-assembled multi-substrate workpiece assembly 100c) that is arranged spatially below the upper layer 22 when the workpiece 50 is interfaced with the cutting machine 10 (as seen at, e.g., FIGS. 21-22). In this way, the upper layer 22 also acts as a shield for anything (such as, e.g., the rear cover panel 114 of the user-assembled multi-substrate workpiece assembly 100c) disposed between the upper layer 22 and the lower layer 24. In this regard, the upper layer 22 may be referred to herein as the "upper barrier layer 22."

In some instances, a thickness (see, e.g., $T_{22}$ at FIG. 14) and material(s) of the upper barrier layer 22 may vary depending on, for example, the type (e.g., hardness) of the user-assembled multi-substrate workpiece assembly 100c and/or an amount of force that is used to cut into and/or through the user-assembled multi-substrate workpiece assembly 100c (which may be defined by a unique hardness, such as, for example, relatively thicker card stock when compared to relatively thinner paper). In some configurations, for example, the upper barrier layer 22 may be formed of polyvinylchloride (PVC) or other similar plastic, polymer, or other polymeric materials. Accordingly, the thickness $T_{22}$ of the upper barrier layer 22 may not be limited to what is illustrated in the Figures, and, as such, may be greater or lesser, depending on, for example, one or more of a hardness and thickness of the user-assembled multi-substrate workpiece assembly 100c that is to be cut by the tool 19 of the cutting machine 10. In some implementations, upper barrier layer 22 may be defined by a PVC material and the thickness $T_{22}$ of the upper barrier layer 22 may be within the range of about 0.30 mm to about 0.45 mm when the cutting machine 10 is configured to impart the tool 19 with a downward force of about 400 grams.

In a similar fashion, the lower layer 24 may also be made of any desirable material(s), such as, for example, PVC or other plastic materials. In some configurations, the lower layer 24 may be formed from the same material as that of the upper barrier layer 22 so that both of the upper barrier layer 22 and the lower layer 24 expand or creep to the same extent during or after manufacturing. In other configurations, the upper barrier layer 22 and the lower layer 24 may be formed from different materials. Functionally, the lower layer 24 may be formed to provide structure and form for guiding the workpiece support material 20 through the cutting machine 10 as seen at, for examples, FIGS. 21-22. In this regard, the lower layer 24 may be referred to herein as the "lower guiding layer 24."

Figure 21:
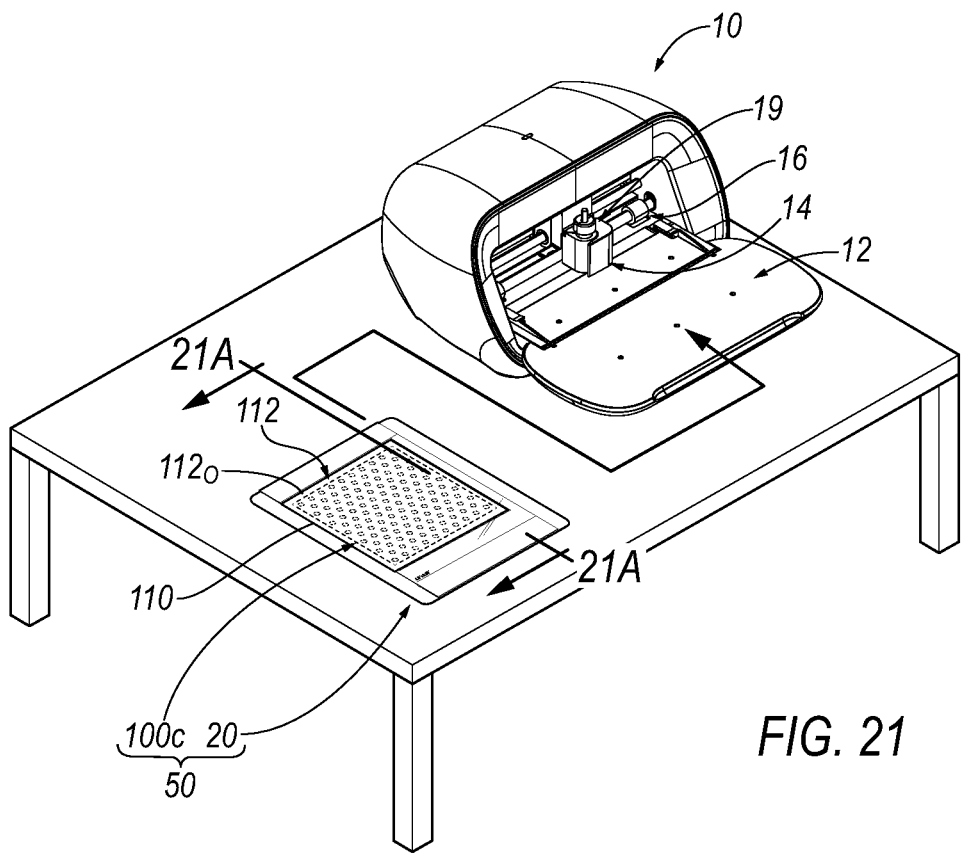
FIG. 21 is a perspective view of a fourth step of using the system according to FIG. 18.

As seen at, for example, FIG. 13, in some configurations, the lower guiding layer 24 may define a width $W_{24}$ (extending between opposite outer edges $24_{E1}$, $24_{E2}$ of the lower guiding layer 24) that is greater than a width $W_{22}$ (extending between opposite outer edges $22_{E1}$, $22_{E2}$ of the upper barrier layer 22) defined by the upper barrier layer 22. Furthermore, the upper barrier layer 22 may be joined to and centered (in the width direction between the opposite outer edges $24_{E1}$, $24_{E2}$ of the lower guiding layer 24) upon or over the lower guiding layer 24 such that at least one or more width portions (see, e.g., $W_{24A}$) of the width $W_{24}$ of the lower guiding layer 24 extends laterally beyond one or both of the outer edges $22_{E1}$, $22_{E2}$ of the upper barrier layer 22. Accordingly, the one or more width portions $W_{24A}$ of the width $W_{24}$ of the lower guiding layer 24 define one or more upwardly-facing surface portions $24_{U1}$, $24_{U2}$, that may be arranged or configured to be in contact with one or more workpiece-moving portions (e.g., the roller assembly 16) of the cutting machine 10 when the workpiece support material 20 is disposed within the cutting machine 10 as seen at FIGS. 21-22. As such, when the workpiece support material 20 is arranged within the cutting machine 10, the upper barrier layer 22 may not contact, for example, the roller assembly 16 during use, even when the upper layer 22 facing upward as shown. Therefore, in some configurations, the roller assembly 16 may pinch or otherwise contact a region of the lower guiding layer 24 defined at least in part by the upwardly-facing surface portions $24_{U1}$, $24_{U2}$ of the one or more width portions $W_{24A}$ of the width $W_{24}$ of the lower guiding layer 24 when the workpiece 50 is inserted into the cutting machine 10 and moved forwardly-and-backwardly through the cutting machine 10. Such an exemplary configuration also maximizes the available cutting area between the rollers of the roller assembly 16 of the cutting machine 10 (i.e., in some instances, the entire area of the upper barrier layer 22 extending between the opposite outer edges $22_{E1}$, $22_{E2}$ of the upper barrier layer 22, or anything disposed thereover, such as, for example, the front cover panel 112 of the user-assembled multi-substrate workpiece assembly 100c, is not obstructed by the workpiece support material 20 during a cutting operation or the like as associated with the tool 19.

In some configurations, a thickness (see, e.g., $T_{24}$ at FIG. 14) of the lower guiding layer 24 may vary depending on, for example, the type (e.g., hardness) of the user-assembled multi-substrate workpiece assembly 100c and/or an amount of force that is called for in order to cut into and through the user-assembled multi-substrate workpiece assembly 100c (which may be defined by a unique hardness, such as, for example, relatively thicker card stock when compared to relatively thinner paper). In some configurations, the thickness $T_{24}$ may be configured to be thick enough to provide form and/or rigidity that promotes, for example, the roller assembly 16 to grasp and guide the workpiece support material 20 through the cutting machine 10. In some instances, the lower guide layer 24 may be formed from a PVC material and may be defined by a thickness $T_{24}$ of the lower guide layer 24 between about 0.40 mm and about 0.60 mm. In other configurations, the lower guide layer 24 may be formed from a PVC material and may be defined by a thickness $T_{24}$ approximately equal to about 0.50 mm.

With reference to FIG. 14, in some implementations, the workpiece support material 20 may further include a spacer 26 disposed between the upper barrier layer 22 and the lower guiding layer 24. In some configurations, the spacer 26 may be defined by a thickness $T_{26}$ between about 0.40 mm and about 0.60 mm. In other configurations, the thickness $T_{26}$ of the spacer 26 may be approximately equal to about 0.50 mm. Functionally, the spacer 26 separates the upper barrier layer 22 from the lower guiding layer 24 so that the workpiece support material 20 defines a void or workpiece-receiving cavity 23 (see also FIG. 15) that is configured or sized to receive at least a portion of the workpiece support material 20, such as, for example, a rear cover panel 114 of the user-assembled multi-substrate workpiece assembly 100c, which may be defined by, for example, a cardstock material, a paper material, or other card materials. In one or more other configurations, the thickness $T_{26}$ of the spacer 26 may be greater than or less than the thicknesses $T_{22}$, $T_{24}$ of one or both of the upper barrier layer 22 and the lower guiding layer 24 so long as the spacer 26 maintains sufficient spacing between the upper barrier layer 22 and the lower guiding layer 24 so as to form the void or workpiece-receiving cavity 23 that is configured or sized to receive at least a portion of the workpiece support material 20.

With reference to FIG. 15, in some implementations, the workpiece support material 20 may include two spacers 26 that are disposed between the upper barrier layer 22 and the lower guiding layers 24 such that one spacer 26 of the two spacers 26 is arranged at or near a leading end $20_L$ (see also FIG. 13) and one spacer 26 of the two spacers 26 is arranged at or near a trailing end $20_T$ (see also FIG. 13) of the workpiece support material 20.

In some configurations, the upper barrier layer 22 may be secured to the lower guiding layer 24 at or near the leading end $20_L$ end and/or the trailing end $20_T$ of the workpiece support material 20 with the spacers 26 and/or various intermediate adhesive layers 27 (see, e.g., FIG. 15) disposed between: (1) a lower surface portion of the upper barrier layer 22 and the spacer 26; and (2) an upper surface portion of the lower guiding layer 24 and the spacers 26. In other configurations, the spacers 26 may define one or more adhesive layers that directly adhere or bind the upper barrier layer 22 to the lower guiding layer 24. Alternatively, in yet other configurations, the upper barrier layer 22 and/or the lower guiding layer 24 may be secured together at or by the spacers 26 with one or more layers of pressure sensitive adhesive 27 such that the upper barrier layer 22 and the lower guiding layer 24 do not slip or otherwise move relative to one another during use but are selectively separable by, for example, a user, as needed. Alternatively, in other configurations, the upper barrier layer 22 is selectively-removably-secured to the lower guiding layer 24 at or near one of the leading end $20_L$ end and/or the trailing end $20_T$ of the workpiece support material 20 by one of the two spacers 26 such that a portion of the lower surface of the upper barrier layer 22 can be partially peeled away from a portion of the upper surface of the lower guiding layer 24 while maintaining a connection to a remaining portion of the upper surface of the lower guiding layer 24 at the other spacer 26. Alternatively, in other configurations, the upper barrier layer 22 may not be secured to the lower guiding layer 24 at all, but, rather, may be configured to be at least temporarily secured thereto for use within the cutting machine 10.

Furthermore, in some configurations, the workpiece support material 20 may not include any spacers 26; rather, in such configurations, the upper barrier layer 22 may be adhered, either permanently or semi-permanently to the lower guiding layer 24 directly via one or more adhesive layers 27 at or near one of the leading end $20_L$ end and the trailing end $20_T$ of the workpiece support material 20 of the upper barrier layer 22. In such configurations, the upper barrier layer 22 and the lower guiding layer 24 may be flexed away from one another to form the void or workpiece-receiving cavity 23. Even further, in such implementations, one end of the upper barrier layer 22 at or near one of the leading end $20_L$ end and the trailing end $20_T$ of the workpiece support material 20 may be directly secured to the lower guiding layer 24 with the other end of the upper barrier layer 22 at or near one of the leading end $20_L$ end and the trailing end $20_T$ of the workpiece support material 20 free to be peeled away from the lower guiding layer 24.

Along these lines, some configurations of the workpiece support material 20 may be in the form of an envelope, whereby the upper barrier layer 22 may be secured to the lower guiding layer 24 at or near three edges thereof (i.e., in the event of a rectangularly configured workpiece support material 20). In such configurations, the upper barrier layer 22 may be separated or separable from the lower guiding layer 24 at the edge of the workpiece support material 20 that is not secured together like an envelope. Once separated, a portion of the user-assembled multi-substrate workpiece assembly 100c may be inserted into the cavity 23 of the envelope-shaped workpiece support material 20, as will be described in more detail below.

Furthermore, in some implementations, the upper barrier layer 22 and the lower guiding layer 24 may be formed integrally as a single piece of material having two opposing sheets that are separated by some distance along at least a portion of the length of workpiece support material 20. Such an integrally-formed implementation of the workpiece support material 20, if not formed having sheets with a space there-between, may at least be formed to have opposing sheets that are able to be separated from each other either by flexing, bending, or otherwise separated to insert a portion of the user-assembled multi-substrate workpiece assembly 100c there-between.

Exemplary implementations of the workpiece support material 20 described herein may include various combinations of any of the implementations described herein, and may provide two opposing layers or sheets of material between which another separate sheet (or sheets) of material, such as a portion (e.g. a rear cover panel 114) of the user-assembled multi-substrate workpiece assembly 100c that is not being worked on is protected from being cut or otherwise altered by the tool 19 of the cutting machine 10. Also, in general, at least one layer of the workpiece support material 20 described herein may provide a barrier layer that prevents the tool 19 from contacting or at least partially penetrating a portion of the user-assembled multi-substrate workpiece assembly 100c.

As shown at FIGS. 16A, 19-20, 19A-20A, at least a portion (e.g. a rear cover panel 114) of the user-assembled multi-substrate workpiece assembly 100c may be inserted between the upper barrier layer 22 and the lower guiding layer 24 of the workpiece support material 20. With reference to FIGS. 18-19 and 18A-19A. In some instances, prior to interfacing the user-assembled multi-substrate workpiece assembly 100c with the workpiece support material as described above, a film material 21 (see, e.g., FIG. 18A) may be optionally removed (see, e.g., FIG. 19A) from an upper surface of the upper barrier layer 22. In some configurations, film material 21 and the upper barrier layer 22 may be transparent or at least semi-transparent, such that an end user can visualize the portion (e.g. a rear cover panel 114) of the user-assembled multi-substrate workpiece assembly 100c disposed between the upper barrier layer 22 and the lower guide layer 24 during use (accordingly, the film material 21 may protect the clear material defining the upper barrier layer 22 from being scratched during shipping, which may adversely affect the benefits associated with the transparency of the upper barrier layer 22 as described above). Additionally, the upper barrier layer 22 and/or the lower guiding layer 24 may include indicia 25 (see also FIG. 13) that may assist the end user for the purposes of guiding and/or aligning the user-assembled multi-substrate workpiece assembly 100c between the upper barrier layer 22 and the lower guiding layer 24. The indicia 25 shown in the Figures may include, for example, lines indicating where the edges of various predetermined (or standard) sizes of user-assembled multi-substrate workpiece assemblies 100c could be aligned for defining the workpiece 50 when the workpiece 50 is interfaced with the cutting machine 10. The indicia 25 may also be included for providing instructions or other information to end users of the workpiece support material 20.

In some configurations, the indicia 25 may provide for placement or arrangement of three different sizes of user-assembled multi-substrate workpiece assemblies 100c that may be referenced from, for example, a corner of the workpiece support material 20 between the spacers 26. In one or more other implementations, other indicia 25 may be included or added to help end users align a wide variety of sizes and shapes of user-assembled multi-substrate workpiece assemblies 100c at different positions or regions within the workpiece support material 20. The indicia 25 on the workpiece support material 20 may also be arranged on the workpiece support material 20 in conjunction with software and sensor functionalities of the cutting machine 10 so that the indicia 25 also provides the cutting machine 10 with alignment data, the type of the user-assembled multi-substrate workpiece assembly 100c, and/or the size of the user-assembled multi-substrate workpiece assembly 100c in order to permit the cutting machine 10 to automatically recognition one or more features of the workpiece 50 that is interfaced with the cutting machine 10.

During use, as shown at FIGS. 16A and 19-21, an end user may insert at least a portion (e.g. a rear cover panel 114) of the user-assembled multi-substrate workpiece assembly 100c between the upper barrier layer 22 and the lower guiding layer 24 of the workpiece support material 20. Once inserted, as shown at FIGS. 16B and 21, an end user can fold the user-assembled multi-substrate workpiece assembly 100c at the living hinge 110 over so that at least some of a remaining portion (e.g., a front cover panel 112) of the user-assembled multi-substrate workpiece assembly 100c is folded at the living hinge 110 over the upper barrier layer 22 of the workpiece support material 20. In some configurations, as shown in FIGS. 16C and 21, the portion (e.g., a front cover panel 112) of the user-assembled multi-substrate workpiece assembly 100c may be folded over the upper barrier layer 22 and pressed downwardly upon an upper surface of the upper barrier layer 22.

Figure 22A:
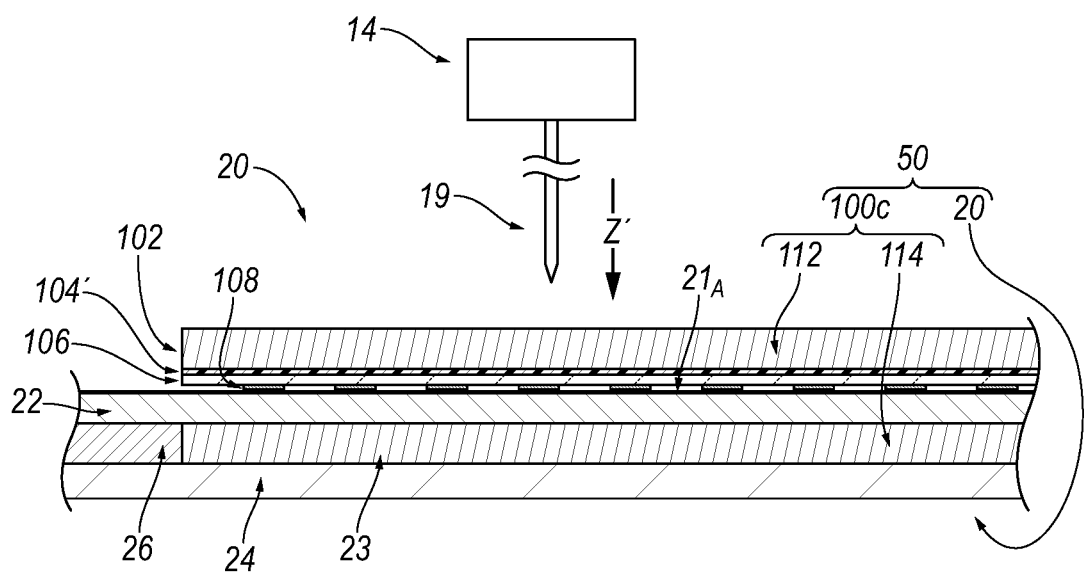
FIG. 22A is a cross-sectional view according to line 22A-22A of FIG. 22.

Along these lines, in order to at least temporarily retain a portion (e.g., a front cover panel 112) of the user-assembled multi-substrate workpiece assembly 100c on the upper surface of the upper barrier layer 22 of the workpiece support material 20 as shown, some configurations of the workpiece support material 20 may include a pressure sensitive adhesive layer $21_A$ (see, e.g., FIGS. 19 and 19A that may be protected by or covered by the selectively-removable film material 21) or other type of adhesive layer disposed on top of the upper surface of the upper barrier layer 22. In such configurations, the user-assembled multi-substrate workpiece assembly 100c may be retained flat against upper surface of the upper barrier layer 22 such that the front cover panel 112 of the user-assembled multi-substrate workpiece assembly 100c does not shift or separate from the upper barrier layer 22 when cut C (in the X-Y-Z Cartesian coordinate system) or otherwise impinged upon by the tool 19 (according to the direction of the arrow Z' as seen at FIGS. 9A and 22A) when the workpiece 50 is arranged within the cutting machine 10. Additionally, or alternatively, an upper surface of the lower guiding layer 24 may also include an adhesive layer, such as a pressure sensitive adhesive layer, so that the portion (a rear cover panel 114) of the user-assembled multi-substrate workpiece assembly 100c that is disposed between the upper barrier layer 22 and the lower guiding layer 24 of the workpiece support material 20 is also securely retained there-between. Additionally or alternatively, a lower surface of the upper barrier layer 22 may also include an adhesive layer, such as a pressure sensitive adhesive layer, so that the portion (a rear cover panel 114) of the user-assembled multi-substrate workpiece assembly 100c disposed between the upper barrier layer 22 and the lower guiding layer 24 of the workpiece support material 20 is securely retained there-between.

Accordingly, exemplary configurations of the workpiece support material 20 described above may include one or more adhesive layers (see, e.g., adhesive layer $21_A$) arranged on one or more surfaces of one or both of the upper barrier layer 22 and the lower guiding layer 24. Such adhesive(s)

Figure 21A:
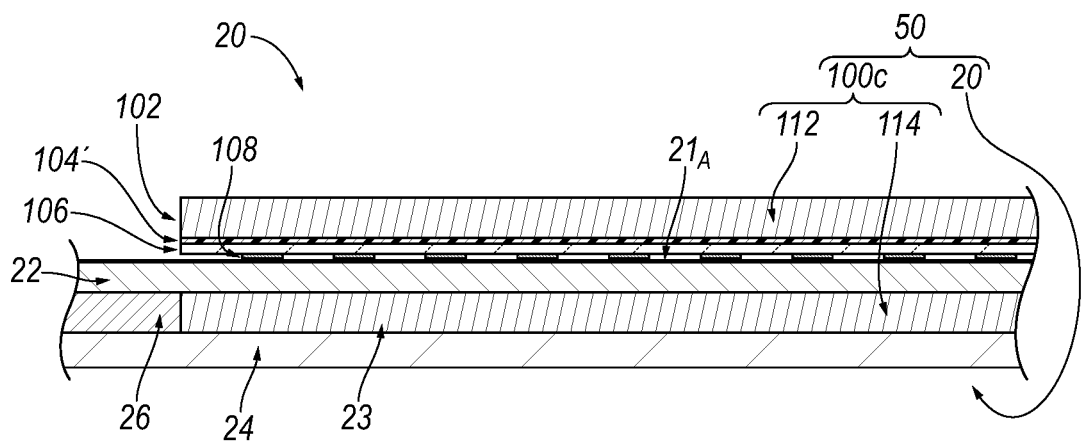
FIG. 21A is a cross-sectional view according to line 21A-21A of FIG. 21.

$21_A$ may temporarily retain the user-assembled multi-substrate workpiece assembly 100c to the workpiece support material 20 as shown at FIGS. 16C, 21, and 21A. Along these lines, in implementations where the upper surface of the upper barrier layer 22 includes an adhesive layer $21_A$, the removable film material 21 may form a protective sheet to protect the adhesive layer $21_A$ when the workpiece support material 20 is not in use. In such configurations, such a film material 21 can be easily removed (as seen at FIGS. 18-19 and 18A-19A) for placement of, for example, the front cover panel 112 of the user-assembled multi-substrate workpiece assembly 100c on top and adjacent the upper barrier layer 22 of the workpiece support material 20.

Figure 23A:
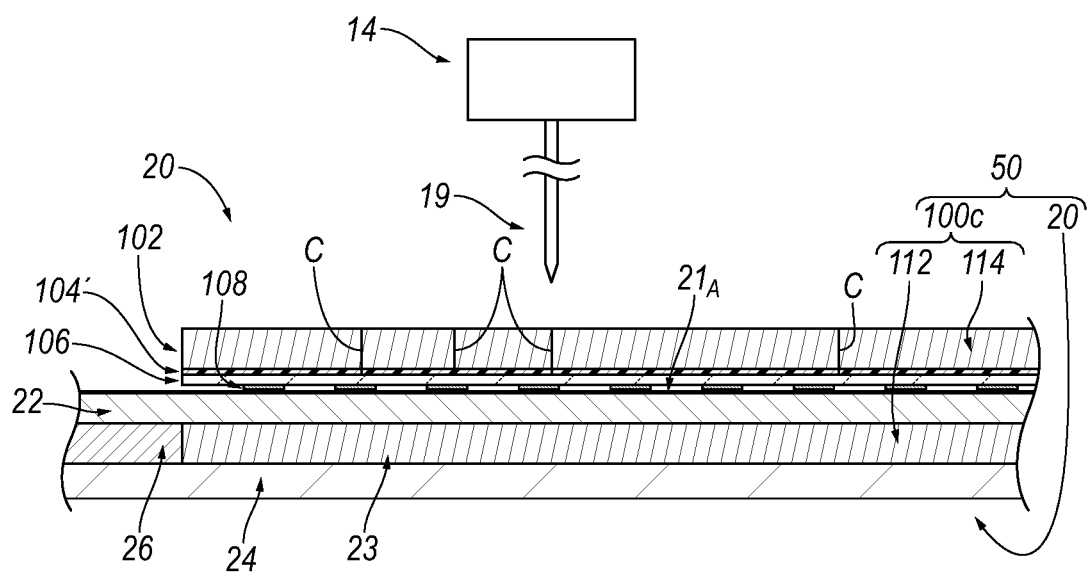
FIG. 23A is a cross-sectional view according to line 23A-23A of FIG. 23.

Once the user-assembled multi-substrate workpiece assembly 100c is selectively secured to the workpiece support material 20 for defining the workpiece 50 as seen at FIGS. 16A-16C, 18-20, and 18A-20A, the end user may insert the workpiece 50 into the cutting machine at FIGS. 21-22 and 21A-22A such that the cutting machine 10 may conduct work (e.g., cut, scribe, or alter) on the front cover panel 112 of the user-assembled multi-substrate workpiece assembly 100c at FIGS. 22-23 and 22A-23A. Once the work (i.e., conducting cutting operation in the X-Y-Z Cartesian coordinate system) is completed, as seen at FIGS. 23 and 23A, the end user may subsequently remove (see, e.g., arrow R at FIGS. 24 and 24A) the cutout portion $100c_P$ from the front cover panel 112 of the user-assembled multi-substrate workpiece assembly 100c. In alternative methodologies, the cutout portion $100c_P$ may remain adhered to the adhesive $21_A$ of the upper barrier layer 22 in order to subsequently provide a user-assembled multi-substrate workpiece assembly 100c that may define a die-cut card as seen at FIG. 25. Accordingly, once the user-assembled multi-substrate workpiece assembly 100c is situated relative to the workpiece support material 20 as shown at FIGS. 16C, 21, and 21A, the workpiece 50 can be either inserted into the cutting machine 10 to alter the exposed portion (e.g., the front cover panel 112) of the user-assembled multi-substrate workpiece assembly 100c while the unexposed portion (e.g., the rear cover panel 114) of the user-assembled multi-substrate workpiece assembly 100c that is arranged between the upper barrier layer 22 and the lower guiding layer 24 is protected from the tool 19 of the cutting machine 10. As noted above, in some configurations of the workpiece support material 20, because the one or more upwardly-facing surface portions $24_{U1}$, $24_{U2}$ of the lower guiding layer 24 extends laterally beyond the opposite outer edges $22_{E1}$, $22_{E2}$ of the upper barrier layer 22, the entire area of the front cover panel 112 of the user-assembled multi-substrate workpiece assembly 100c is accessible by the tool 19 for altering the front cover panel 112 of the user-assembled multi-substrate workpiece assembly 100c between the roller assembly 16 of the cutting machine 10 (i.e., rollers or other components of a roller system, such as the roller assembly 16 of the cutting machine 10 do not contact the user-assembled multi-substrate workpiece assembly 100c when the workpiece support material 20 is interfaced with the cutting machine 10 that moves the workpiece 50 forwardly-and-backwardly through the cutting machine 10). This exemplary configuration leaves the entire area of the outer surface $112_O$ of the front cover panel 112 of the user-assembled multi-substrate workpiece assembly 100c exposed when arranged over the upper barrier layer 22 of the workpiece support material 20.

Figure 17:
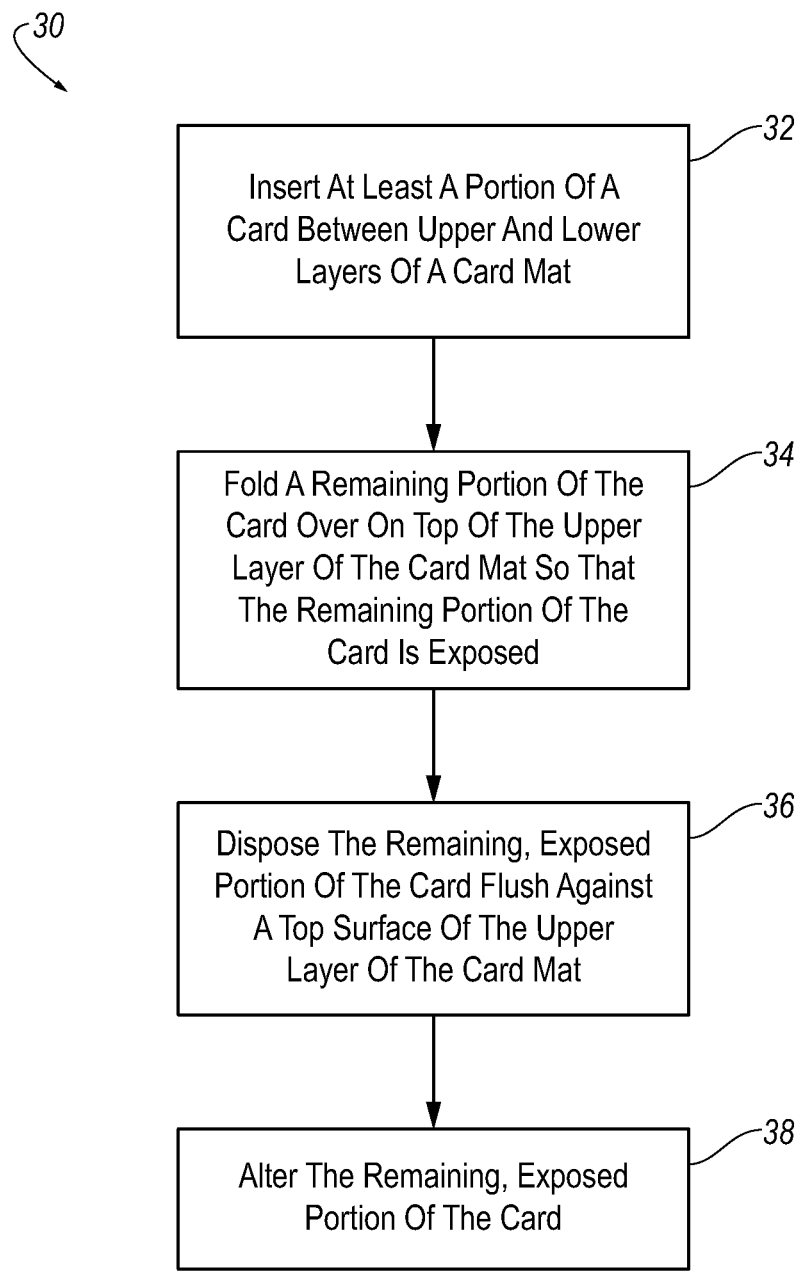
FIG. 17 is a flowchart illustrating an exemplary method of forming a card using a workpiece support material, according to the principles of the present disclosure.
Figure 18:
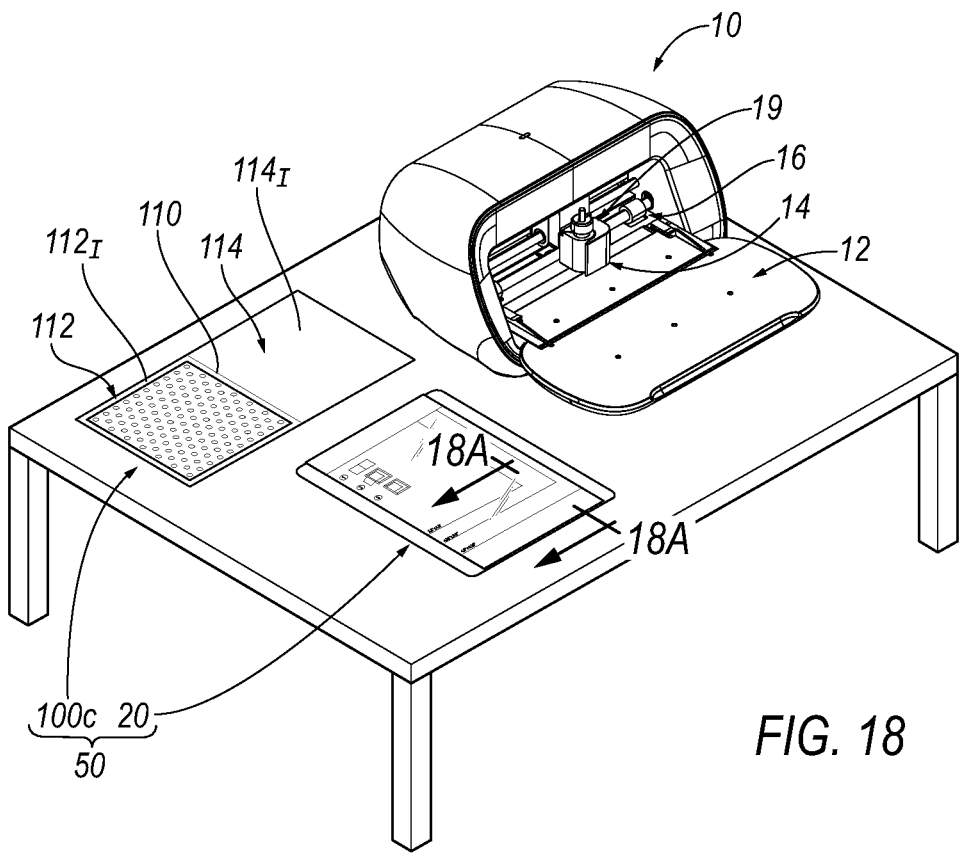
FIG. 18 is a perspective view of a first step of using a system including a cutting machine, an exemplary the user-assembled multi-substrate workpiece assembly arranged in a virgin, non-cut-and-non-weeded state and a workpiece support material, according to the principles of the present disclosure.
Figure 18A:
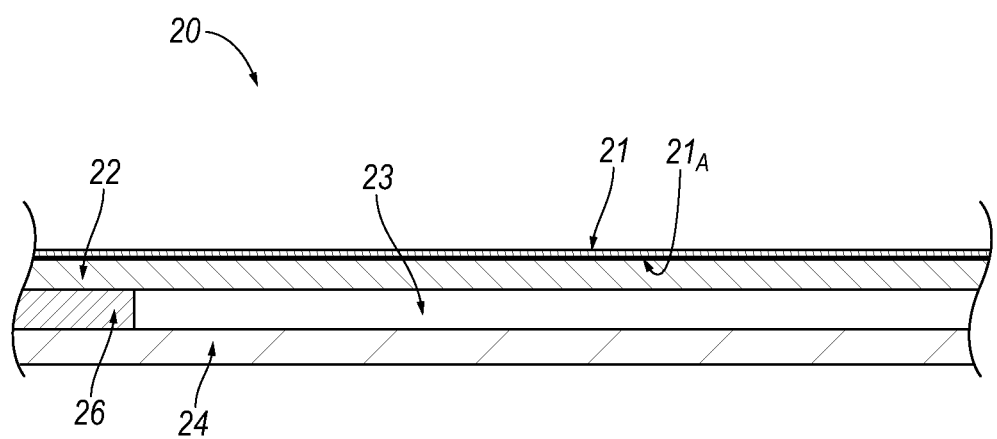
FIG. 18A is a cross-sectional view according to line 18A-18A of FIG. 18.
Figure 19:
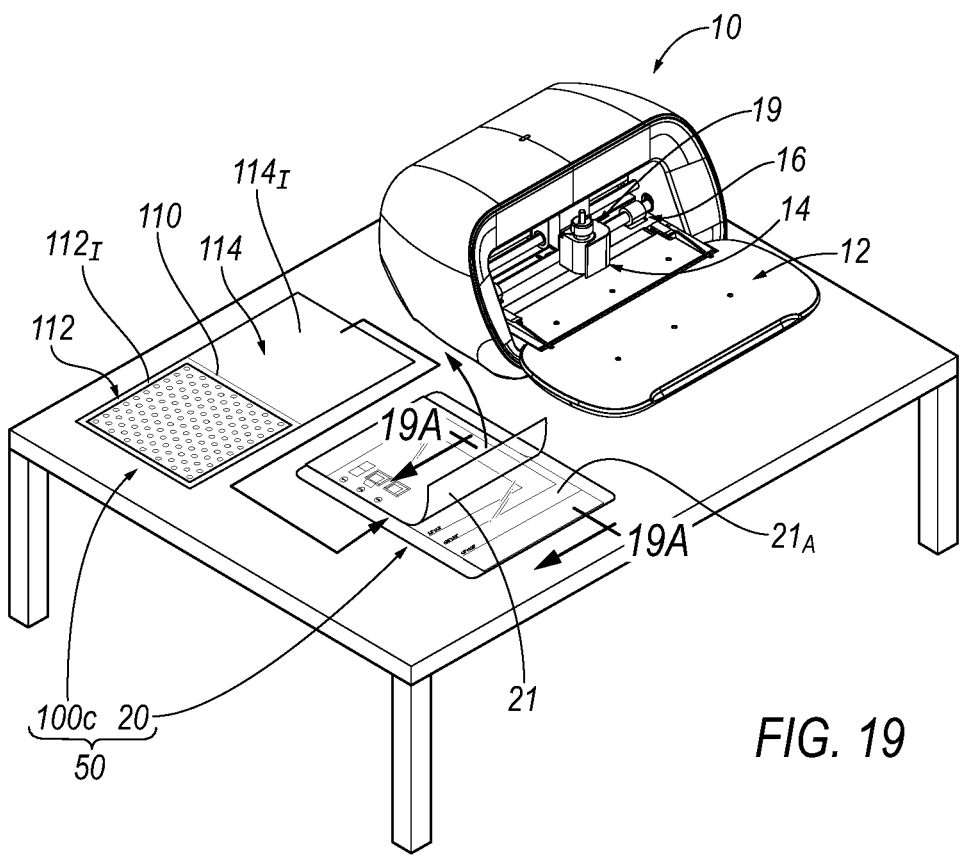
FIG. 19 is a perspective view of a second step of using the system according to FIG. 18.
Figure 19A:
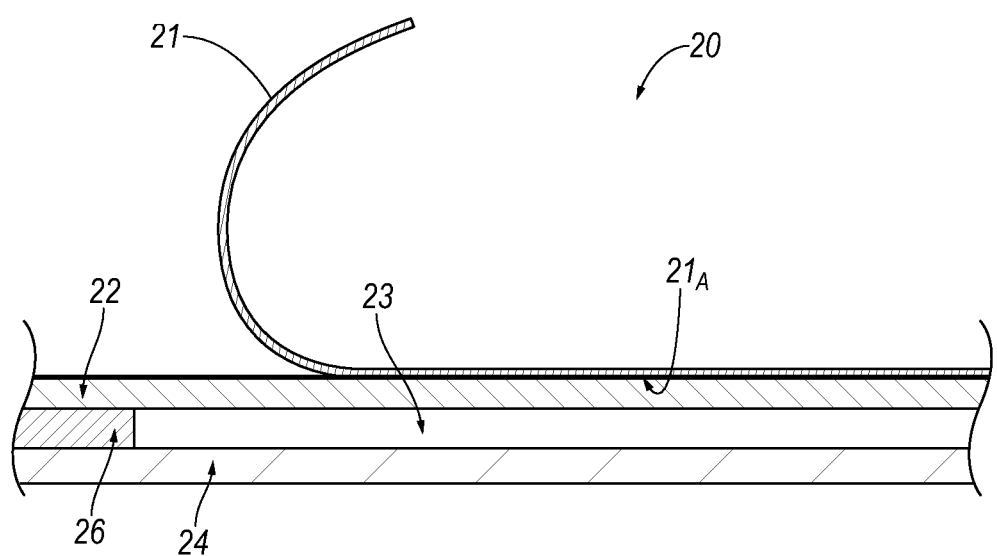
FIG. 19A is a cross-sectional view according to line 19A-19A of FIG. 19.

With reference to FIG. 17, a flowchart of an exemplary method 30 of forming or conducting work on the user-assembled multi-substrate workpiece assembly 100c using the workpiece support material 20 and the cutting machine 10 is shown. In some implementations, a first step 32 may include inserting at least a portion of the user-assembled multi-substrate workpiece assembly 100c between the upper barrier layer 22 and the lower guide layer 24 of the workpiece support material 20 (see, e.g., FIG. 16A).

In other implementations, workpiece support materials 20 having an upper barrier layer 22 that is connected to the lower guiding layer 24 at or near one of the leading end $20_L$ or the trailing end $20_T$ of the workpiece support material 20, a first step of the method 30 may include peeling the upper barrier layer 22 up and away from the lower guiding layer 24 in order to provide space or expose the void or workpiece-receiving cavity 23 that is configured or sized to receive at least a portion (e.g., the rear cover panel 114) of the user-assembled multi-substrate workpiece assembly 100c between the upper barrier layer 22 and the lower guiding layer 24.

In configurations of the workpiece support material 20 that do not include one or more spacers 26, a first step of the method 30 may include firstly separating the upper barrier layer 22 from the lower guiding layer 24 at least enough to insert a portion (e.g., the rear cover panel 114) of the user-assembled multi-substrate workpiece assembly 100c there-between. In such an exemplary implementation, separation of the upper barrier layer 22 and the lower guiding layer 24 may include peeling back the upper barrier layer 22 from the lower guiding layer 24. In other implementations, separation of the upper barrier layer 22 and the lower guiding layer 24 may include flexing, bending, or otherwise physically manipulating one of the upper barrier layer 22 and the lower guiding layer 24 away from the other of the upper barrier layer 22 and the lower guiding layer 24 to provide space or expose the void or workpiece-receiving cavity 23 that is configured or sized to receive at least a portion (e.g., the rear cover panel 114) of the user-assembled multi-substrate workpiece assembly 100c there-between.

In other instances, the method 30 may include separating the upper barrier layer 22 from the lower guiding layer 24 of the workpiece support material 20 to provide or expose the void or workpiece-receiving cavity 23 that is configured or sized to receive at least a portion (e.g., the rear cover panel 114) of the user-assembled multi-substrate workpiece assembly 100c; a further step of the method 30 may include returning the upper barrier layer 22 down and against the lower guiding layer 24 with at least a portion (e.g., the rear cover panel 114) of the user-assembled multi-substrate workpiece assembly 100c disposed there-between in order to retain the portion of the user-assembled multi-substrate workpiece assembly 100c between the upper barrier layer 22 and the lower guiding layer 24.

In at least one exemplary implementation of the method 30, when at least a portion (e.g., the rear cover panel 114) of the user-assembled multi-substrate workpiece assembly 100c has been placed between the upper barrier layer 22 and the lower guiding layer 24 as noted above, a further step of the method 30 may include pressing downwardly or providing a downwardly-directed force onto the workpiece support material 20 where the upper surface of the lower guiding layer 24 and/or the lower surface of the upper barrier layer 22 include one or more adhesive layers $21_A$ for securing the user-assembled multi-substrate workpiece assembly 100c there-between. By pressing downwardly in this way, the portion (e.g., the rear cover panel 114) of the user-assembled multi-substrate workpiece assembly 100c that is disposed between the upper barrier layer 22 and the lower guiding layer 24 of the workpiece support material 20 remain there-between.

In some implementations, a second step 34 of the method 30 may include folding a remaining portion (e.g., the front cover panel 112) of the user-assembled multi-substrate workpiece assembly 100c over or on top of an upper surface of the upper barrier layer 22 of the workpiece support material 20. Such a step 34 may result in the remaining portion (e.g., the front cover panel 112) of the user-assembled multi-substrate workpiece assembly 100c being exposed above the upper barrier layer 22 of the workpiece support material 20 when the workpiece 50 is arranged within the cutting machine such that the remaining portion (e.g., the front cover panel 112 of the user-assembled multi-substrate workpiece assembly 100c may be arranged opposite the tool 19 such that the tool 19 may conduct work on (e.g., cut) the remaining portion (e.g., the front cover panel 112) of the user-assembled multi-substrate workpiece assembly 100c (see, e.g., FIGS. 16B and 21-23).

In other implementations of the method 30, a third step 36 may include disposing the exposed, remaining portion (e.g., the front cover panel 112) of the user-assembled multi-substrate workpiece assembly 100c that has been folded over the upper surface of the upper barrier layer 22 of the workpiece support material 20 against the upper barrier layer 22 in order to be arranged flush against the top surface of the upper barrier layer 22 of the workpiece support material 20 (see, e.g., FIG. 16C).

In implementations where a top surface of the upper barrier layer 22 includes an adhesive layer $21_A$, a further step of the method 30 may include pressing the exposed portion (e.g., the front cover panel 112) of the user-assembled multi-substrate workpiece assembly 100c downwardly and against the adhesive layer $21_A$ so that the exposed portion (e.g., the front cover panel 112) of the user-assembled multi-substrate workpiece assembly 100c remains flush against the upper surface of the upper barrier layer 22 of the workpiece support material 20. Pressing downwardly onto the exposed portion (e.g., the front cover panel 112) of the user-assembled multi-substrate workpiece assembly 100c may also secure the portion (e.g., the rear cover panel 114) of the user-assembled multi-substrate workpiece assembly 100c disposed between the upper barrier layer 22 and the lower guiding layer 24 of the workpiece support material 20 between the upper barrier layer 22 and the lower guiding layer24 in implementations where the upper surface of the lower guiding layer 24 and/or the lower surface of the upper barrier layer 22 also includes one or more adhesive layers $21_A$ for securing a portion (e.g., the rear cover panel 114) of the user-assembled multi-substrate workpiece assembly 100c there-between.

In other implementations of the method 30, a fourth step 38 may include altering the exposed portion (e.g., the front cover panel 112) of the user-assembled multi-substrate workpiece assembly 100c (seem e.g., FIGS. 22-23 and 22A-23A), which is disposed on an upper surface of the upper barrier layer 22 of the workpiece support material 20. In such a step, the act of altering may include cutting C (see, e.g., FIGS. 23 and 23A), drawing, writing, inscribing, scoring, perforating, and/or otherwise altering the exposed portion (e.g., the front cover panel 112) of the user-assembled multi-substrate workpiece assembly 100c.

In some implementations of the method 30, the act of altering the exposed portion (e.g., the front cover panel 112) of the user-assembled multi-substrate workpiece assembly 100c may include inserting the workpiece 50 (e.g., collectively, the workpiece support material 20 and the user-assembled multi-substrate workpiece assembly 100c) into an cutting machine 10 that includes a tool 19 that is configured to impinge downwardly onto the exposed portion (e.g., the front cover panel 112) of the user-assembled multi-substrate workpiece assembly 100c and the associated upper barrier layer 22 of the workpiece support material 20.

In at least one implementation of method 30, altering the exposed portion of user-assembled multi-substrate workpiece assembly 100c may include hand-altering the exposed portion of user-assembled multi-substrate workpiece assembly 100c, including hand-cutting, hand-drawing, hand-writing, hand-scoring, hand-inscribing, hand-perforating, or otherwise altering user-assembled multi-substrate workpiece assembly 100c by hand.

In some implementations of the method 30, further steps may include re-inserting the workpiece 50 into the cutting machine 10 in order to perform additional alterations, including those alterations noted above (e.g., cutting, drawing, writing, inscribing, scoring, perforating, or the like) or combinations thereof. In other implementations, multiple unit of user-assembled multi-substrate workpiece assembly 100c may be cut or otherwise altered and then fitted together into a single altered or worked-on user-assembled multi-substrate workpiece assembly 100c in order to produce any number of aesthetics and designs on the user-assembled multi-substrate workpiece assembly 100c. In some implementations of the method 30, a further step may include inserting and folding more than one user-assembled multi-substrate workpiece assembly 100c to the workpiece support material 20 at a time.

Benefits, other advantages, and solutions to problems have been described herein with regard to specific implementations. However, the benefits, advantages, solutions to problems, and any elements that may cause any benefit, advantage, or solution to occur or become more pronounced are not to be construed as critical, required, or essential features or elements of the disclosure.

Reference throughout this specification to features, advantages, or similar language does not imply that all the features and advantages that may be realized with the present disclosure should be or are in any single implementation of the invention. Rather, language referring to the features and advantages is understood to mean that a specific feature, advantage, or characteristic described in connection with an implementation is included in at least one implementation of the subject matter disclosed herein. Thus, discussion of the features and advantages, and similar language, throughout this specification may, but do not necessarily, refer to the same implementation.

Furthermore, the described features, advantages, and characteristics of the disclosure may be combined in any suitable manner in one or more implementations. One skilled in the relevant art will recognize that the subject matter of the present application may be practiced without one or more of the specific features or advantages of a particular implementation. In other instances, additional features and advantages may be recognized in certain implementations that may not be present in all implementations of the disclosure. Further, in some instances, well-known structures, materials, or operations are not shown or described in detail to avoid obscuring aspects of the subject matter of the present disclosure. No claim element is intended to invoke 35 U.S.C. 112(f) unless the element is expressly recited using the phrase "means for."

As used herein, the terms "including," "comprising," "having," and variations thereof mean "including but not limited to" unless expressly specified otherwise. Accordingly, the terms "including," "comprising," "having," and variations thereof are intended to cover a non-exclusive inclusion, such that a process, method, article, or apparatus that comprises a list of elements does not include only those elements but may include other elements not expressly listed or inherent to such process, method, article, or apparatus. An enumerated listing of items does not imply that any or all of the items are mutually exclusive and/or mutually inclusive, unless expressly specified otherwise.

Further, in the detailed description herein, references to "one implementation," "an implementation," "some implementations," "various implementations," "one example," "an example," "some examples," "various examples," "one implementation," "an implementation," "some implementations," "various implementations," "one aspect," "an aspect," "some aspects," "various aspects," etc., indicate that the implementation, example, implementation, and/or aspect described may include a particular feature, structure, or characteristic, but every implementation, example, implementation, and/or aspect may not necessarily include the particular feature, structure, or characteristic. Moreover, such phrases are not necessarily referring to the same implementation, example, implementation, or aspect. Thus, when a particular feature, structure, or characteristic is described in connection with an implementation, example, implementation, and/or aspect, it is submitted that it is within the knowledge of one skilled in the art to affect such feature, structure, or characteristic in connection with other implementations, examples, implementations, and/or aspects, whether or not explicitly described. Absent an express correlation to indicate otherwise, features, structure, components, characteristics, and/or functionality may be associated with one or more implementations, examples, implementations, and/or aspects of the present disclosure. After reading the description, it will be apparent to one skilled in the relevant art how to implement the disclosure in alternative configurations.

The scope of the disclosure is to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. Further, the term "plurality" can be defined as "at least two." As used herein, the phrase "at least one of", when used with a list of items, means different combinations of one or more of the listed items may be used and only one of the items in the list may be needed. The item may be a particular object, thing, or category. Moreover, where a phrase similar to "at least one of A, B, and C" is used in the claims, it is intended that the phrase be interpreted to mean that A alone may be present in an implementation, B alone may be present in an implementation, C alone may be present in an implementation, or that any combination of the elements A, B and C may be present in a single implementation; for example, A and B, A and C, B and C, or A, B, and C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

All ranges and ratio limits disclosed herein may be combined. Numbers, percentages, ratios, or other values stated herein are intended to include that value, and also other values that are "about" or "approximately" the stated value, as would be appreciated by one of ordinary skill in the art encompassed by implementations of the present disclosure, unless otherwise defined herein. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Different cross-hatching may be used throughout the figures to denote different parts but not necessarily to denote the same or different materials. Surface shading lines may be used throughout the figures to denote different parts or areas but not necessarily to denote the same or different materials. In some cases, reference coordinates may be specific to each figure. Furthermore, the connecting lines shown in the various figures contained herein are intended to represent exemplary functional relationships and/or physical couplings between the various elements. It should be noted that many alternative or additional functional relationships or physical connections may be present in a practical system.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The schematic flow chart diagrams included herein are generally set forth as logical flow chart diagrams. As such, the depicted order and labeled steps are indicative of one or more implementations of the presented method. The steps recited in any of the method or process descriptions may be executed in any order and are not necessarily limited to the order presented. Furthermore, any reference to singular includes plural implementations, and any reference to more than one component or step may include a singular implementation or step. Elements and steps in the figures are illustrated for simplicity and clarity and have not necessarily been rendered according to any particular sequence. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Furthermore, no element, component, or method step in the present disclosure is intended to be dedicated to the public regardless of whether the element, component, or method step is explicitly recited in the claims.

The subject matter of the present disclosure may be embodied in other specific forms without departing from its spirit or essential characteristics. The described implementations are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A plurality of workpiece layers of material for a greeting card comprising:
    a dual-sided adhesive layer assembly comprising:
        a carrier layer having a first side surface and a second side surface;
        a first adhesive layer on the first side surface of the carrier layer;
        a second adhesive layer on the second side surface of the carrier layer; and
        a removable liner portion that is configured for removal from the second adhesive layer;
    a first substrate layer comprising:
        a front cover panel having a front outer surface and a front inner surface opposite the front outer surface, the dual-sided adhesive layer assembly permanently attached to the front inner surface of the front cover panel via the first adhesive layer, wherein the front cover panel includes a respective length and a respective width to define a respective surface area of the front cover panel; and
        a rear cover panel having a rear outer surface and a rear inner surface opposite the rear outer surface, wherein the front cover panel extends from the rear cover panel via a living hinge such that the front cover panel can be folded upon the rear cover panel with the front inner surface facing and extending substantially parallel to the rear inner surface; and
    a trim substrate workpiece comprising:
        a second substrate layer having an inner surface and an outer surface opposite the inner surface, the outer surface of the second substrate layer configured to attach to the second adhesive layer of the dual-sided adhesive layer to form a multi-substrate workpiece assembly after removal of the removable liner portion; and
        a second substrate layer design portion impregnated within at least a portion of a thickness of the second substrate layer of the trim substrate workpiece,
        wherein the second substrate layer includes a respective length and a respective width to define a respective surface area of the second substrate layer that is substantially equal to the respective surface area of the front cover panel.

2. The plurality of workpiece layers of material according to claim 1, wherein the trim substrate workpiece comprises a material such that a cutting tool, when imparted by a cutting force, is configured to penetrate and/or cut through a combined thickness of the front cover panel and the dual-sided adhesive layer assembly but said cutting tool, when imparted by the cutting force, is unable to penetrate and/or cut through the trim substrate workpiece.

3. The plurality of workpiece layers of material according to claim 1, wherein the second substrate layer is transparent such that the second substrate layer design portion is visible through the second substrate layer.

* * * * *